United States Patent
Choi et al.

(12)

(10) Patent No.: US 6,908,015 B2
(45) Date of Patent: Jun. 21, 2005

(54) PERSONAL HYDRATION SYSTEM WITH COMPONENT CONNECTIVITY

(75) Inventors: Robert Choi, Rohnert Park, CA (US); Herbert Douglas, Antioch, CA (US); Barley A. Forsman, Cotati, CA (US); Jeremy Galten, Petaluma, CA (US)

(73) Assignee: CamelBak Products, LLC, Petaluma, CA (US)

(*) Notice: Subject to any disclaimer, the term of this patent is extended or adjusted under 35 U.S.C. 154(b) by 216 days.

(21) Appl. No.: 10/267,036

(22) Filed: Oct. 7, 2002

(65) Prior Publication Data

US 2003/0168470 A1 Sep. 11, 2003

Related U.S. Application Data

(60) Provisional application No. 60/328,260, filed on Oct. 9, 2001.

(51) Int. Cl.[7] .............................................. B67D 5/064
(52) U.S. Cl. ...................... 222/175; 222/107; 222/529; 128/203.21; 141/379
(58) Field of Search .......................... 222/92, 105, 107, 222/175, 386.5, 501, 527, 529, 531, 537, 548, 306.5; 128/203.21; 141/379

(56) References Cited

U.S. PATENT DOCUMENTS

| 2,260,712 A | 10/1941 | Harrison |
|---|---|---|
| 4,423,892 A | 1/1984 | Bartholomew |
| 4,436,125 A | 3/1984 | Blenkush |
| 4,500,118 A | 2/1985 | Blenkush |
| 4,541,457 A | 9/1985 | Blenkush |
| 4,541,657 A | 9/1985 | Smyth |
| 4,630,847 A | 12/1986 | Blenkush |
| 4,703,957 A | 11/1987 | Blenkush |
| 4,804,213 A | 2/1989 | Guest |
| 4,884,829 A | 12/1989 | Funk et al. |
| 4,903,995 A | 2/1990 | Blenkush et al. |

(Continued)

FOREIGN PATENT DOCUMENTS

DE    3727789    3/1988

OTHER PUBLICATIONS

CamelBak Protective Mask Adapter Kit, CamelBak Products, Inc., circa Jun. 2000.
NBC/CBR Reservoir and Gas Mask Adapter Kit, 2000 Maximum Gear Military & Law Enforcement Products Catalog; CamelBak Products, Inc., cicrca Jun. 2000.
"Chemical–Biological Warfare Safe Water Pouch," Texas Research Institute Austin, Inc., printed from www.tri–austin.com/pouch.php Website in Sep. 2003.

Primary Examiner—Gene Mancene
Assistant Examiner—Melvin A Cartagena
(74) Attorney, Agent, or Firm—Kolisch Hartwell, P.C.

(57) ABSTRACT

A personal hydration system with component connectivity. The hydration system includes a fluid reservoir that may be housed within a pack. Drink fluid is drawn from the reservoir through a drink tube in fluid communication with the reservoir at one end and with a mouthpiece at the other. In some embodiments, the hydration system includes a manually actuated on/off valve downstream from the reservoir and/or a bite-actuated mouthpiece. The hydration system further includes a quick-connect assembly that fluidly interconnects components of the hydration system and which is configured to quickly release, and permit reattachment of, the detached or replacement components. In some embodiments, the hydration system includes a quick-connect assembly that is adapted to selectively couple a bite-actuated mouthpiece and a gas mask adapter to the hydration system's drink tube. In some embodiments, at least a portion, if not the entire, hydration system is formed from a chemically resistant material.

25 Claims, 11 Drawing Sheets

U.S. PATENT DOCUMENTS

| | | |
|---|---|---|
| 4,934,655 A | 6/1990 | Blenkush et al. |
| 4,946,200 A | 8/1990 | Blenkush et al. |
| 5,033,777 A | 7/1991 | Blenkush |
| 5,052,725 A | 10/1991 | Meyer et al. |
| 5,104,158 A | 4/1992 | Meyer et al. |
| 5,178,303 A | 1/1993 | Blenkush et al. |
| 5,316,041 A | 5/1994 | Ramacier, Jr. et al. |
| 5,353,836 A | 10/1994 | deCler et al. |
| 5,374,088 A | 12/1994 | Moretti et al. |
| 5,378,024 A | 1/1995 | Kumagai et al. |
| D357,307 S | 4/1995 | Ramacier, Jr. et al. |
| 5,494,074 A | 2/1996 | Ramacier, Jr. et al. |
| 5,520,420 A | 5/1996 | Moretti |
| 5,536,047 A | 7/1996 | Detable et al. |
| 5,692,935 A | 12/1997 | Smith |
| 5,811,359 A | 9/1998 | Romanowski |
| 5,879,033 A | 3/1999 | Hänsel et al. |
| 6,086,119 A | 7/2000 | Hänsel |
| 6,161,578 A | 12/2000 | Braun et al. |
| 6,231,089 B1 | 5/2001 | DeCler et al. |
| 6,247,619 B1 | 6/2001 | Gill et al. |
| 6,318,764 B1 | 11/2001 | Trede et al. |
| 6,348,679 B1 | 2/2002 | Ryan et al. |
| 6,382,593 B1 | 5/2002 | deCler et al. |
| 6,428,055 B1 | 8/2002 | Moretti et al. |
| 6,471,252 B1 | 10/2002 | Moretti et al. |
| 6,520,480 B2 | 2/2003 | Martin-Cocher et al. |
| 6,557,899 B2 | 5/2003 | Martin-Cocher et al. |
| 6,558,537 B1 | 5/2003 | Herrington et al. |
| 6,607,179 B2 | 5/2003 | Herrington et al. |
| 2002/0014498 A1 | 2/2002 | Forsam et al. |
| 2002/0074533 A1 | 6/2002 | DeCler et al. |
| 2002/0092879 A1 | 7/2002 | Chrisman et al. |
| 2002/0119267 A1 | 8/2002 | Himmelmann et al. |
| 2002/0125452 A1 | 9/2002 | Martin-Cocher et al. |
| 2002/0129858 A1 | 9/2002 | Meyer et al. |
| 2002/0170731 A1 | 11/2002 | Garber et al. |
| 2002/0180210 A1 | 12/2002 | Martin-Cocher et al. |
| 2002/0187289 A1 | 12/2002 | Chang et al. |
| 2002/0190453 A1 | 12/2002 | Wilhelm et al. |
| 2003/0015680 A1 | 1/2003 | Moretti et al. |
| 2003/0021945 A1 | 1/2003 | Kelch |
| 2003/0087015 A1 | 5/2003 | Wyslotsky et al. |

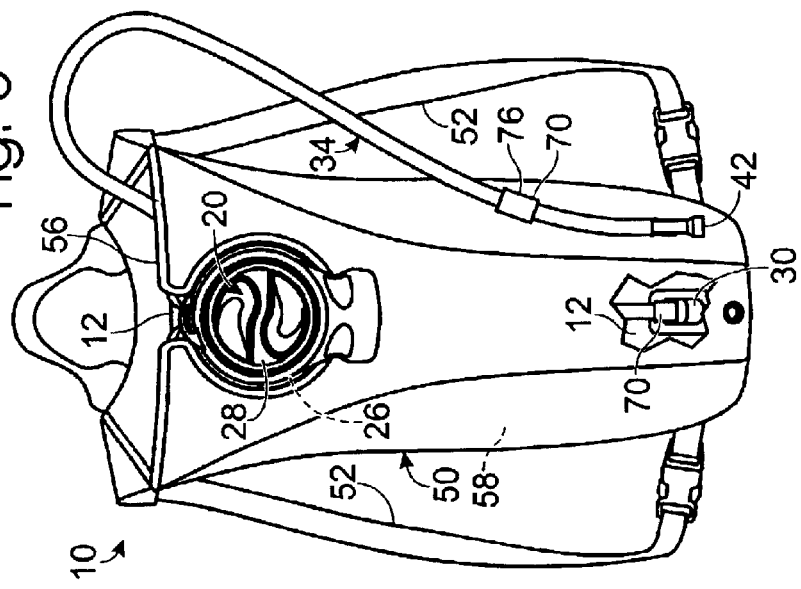
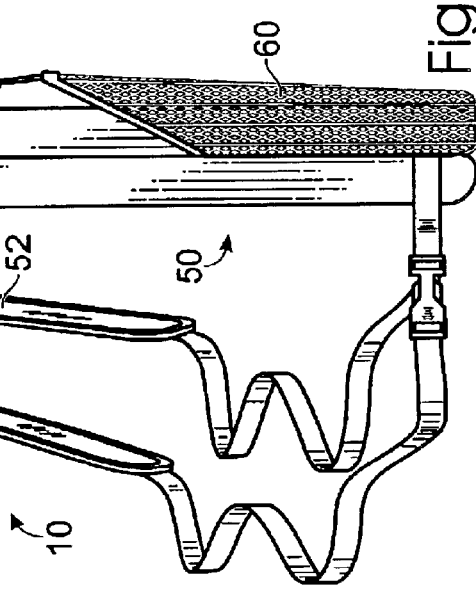
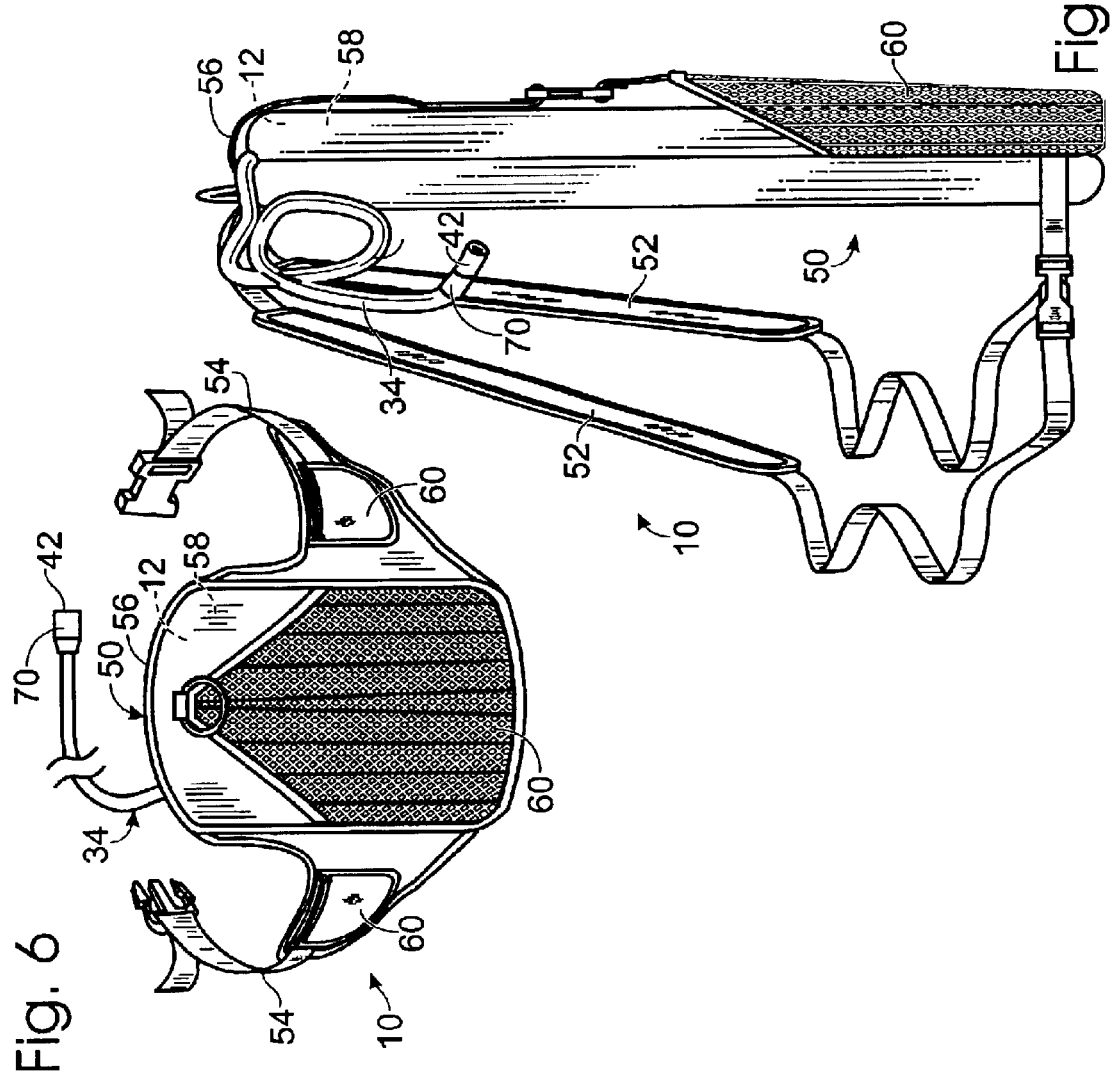

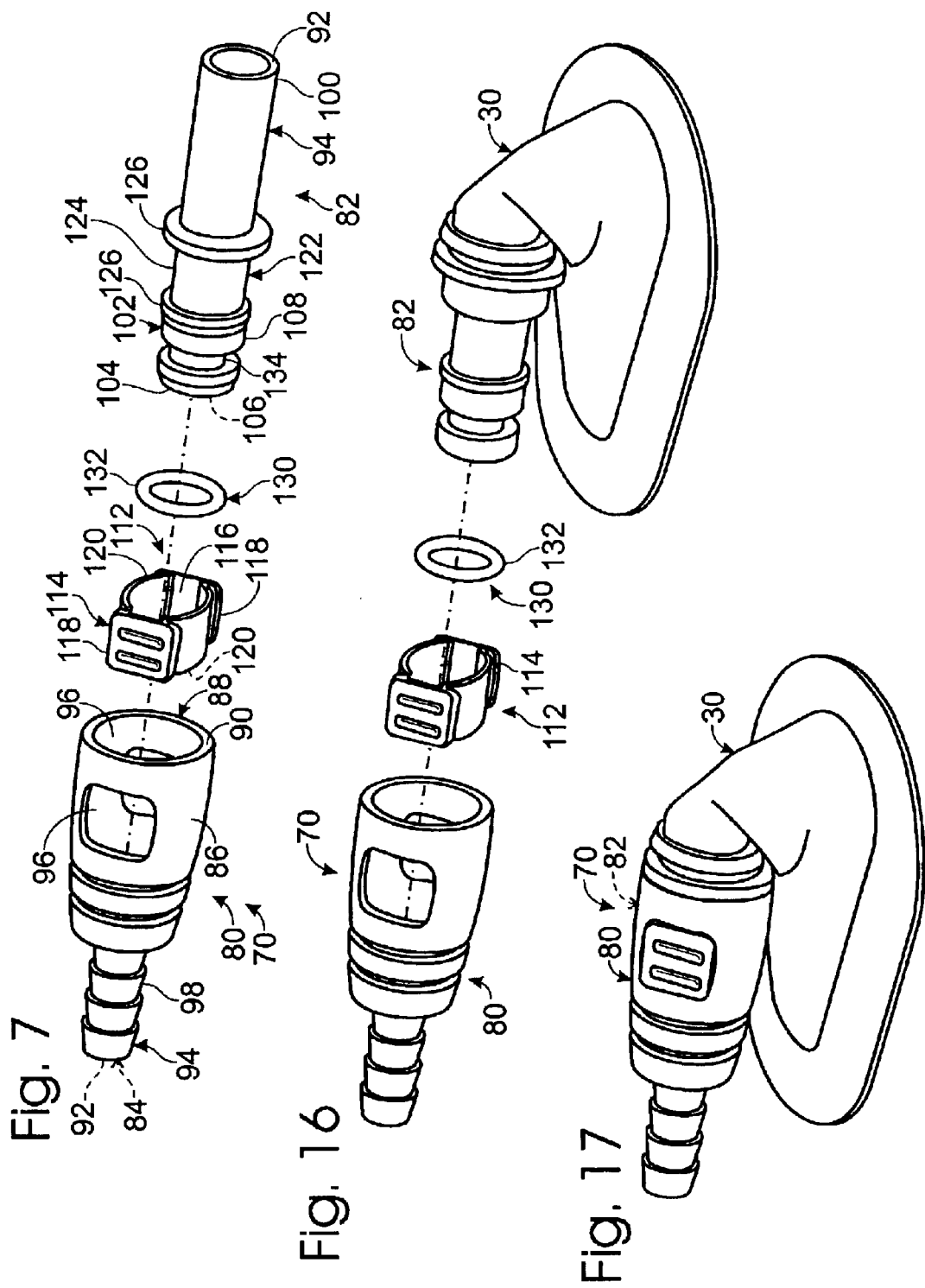

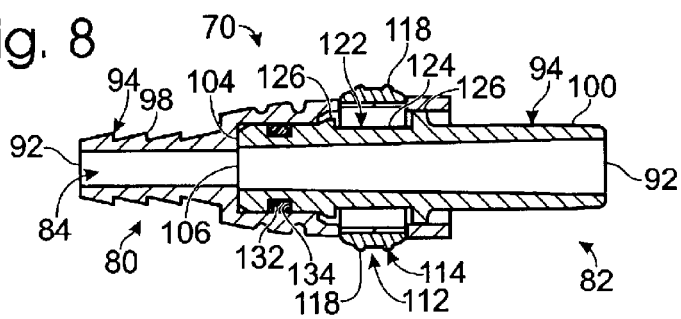
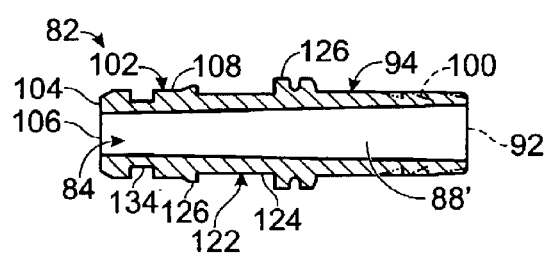
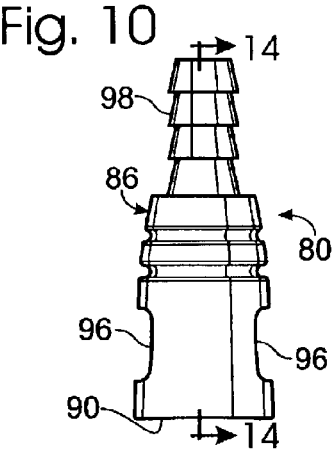
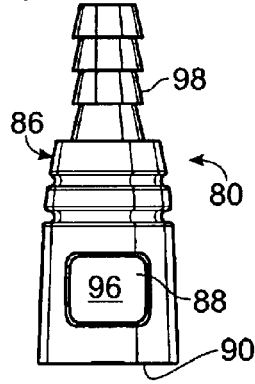
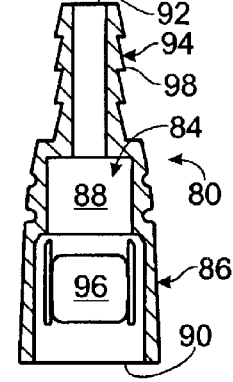
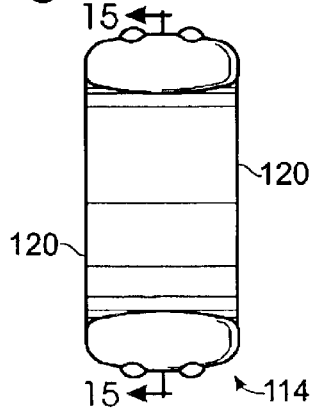
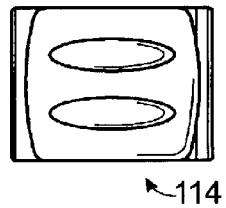
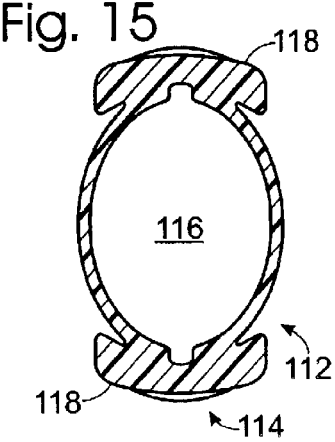

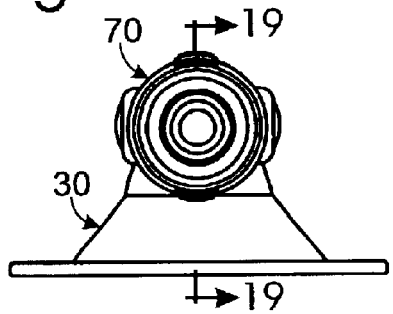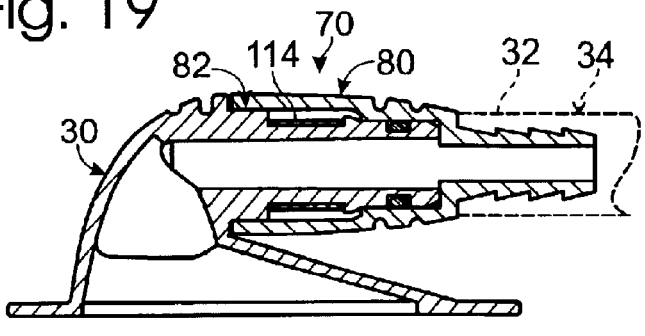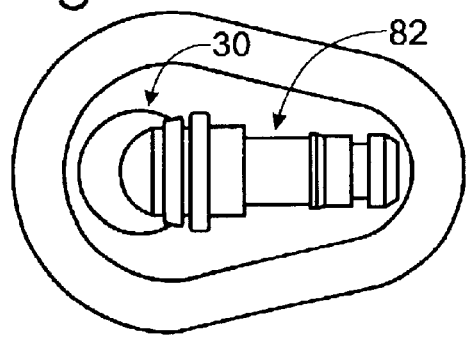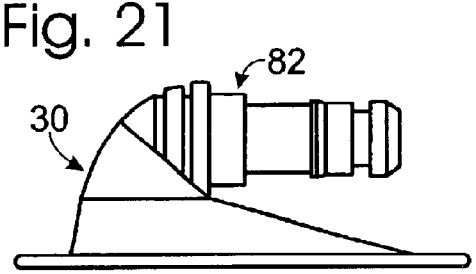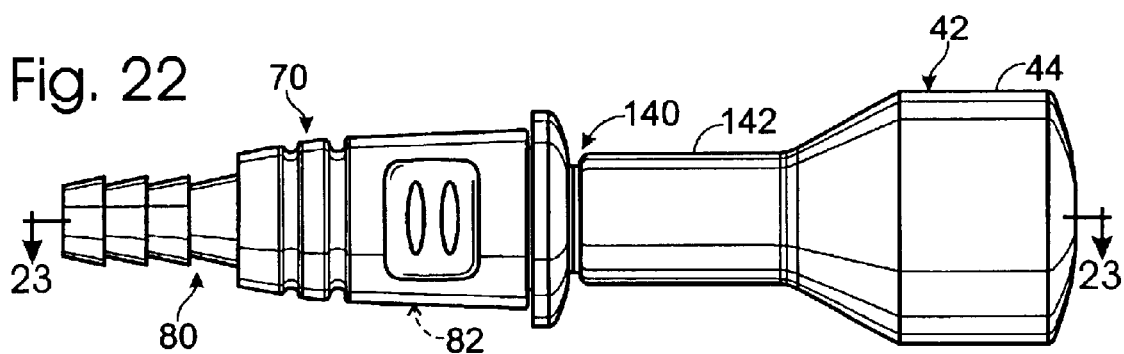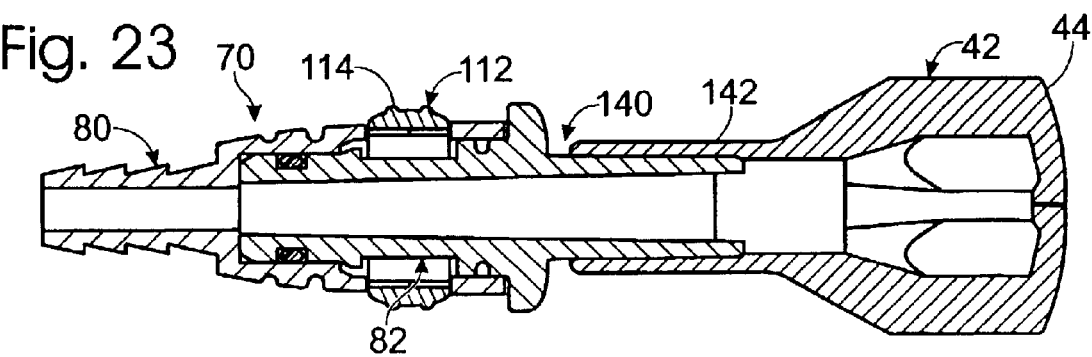

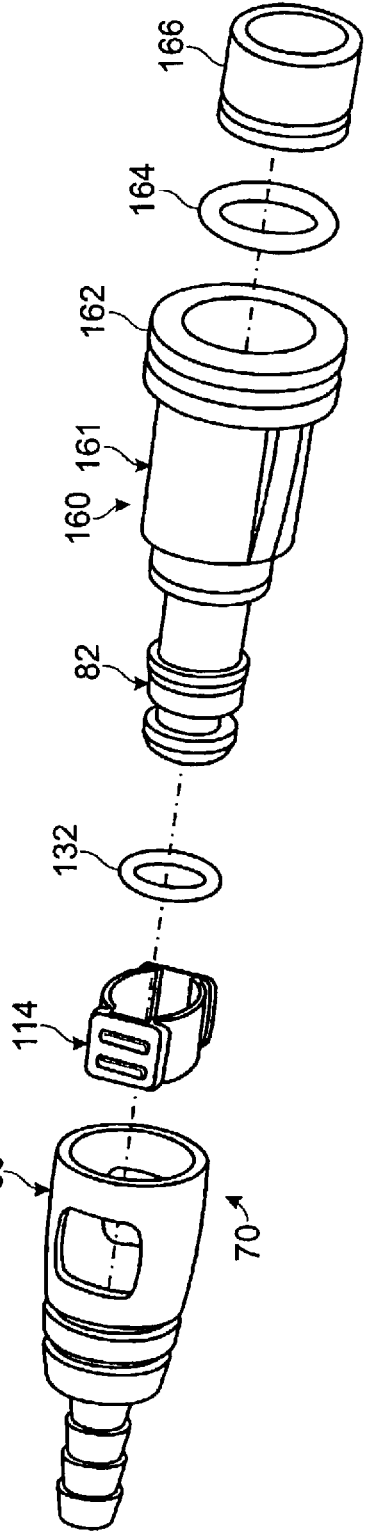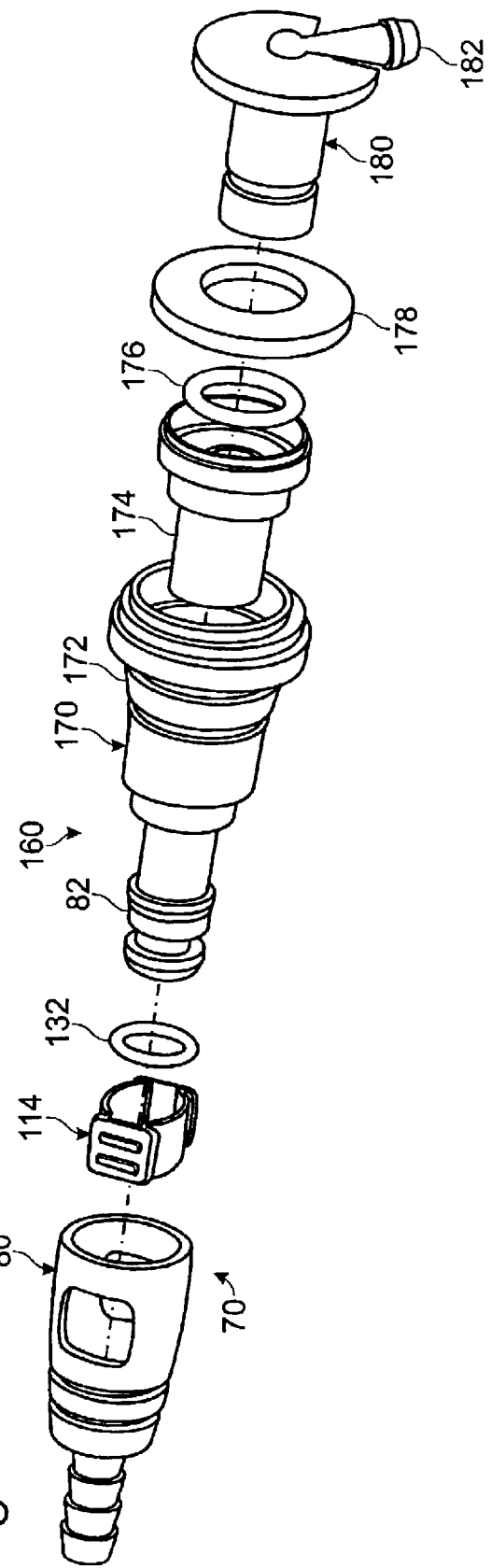

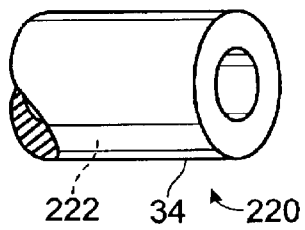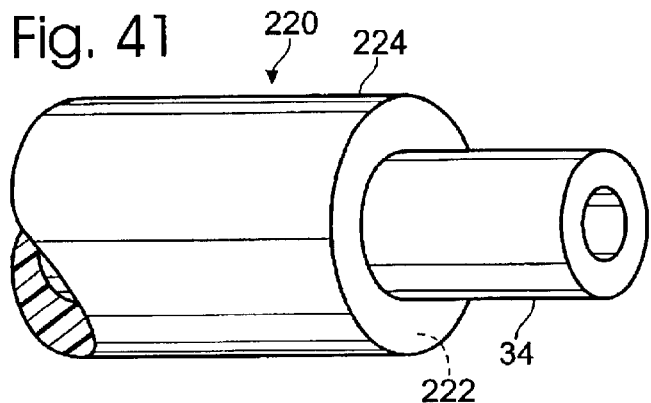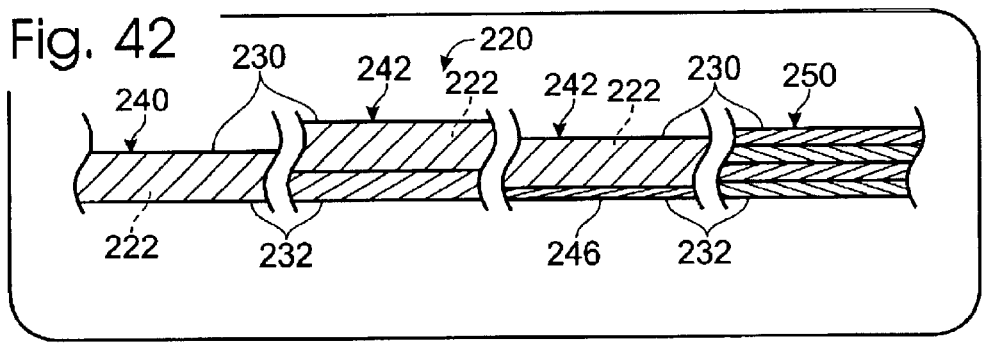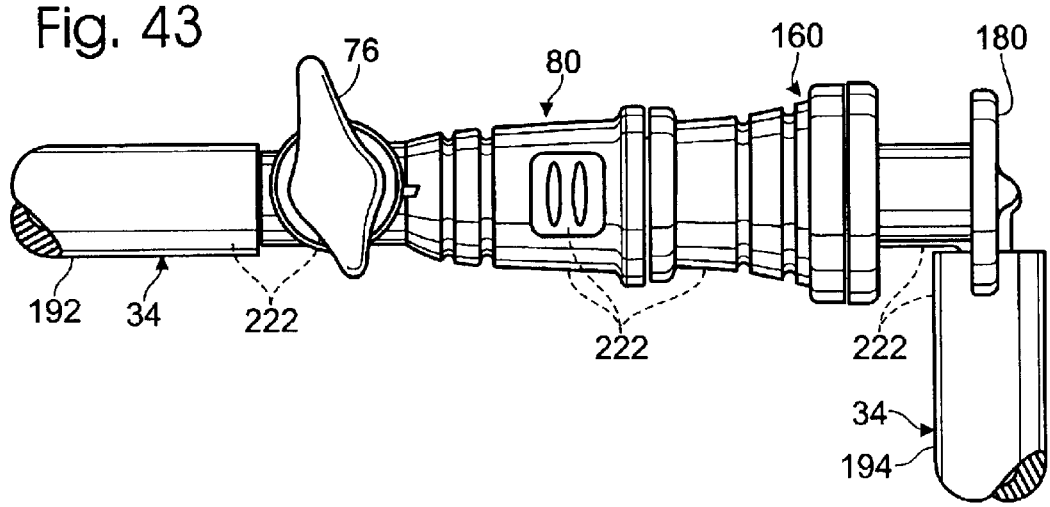

PERSONAL HYDRATION SYSTEM WITH COMPONENT CONNECTIVITY

RELATED APPLICATION

This application claims priority to U.S. Provisional Patent Application Ser. No. 60/328,260, which was filed on Oct. 9, 2001, is entitled "Personal Hydration System with Component Connectivity," and the complete disclosure of which is hereby incorporated by reference.

FIELD OF THE INVENTION

The present invention is directed generally to systems for providing drink fluid to a user, and more specifically, to personal hydration systems with component connectivity.

BACKGROUND OF THE INVENTION

Medical research has demonstrated the importance of maintaining adequate hydration while engaging in strenuous physical activities, such as bicycling or mountain climbing. In the not too distant past, participants in such activities carried their water in bottles or canteens from which they drank periodically. More recently, personal hydration systems have been developed which allow users to drink more or less continuously while engaged in sporting or recreational activities. These personal hydration systems typically have a bag-like fluid reservoir that is carried in a back- or waist-mounted pack. A long flexible tube is connected to the reservoir through an exit port at one end and terminates in a mouthpiece at the other end. The tube is long enough to allow the mouthpiece to be carried in the user's mouth to enable the user to draw water from the reservoir at will. Examples of hydration systems and mouthpieces therefor are disclosed in U.S. Pat. Nos. 5,727,714, 5,060,833, 5,085,349, and 6,070,767, the disclosures of which are hereby incorporated by reference.

Although personal hydration systems have proven to be a great advance over traditional water bottles, they do suffer from some drawbacks. One drawback is that the components of the hydration system downstream from the fluid reservoir tend to be either permanently secured together, or else secured together via a tight friction fit that tends to be difficult to establish or release. Both of these structures provide effective fluid-tight seals. However, neither permits components to be quickly and repeatedly interchanged by a user.

SUMMARY OF THE INVENTION

The present invention is directed to a personal hydration system with component connectivity. The hydration system includes a fluid reservoir that is adapted to receive and contain a volume of drink fluid. The reservoir may be housed within a pack. Drink fluid is drawn from the reservoir through a drink tube that is in fluid communication with the reservoir at one end and with a mouthpiece at the other end. In some embodiments, the drink tube is connected to the reservoir at an exit port. In some embodiments, the hydration system includes a manually actuated on/off valve downstream from the reservoir. In some embodiments, the hydration system includes a bite-actuated mouthpiece. In some embodiments, the drink tube includes more than one length of interconnected tubing. Hydration systems according to the present invention further include a quick-connect assembly that fluidly interconnects components of the hydration system and which is configured to quickly release, and permit reattachment of, the detached components or replacement components. In some embodiments, the replacement components enable different performance from the detached components. In some embodiments, the hydration system includes a quick-connect assembly that is adapted to selectively couple a bite-actuated mouthpiece and a gas mask adapter to the hydration system's drink tube. In some embodiments, at least a portion, if not the entire, hydration system is formed from a chemically resistant material.

Many other features of the present invention will become manifest to those versed in the art upon making reference to the detailed description which follows and the accompanying sheets of drawings in which preferred embodiments incorporating the principles of this invention are disclosed as illustrative examples only. Dimensions in the drawings are shown for purposes of illustration, but dimensions other than those shown may be used and are within the scope of the present invention.

BRIEF DESCRIPTION OF THE DRAWINGS

FIG. 4 is a side elevation view of a personal hydration system that includes a pack and illustrates schematically another quick-connect assembly according to the present invention.

FIG. 5 is a front elevation view of another personal hydration system that includes a back-mounted pack and schematically illustrates quick-connect assemblies according to the present invention.

FIG. 6 is a front elevation view of a personal hydration system that includes a waist-mounted pack and another schematic quick-connect assembly according to the present invention.

FIG. 7 is an exploded isometric view of a quick-connect assembly constructed according to the present invention.

FIG. 8 is a cross-sectional view showing another version of the assembly of FIG. 7 in its locked configuration.

FIG. 9 is a cross-sectional view of the male member of the assembly of FIG. 7.

FIG. 10 is a top plan view of the female member of FIG. 7.

FIG. 11 is a side elevation view of the female member of FIG. 7.

FIG. 12 is a cross-sectional view of the female member of FIG. 7 taken along the line 12—12 in FIG. 10.

FIG. 13 is a side elevation view of the lock ring of FIG. 7.

FIG. 14 is a top plan view of the lock ring of FIG. 13.

FIG. 15 is a cross-sectional view of the lock ring of FIG. 13 taken along the line 15–15 in FIG. 13.

FIG. 16 is an exploded isometric view of a quick-connect assembly integrated with an exit port.

FIG. 17 is an assembled isometric view of the assembly and the exit port of FIG. 16.

FIG. 18 is an end elevation view of the assembly and the exit port of FIG. 16.

FIG. 19 is a cross-sectional view of the assembly and the exit port of FIG. 18 taken along line 19—19 in FIG. 18 and showing a fragmentary end of an attached drink tube in dashed lines.

FIG. 20 is a top plan view of the exit port and the male member of the quick-connect assembly of FIG. 16.

FIG. 21 is a side elevation view of the exit port and the male member of the quick-connect assembly of FIG. 16.

FIG. 22 is a side elevation view of the assembly of FIG. 7 with a bite-actuated mouthpiece mounted thereupon.

FIG. 23 is cross-sectional view of the assembly and the mouthpiece of FIG. 22 taken along the line 23—23 in FIG. 22.

FIG. 33 is an exploded isometric view of a quick-connect assembly with an integrated gas mask fitting.

FIG. 35 is an exploded isometric view of a quick-connect assembly with another integrated gas mask fitting.

FIG. 40 is a fragmentary isometric view showing a chemically resistant component that may be used with quick-connect assemblies according to the present invention.

FIG. 41 is a fragmentary isometric view showing another chemically resistant component that may be used with quick-connect assemblies according to the present invention.

FIG. 42 is a fragmentary, schematic view of illustrative chemically resistant components that may be used with quick-connect assemblies according to the present invention.

FIG. 43 is a fragmentary side elevation view of a chemically resistant quick-connect assembly and drink tube according to the present invention.

DETAILED DESCRIPTION AND BEST MODE OF THE INVENTION

Figure 1:
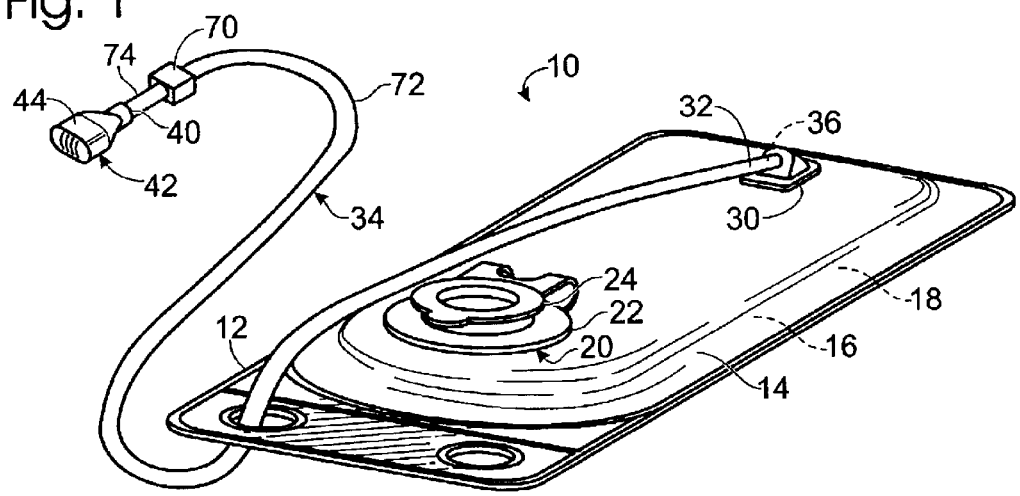
FIG. 1 is an isometric view of a personal hydration system that includes a schematic representation of a quick-connect assembly according to the present invention.
Figure 2:
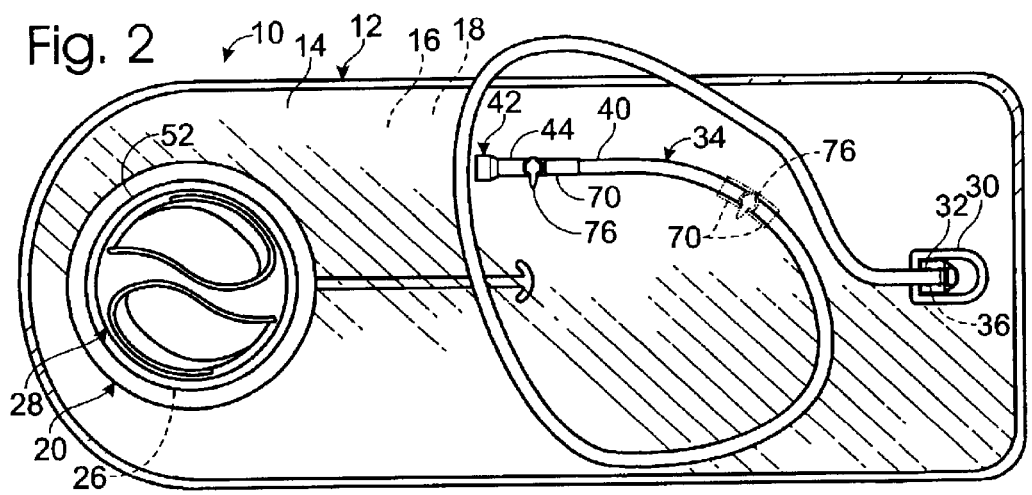
FIG. 2 is a top plan view of a personal hydration system with schematic representations of several different quick-connect assemblies according to the present invention.
Figure 3:
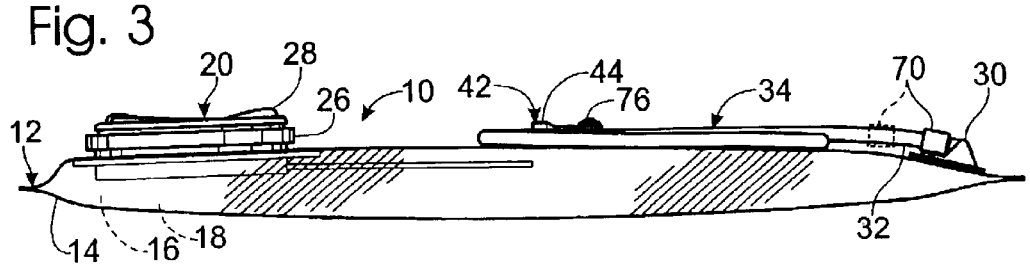
FIG. 3 is a side elevation view of the personal hydration system of FIG. 2 showing additional schematic representations of quick-connect assemblies according to the present invention.

Illustrative examples of personal hydration systems are shown in FIGS. 1–3 and generally indicated at 10. System 10 includes a fluid reservoir, or bladder, 12 for storing potable drink fluid, such as water, sports drinks, juice, etc. Reservoir 12 includes a body portion 14 with an internal compartment 16, which is adapted to store a volume of drink fluid 18. Typically, compartment 16 will hold at least 24 ounces, and it may hold as much as 32 ounces, 50 ounces, 70 ounces, 100 ounces, 200 ounces or more of drink fluid 18. Reservoir 12 is preferably flexible, with at least a region, if not the entirety, of body portion 14 and/or reservoir 12, being formed from a flexible, waterproof material. An example of a suitable material is polyurethane, although others may be used.

Reservoir 12 may vary in shape and size within the scope of the invention, such as depending upon on the volume of fluid to be carried by the user and the intended use of the hydration system. For example, and as discussed in more detail below, hydration systems according to the present invention may (but are not required to) include a pack into which the reservoir is permanently or removably housed. In such an embodiment, the reservoir will be sized to fit within the pack, and the pack will typically include one or more straps that are configured and sized to extend around a portion of a user's body, such as the user's shoulder(s) or waist. Some hydration systems are adapted to be received or otherwise carried within a user's clothing or on a device, such as a bicycle, that is proximate a user while the user is engaged in a particular activity. In such an embodiment, the clothing or device will typically include a sleeve or other mount sized to receive the hydration system and/or the hydration system will typically include one or more suitable mounts for securing the reservoir to the device or within a user's clothing.

Reservoir 12 includes an input port 20 through which the reservoir is charged with a volume of potable drink fluid. Illustrative examples of suitable input ports 20 are shown in FIGS. 1–3. For example, in FIG. 1 port 20 takes the form of a sealable filler spout 22 with a cap 24 that is selectively secured to the spout through a friction fit. In this configuration, the cap is pressed directly onto the spout to establish a frictional seal therebetween. In FIGS. 2 and 3, port 20 takes the form of a threaded neck 26 upon which a threaded cap 28 is threadingly engaged to seal the opening in the neck. Other examples include a reservoir that is sealed by folding or otherwise interlocking or compressing opposed surfaces of the reservoir together to close an opening formed in the reservoir.

Reservoir 12 also includes an exit port, or output port, 30 through which drink fluid is drawn from compartment 16 for delivery to a user. As shown in FIGS. 1–3, an end 32 of an elongate, flexible drink tube, or tube assembly, 34 is mounted or otherwise fluidly connected to port 30. As used herein, the term "tube assembly" may refer to a single length of tubing that defines a fluid conduit for drink fluid drawn from reservoir 12, as well as to a plurality of interconnected lengths of tubing. Tube assembly 34 is of sufficient length to extend from reservoir 12 to the user's mouth when the system is worn by the user, such as on the user's back or waist. End 32 may be removably attached to port 30, or may be integrally formed or permanently mounted thereupon. For example, as shown in FIGS. 1 and 2, exit port 30 is mounted on body 14 and includes a fitting, or mount, 36 to which end 32 is secured. It is within the scope of the invention that exit port 30 may have a variety of configurations, including an embodiment in which exit port 30 includes an aperture in body 14 through which end 32 is inserted. An illustrative example of a suitable exit port is disclosed in U.S. Pat. No. 5,727,714, the complete disclosure of which is hereby incorporated by reference for all purposes, but any suitable structure that enables the drink tube to be fluidly coupled to the compartment of reservoir 12 may be used.

The other end 40 of tube assembly 34 is adapted to provide fluid 18 that is drawn from compartment 16 through exit port 30 and tube assembly 34 to a user's mouth. A mouthpiece 42 is typically coupled with end 40 of tube assembly 34, such that tube assembly 34 is in fluid communication with mouthpiece 42. Mouthpiece 42 may be removable from tube assembly 34 or alternatively may be integrated with tube assembly 34. For example, mouthpiece 42 may simply be the end 40 of tube assembly 34 distal output port 30, the output of the subsequently described quick-connect assembly, an output from a mouthpiece or other structure mounted on the subsequently described quick-connect assembly, or structure that is removably or permanently attached to end 40. As used herein, components of the hydration system that extend from the reservoir and through which drink fluid drawn through exit port 30 flows may be referred to as being downstream from the reservoir. Accordingly, the exit port and other elements of the hydration system downstream from the reservoir may be referred to as the downstream assembly of the hydration system.

An example of a mouthpiece 42 is a bite-actuated, or mouth-actuated, mouthpiece 44 that it is selectively deformed from a sealed (or closed) position, in which fluid is prevented from being dispensed from the mouthpiece, to a dispensing (or open) position, in which the user may draw fluid from the reservoir through the tube and mouthpiece when the user compresses the mouthpiece with the user's teeth or lips. Bite-actuated mouthpieces are often biased or otherwise configured to automatically return to the closed position when a user is not exerting force upon the mouthpiece to configure the mouthpiece to its closed position. Examples of suitable bite-actuated mouthpieces are disclosed in U.S. Pat. Nos. 6,070,767, 5,727,714, 5,085,349 and 5,060,833, the complete disclosures of which are hereby incorporated by reference.

As shown in FIGS. 4–6, system 10 may include a pack 50 within which reservoir 12 is permanently or removably housed. Pack 50 typically is adapted to be worn on a user's body. For example, the pack shown in FIGS. 4 and 5 includes a pair of shoulder straps 52 for mounting the pack on a user's back or chest. Although a pair of straps 52 is shown in FIGS. 4 and 5, it is within the scope of the invention that only a single strap may be used, such as to extend diagonally across a user's torso or over a selected one of the user's shoulders. As a further example, pack 50 is shown in FIG. 6 including waist straps 54 that are adapted to secure the pack around a user's waist. Straps 52 and 54 may be formed from one or more segments that are adapted to define (alone or with the pack) a closed perimeter, such as to encircle a portion of a user's body. It is further within the scope of the invention that pack 50 may include one or more waist straps and one or more shoulder straps, or as discussed herein, no straps at all.

In FIGS. 4–6, it can be seen that pack 50 includes an opening 56 through which reservoir 12 may be selectively inserted and removed from a storage compartment 58 within the pack. It should be understood that packs into which reservoirs are permanently mounted may be formed without such an opening. Pack 50 may be adapted to hold items in addition to reservoir 12. For example, in FIGS. 4 and 6, pack 50 is shown including one or more pockets 60. Similarly, compartment 58 may be sized so that it is sufficiently larger than reservoir 12 that other items may be stored within the compartment. Additionally or alternatively, pack 50 may include one or more internal compartments that are adapted to hold items other than reservoir 12.

Examples of hydration systems and mouthpieces therefor are disclosed in the above-identified and incorporated U.S. patents, as well as in pending U.S. patent application Ser. Nos. 09/902,935 and 09/902,792, the disclosures of which are also hereby incorporated by reference for all purposes. It is within the scope of the invention that hydration system 10 may be formed without a pack. For example, hydration systems that are designed to be received within a user's clothing may be formed without a pack. Similarly, a hydration system may be added as an accessory to a pack, such as a backpack, knapsack or fanny pack, that is not specifically configured to receive that hydration system.

Personal hydration systems according to the present invention further include at least one quick-connect assembly 70. Assembly 70 is adapted to fluidly and mechanically interconnect portions of the hydration system downstream (toward mouthpiece 42) from reservoir 12. Assembly 70 enables the interconnected components to be quickly and repeatedly coupled together and released from engagement without requiring the time or effort required with conventional hydration system components. As such, the quick-connect assembly may also be described as a quick connect/disconnect assembly, or quick coupling assembly. As described in more detail herein, the quick-connect assembly includes at least a pair of members that are configured to be fluidly connected with adjacent components of a hydration system. The members are further adapted to selectively and releasably interconnect with each other, such as by being releasably secured together by a lock member of the assembly.

In FIGS. 1–6, various illustrative placements for assembly 70 are schematically illustrated. For example, in FIG. 1, assembly 70 is shown interconnecting adjacent lengths 72 and 74 of tubing forming tube assembly 34. In FIG. 2, assembly 70 is shown interconnecting end 40 of tube assembly 34 with a manually operated on/off valve 76. In FIG. 2, valve 76 and assembly 70 are shown in solid lines proximate mouthpiece 42, in what may be referred to as an end-of-line configuration. However, it is within the scope of the invention that an in-line configuration may be used as well, as illustrated in dashed lines in FIG. 2. Similarly, a pair of assemblies 70 is shown in dashed lines in FIG. 2 to schematically represent that the assembly may be located on either, or both, sides of valve 76. In FIG. 3, assembly 70 is shown in solid lines interconnecting end 32 of tube assembly 34 with exit port 30, and in dashed lines in another in-line configuration. In FIG. 4, assembly 70 is shown interconnecting end 40 and mouthpiece 42.

Assembly 70 includes at least one mount to which a component of hydration system 10 is fluidly interconnected so that drink fluid drawn from reservoir 12 may flow through a fluid conduit defined at least partially by the assembly. When assembly 70 is configured for in-line operation, it will typically include a pair of generally opposed mounts, one for establishing a fluid interconnection with a portion of the hydration system downstream from the reservoir and upstream from the quick-connect assembly, and another for establishing a fluid interconnection with a portion of the hydration system downstream from the quick-connect assembly. As used herein, the term "fluid communication" refers to elements between which drink fluid may flow, and the terms "fluidly connected," "fluidly interconnected," and the like are used to refer to components that are coupled together and between which drink fluid may flow. Illustrative examples of components that may be connected upstream relative to the quick-connect assembly include exit port 30, a length of tube assembly 34, and an on/off valve. Illustrative examples of components that may be connected downstream relative to the quick-connect assembly include an on/off valve, length of tube assembly 34, and mouthpiece 42.

It is also within the scope of the invention that assembly 70 may include at least one component integrated therewith. By this it is meant that the component may be at least partially integrally formed with a portion of assembly 70, such as by sharing a common housing, and/or that the component is permanently mounted or otherwise secured to the assembly such that the component is not designed or configured to be repeatedly removed from and reattached to the assembly. Illustrative and non-exclusive examples of components that may be integrated with the assembly include mouthpiece 42, exit port 30 and on/off valve 76. This integration of components with assembly 70 is schematically illustrated in FIGS. 5 and 6, with assemblies 70 respectively including exit port 30 and on/off valve 76 in FIG. 5, and mouthpiece 42 in FIG. 6. As a further variation, assembly 70 may be integrated with a fitting that is configured to interchangeably receive a component of the hydration system or a device to which the hydration system will be coupled.

An example of a quick-connect assembly 70 that is constructed according to the present invention is shown in FIGS. 7 and 8. As shown, assembly 70 includes female and male members 80 and 82 that are configured to releasably engage each other to establish a mechanical interconnection therebetween. Members 80 and 82 also define a fluid conduit 84 that extends through the members to enable drink fluid that is drawn from reservoir 12 to be drawn through the members, either for dispensing directly to a user or to components of the hydration system that are attached to assembly 70 and extend downstream therefrom. Members 80 and 82 are configured to be quickly and repeatedly released from engagement with each other, such as when a user depresses a release member, which is discussed in more detail subsequently. Members 80 and 82 may also be described as female coupling members and male coupling members, respectively.

Female member 80 includes a body 86 that defines a central cavity 88. As perhaps best seen in FIG. 12, cavity 88 forms part of a fluid conduit 84, which extends through female member 80 from an opening 90 to a corresponding opening 92 in a distal region 94. Opening 90 is sized to receive at least the tip of the subsequently described male member. In the illustrated embodiment, region 94 is generally opposed to opening 90 and is in fluid communication therewith such that drink fluid that enters cavity 88 through a first one of openings 90 or 92 may flow through the cavity and exit the cavity through the other one of the openings. Body 86 also includes at least one lateral aperture 96. As shown in FIGS. 7–8 and 10–12, a pair of apertures 96 is shown, but it is within the scope of the invention that more or less apertures may be used, such as a single aperture or multiple apertures.

Region 94 includes either a mount or a component of the hydration system. In FIG. 7, female member 80 is shown with a region 94 in the form of a barbed mount 98 for tube assembly 34. It is within the scope of the invention that region 94 and/or mount 98 may have other configurations. For example, when region 94 takes the form of a mount 98 for a length of tubing forming a part of tube assembly 34, the mount should be configured so that the tubing may be coupled thereto to form a fluid-tight seal, and preferably retained upon the mount with sufficient force so that the tubing is not inadvertently removed from the mount. In the illustrated embodiment shown in FIGS. 7–8 and 10–12, the tubing is stretched over mount 98, but it is also within the scope of the invention that the tubing may be inserted into a bore in the mount and/or that the mount extends both internal and external the tubing. As a further example, and as discussed in more detail herein, region 94 may also include a mount for exit port 30, mouthpiece 42, on/off valve 76, or other components of the hydration system, and/or may include any of these components integrated therewith.

As shown in FIGS. 7–9, male member 82 also includes a region 94 that may have any of the configurations, elements and variations as the corresponding region 94 described with respect to the female member. For the purposes of illustrating additional suitable configurations, region 94 is illustrated as a mount 100 that does not include barbs. Mount 100 may receive mouthpiece 42 or a length of tubing, similar to mount 98. In dashed lines in FIG. 9, mount 100 is shown with a barbed fitting to provide a graphical illustration of this version of male member 82. With reference to FIG. 9, it can be seen that male member 82 further includes a shaft 102 with a tip 104 that is adapted to be inserted through the opening in a corresponding female member. In the illustrated embodiment, tip 104 is externally tapered, or beveled, but this configuration is not required. Male member 82 also includes a cavity 88' that defines a portion of fluid conduit 84, and which extends from an opening 92 in region 94 and at least partially through shaft 102 to another opening 106. In the illustrated embodiment, opening 106 is formed in tip 104, but it is within the scope of the invention that shaft 102 may additionally or alternatively include one or more openings that extend through the sidewalls 108 of shaft 102. As perhaps best seen in FIGS. 7 and 8, drink fluid that flows through the quick-connect assembly enters and exits the assembly through openings 92. Accordingly, the openings may also be referred to as ports. It should be understood that the respectively ports may form entry ports or exit ports depending upon the fluid flow orientation of the male and female members relative to the reservoir.

In FIGS. 7 and 8, regions 94 are depicted defining a linear fluid conduit 84 extending therebetween. It is within the scope of the invention, and the description of the regions being generally opposed to each other, that the regions may define a non-linear fluid conduit that extends therebetween, or a fluid conduit that includes both linear and non-linear portions. For example, regions 94 may extend at angles of less than 180° relative to the long axes of the portions of the fluid conduit defined thereby. For example, the regions may extend at angles in the range of 15–165°, 30–150°, 45–135°, 90°, etc. Because the male and female members are configured to be coupled together in an at least partially overlapping (or nested) configuration, the portion of the male member 82 that is inserted into opening 90 of female member 80 will typically be complimentarily configured with the corresponding portion of female member 80 to establish a fluid-tight connection therebetween.

In FIG. 7, assembly 70 further includes a lock member 112, which is adapted to mechanically and releasably secure the male and female members together. In the illustrated embodiment, lock member 112 takes the form of a lock ring 114, which includes a central passage 116 and at least one ear, or projecting member, 118 extending generally away from the passage. Passage 116 is sized so that tip 104 and at least a portion of shaft 102 of male member 82 may be inserted therethrough. In FIG. 7, a pair of projecting members 118 is shown, with each of the projecting members being sized to extend into a corresponding one of the apertures 96 in female member 80. Typically, the number of projecting members 118 will be at least as great as the number of apertures 96. Additional views of lock ring 114 are shown in FIGS. 13–15.

In operation, lock ring 114 is positioned within cavity 88 of female member 80, with a projecting member 118 extending into and optionally at least partially through each of the apertures 96. In the configuration shown in FIG. 7, lock ring 114 may be described as being in its neutral, unlocked, or disconnected configuration. As shown, passage 116 has a generally elliptical or oval-shaped configuration, with its openings 120 being generally aligned with opening 90.

To couple the male and female members together, the tip of the male member is inserted into and through the passage until the lock ring is seated upon a corresponding mount 122 on the shaft, such as shown in FIG. 8. As shown in FIGS. 7–9, mount 122 includes a region 124 of reduced cross-sectional area that is bounded with a region 126 of greater cross-sectional area on at least the side extending toward tip 104. As the tip is inserted into the passage, lock ring 114 deforms from its neutral configuration to a configuration in which passage 116 has a generally circular configuration defined largely by the shape of shaft 102. In this position, lock ring 114 and assembly 70 may be described as being in an intermediate configuration. More specifically, the female and male members may be frictionally retained together, but the members are not yet locked together to prevent forces upon the upstream or downstream components from causing the members to disconnect from each other, and/or to establish a fluid-tight seal between the members. Ring 114 is formed from a resilient, yet deflectable, material so that the ring is at all times biased to return toward its neutral configuration. An example of a suitable material is an acetal polymer, such as Delrin® 500, which is sold by DuPont. After region 126 passes through passage 116, the ring is seated upon region 124, thereby securing the female and male members together. In this position, lock ring 114 and assembly 70 may be described as being in their locked configurations. Although not required, it is within the scope of the invention that the male and female members may be rotated relative to each other while in this configuration without impairing the fluid-tight seal established by the members and lock ring 114.

To disconnect assembly 70, a user depresses at least one of projecting members 118 to urge the lock ring toward its intermediate configuration, and more specifically, to deflect lock ring 114 to a configuration in which shaft 102 may be withdrawn through the passage. Accordingly, projecting members 118 may also be referred to as release members. After the shaft is removed and the user-imparted forces are removed, the lock ring returns automatically to its neutral configuration.

As discussed, tip 104 of shaft 102 may be beveled. This configuration facilitates the alignment and insertion of the shaft into passage 116. This configuration may additionally or alternatively be described as enabling the assembly to be secured together without requiring a user to depress members 118 and thereby deform the lock ring so that the shaft may be inserted through passage 116. Instead, the force of tip 104 being urged against opening 120 of passage 116 deflects the passage to its intermediate configuration, as well as correcting any misalignment of the shaft relative to the passage. As such, quick-connect assembly 70 may also be referred to as a plug-in connector, and may be connected and disconnected without requiring a user to use both hands, although two-handed operation is also within the scope of the invention. When the male and female members of quick-connect assembly 70 are adapted to be coupled together merely by inserting the male member into the female member until the lock ring engages and retains the male member, the quick-connect assembly may be described as being configured to automatically couple the members together upon insertion of the male member.

Also shown in FIG. 7 is a seal member 130 in the form of an O-ring 132, which may be used to enhance the fluid seal established by assembly 70. It is within the scope of the invention that seal member 130 may take other forms, including being integral with members 80, 82 and/or lock member 112, and that more than one seal member may be used. In the illustrated configuration, shaft 102 includes a channel 134 into which O-ring 132 is seated. It is within the scope of the present invention that the O-ring may be seated within female member 80 instead of being mounted on male member 82, that both members may include a seal member, and that neither member may include a seal member other than the mating surfaces of the members themselves. These variations and alternatives apply to all of the O-rings and other seal members described and illustrated herein.

As discussed previously, assembly 70 may include at least one other component of hydration system 10 at least partially integrated therewith. An example of such a configuration is shown in FIGS. 16–21 in which the assembly includes an integrated exit port 30. More specifically, in the illustrated embodiment, male member 82 and exit port 30 have been integrated together. It is within the scope of the invention that a female member 80 may alternatively be integrated with exit port 30. Similarly, the following discussion and illustrative figures demonstrate various other embodiments of quick-connect assemblies according to the present invention that also include other components and/or specialized mounts integrated therewith. It is within the scope of the invention that the illustrative pairings of male and female members with the mounts and/or other integrated components are presented for the purpose of illustrating exemplary configurations and that the pairings may be reversed without departing from the scope of the invention.

In FIGS. 22 and 23, male member 82 is shown integrated with a fitting, or mount, 140 that is sized to receive a bite-actuated mouthpiece 44. Mouthpiece 44 is formed from a deformable material, such as silicone, and includes a neck 142 that is stretched around fitting 140. It within the scope of the invention that fitting 140 may be integrated with female member 80 instead of male member 82. Similarly, fitting 140 and mouthpiece 44 may have other configurations without departing from the scope of the invention.

Figure 24:
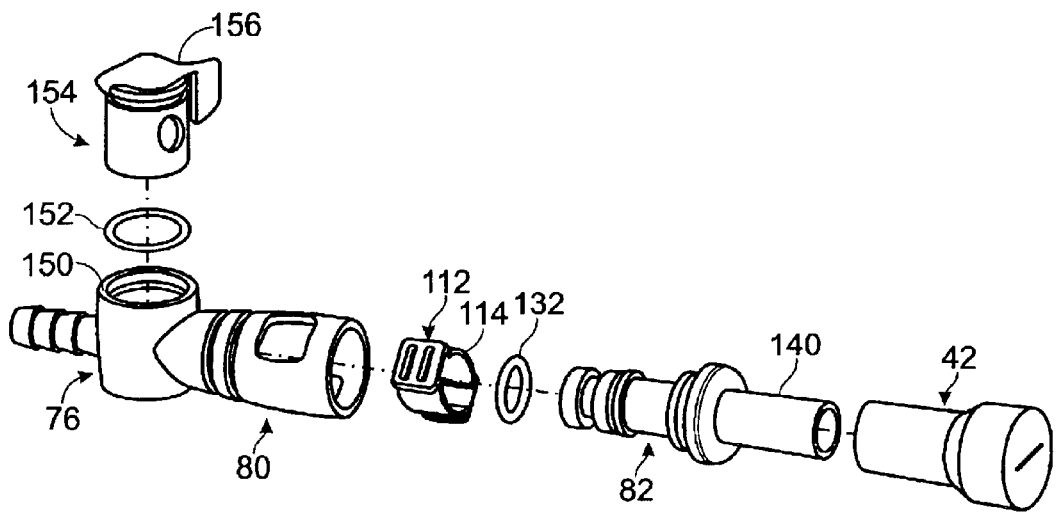
FIG. 24 is an exploded isometric view of a quick-connect assembly with an integrated on/off valve.
Figure 25:
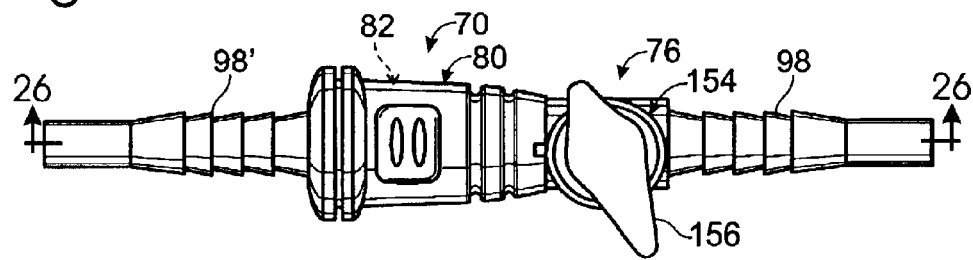
FIG. 25 is a top plan view of the assembly of FIG. 24 with the ends of the assembly adapted to receive lengths of drink tube.
Figure 26:
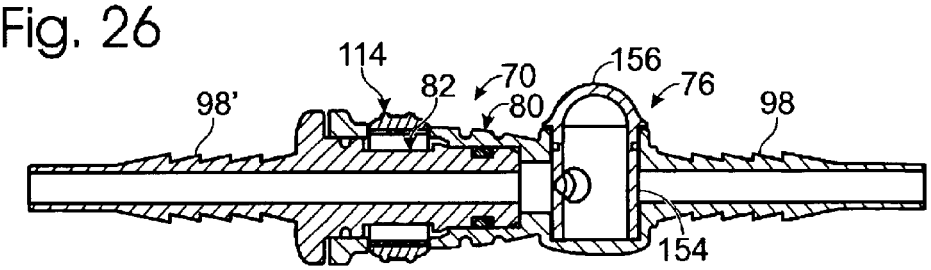
FIG. 26 is a cross-sectional view of the assembly of FIG. 25 taken along the line 26—26 in FIG. 25.

In FIGS. 24–26, female member 80 is shown integrated with on/off valve 76. To illustrate that assembly 70 may include more than one integrated component, in FIG. 24, male member 82 is also shown integrated with a fitting 140 and in FIGS. 25 and 26, male member 82 is also shown integrated with a mount 98. Valve 76 is adapted to obstruct or permit the flow of drink fluid therethrough depending upon the relative configuration of the valve. When the valve is configured to its open (on) configuration, drink fluid may flow through the valve, and when the valve is configured to its closed (off) configuration, the valve blocks fluid conduit 84 so that drink fluid cannot flow through the valve. As shown, valve 76 includes a body 150, a seal member 152 and a rotatable core 154 with a handle, or user-manipulable, portion 156. To configure the on/off valve between its open and closed configurations, a user rotates core 154 relative to body 150, such as by using handle 156. Although not required, on/off valves are typically configured to remain in a user-selected configuration until repositioned by the user. Therefore, unlike a bite-actuated mouthpiece that is biased to automatically return to a closed position, on/off valves typically will remain in a selected open or closed configuration until repositioned by a user.

Figure 27:
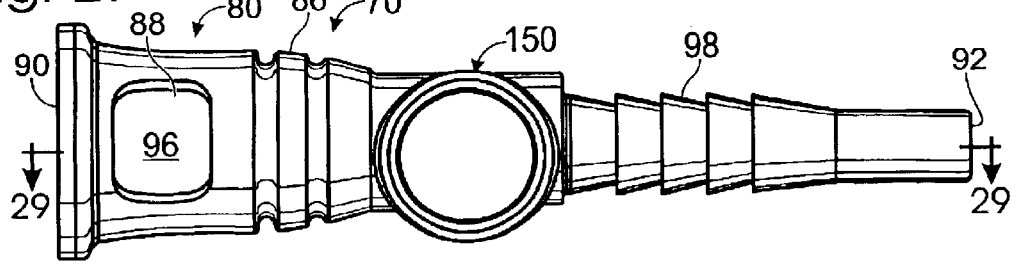
FIG. 27 is a top plan view of the female member and the body of FIG. 24.
Figure 28:
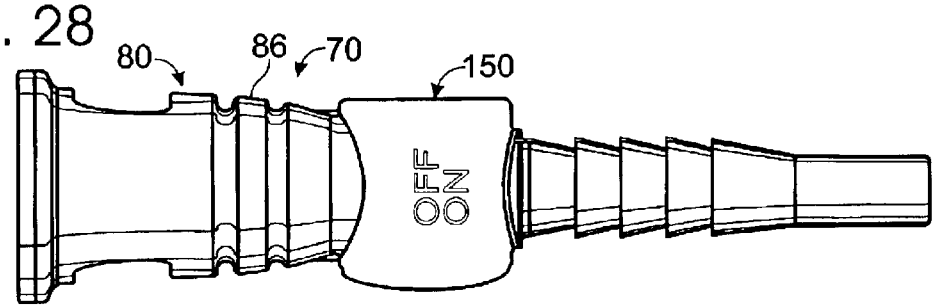
FIG. 28 is a side elevation view of the female member and the body of FIG. 24.
Figure 29:
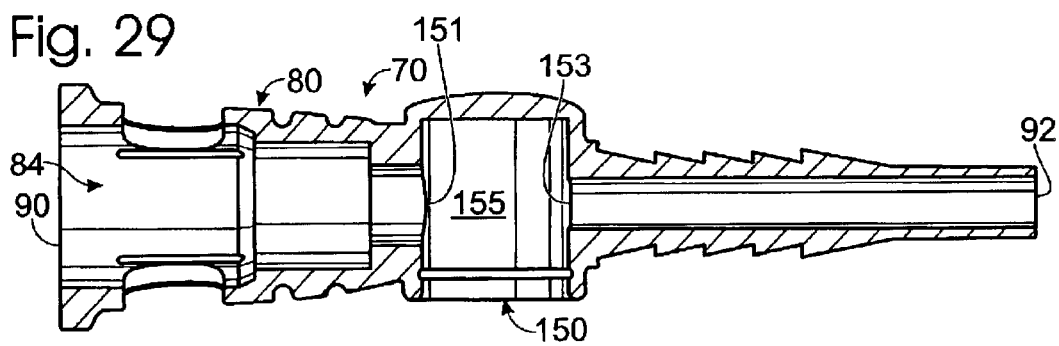
FIG. 29 is a cross-sectional view of the female member and the body of FIG. 24 taken along the line 29—29 in FIG. 27.
Figure 30:
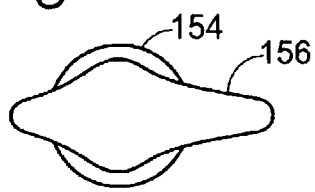
FIG. 30 is a top plan view of the core of the on/off valve of FIG. 24.
Figure 31:
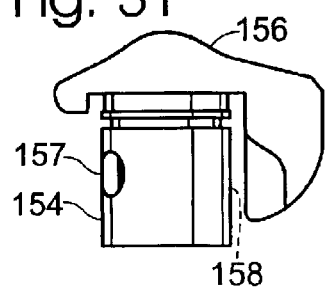
FIG. 31 is a side elevation view of the core of the on/off valve of FIG. 24.

Additional views of female member 80 and body 150 of valve 76 are shown in FIGS. 27–29, and additional views of core 154 are shown in FIGS. 30 and 31. Similar to the previously described quick-connect assemblies, it is within the scope of the invention that the on/off valve may be integrated with the male member instead of the female member. As shown with reference to FIGS. 29 and 31, the body 150 of on/off valve 76 includes apertures 151 and 153 through which drink fluid in fluid conduit 84 may flow into and be removed from a chamber, or cavity, 155 into which at least a portion of core 154 extends when the on/off valve is assembled. As shown in FIG. 31, core 154 also includes at least a corresponding pair of apertures 157 and 158 that selectively align with the apertures in the body depending upon the relative rotational position of the core relative to the body. When the apertures at least partially align, drink fluid may flow therethrough, thereby permitting drink fluid to be drawn from the reservoir and dispensed to a user through mouthpiece 42. When the apertures do not overlap, fluid conduit 84 is obstructed and drink fluid cannot flow therethrough.

Figure 32:
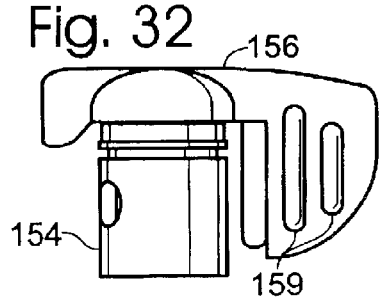
FIG. 32 is a side elevation view of a modified version of the core of the on/off valve of FIG. 24.

Additional examples of suitable on/off valves 76 are disclosed in co-pending U.S. patent application Ser. No. 09/902,792, the disclosure of which is hereby incorporated by reference for all purposes. As discussed, hydration systems with quick-connect assemblies according to the present invention may be formed with an on/off valve that is not integrated with a quick-connect assembly, and/or without an on/off valve. Similarly, valve 76 may include other suitable configurations for selectively restricting the flow of drink fluid from reservoir 12, such as with core portions that are actuated by mechanisms other than by rotating the core relative to the body of the valve. Even when such a configuration is used, variations to the structure shown in FIGS. 24–31 may be used without departing from the invention. For example, core 154 may include a greater or lesser number of apertures. As another example, core 154 may be actuated by a user using a differently configured, or shaped, user-manipulable portion 156. FIG. 32 demonstrates an example of another suitable core 154. As shown, the handle, or user-manipulable portion 156, of the core has been enlarged and includes ribs 159 to enhance gripping of the handle by a user.

Another example of a component that may be attached to tube assembly 34 is a gas mask fitting, which enables a user wearing a gas mask to draw drink fluid from hydration system 10 via a mouthpiece within the gas mask without exposure of the fluid to the external environment. Accordingly, it is within the scope of the invention that either the female or male components of quick-connect assembly 70 may include a mount or fitting that is adapted to couple the hydration system with a gas mask's fluid intake tube. It is further within the scope of the invention that either of members 80 or 82 may include an integrated gas mask fitting.

An example of a quick-connect assembly 70 with an integrated gas mask fitting is shown in FIG. 33. In the illustrated embodiment, the fitting is generally indicated at 161 and is shown integrated with male member 82. It is within the scope of the invention, however, that fitting 160 may alternatively be integrated with female member 80 and/or that the fitting may be coupled to one of the previously described and/or illustrated mounts 98. The illustrated embodiment of fitting 160 is adapted for use with an M-40 gas mask, but it is within the scope of the invention that the particular size and configuration of fitting 160 may vary to conform with the gas mask with which the fitting will be used. As shown in FIG. 33, fitting 161 includes a housing 162 within which a seal member 164 (such as one or more O-rings) and a lock ring 166 are retained.

Figure 36:
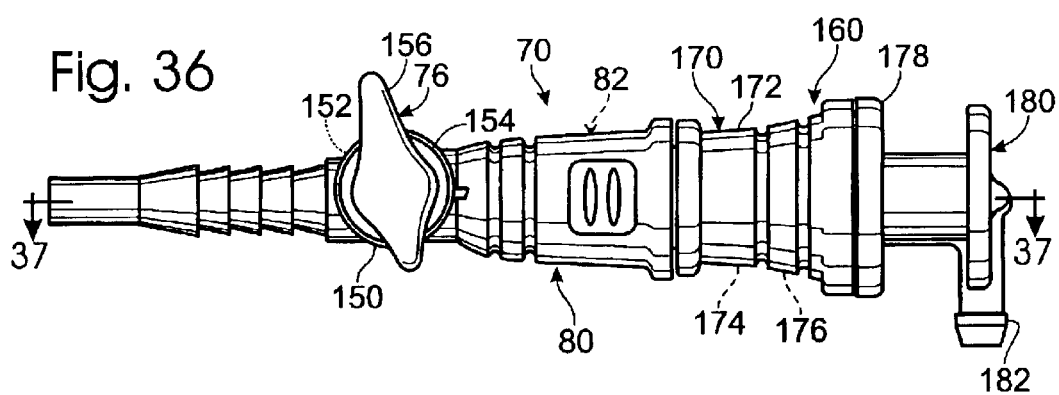
FIG. 36 is a side elevation view of the assembly and the fitting of FIG. 35 further including an on/off valve.
Figure 37:
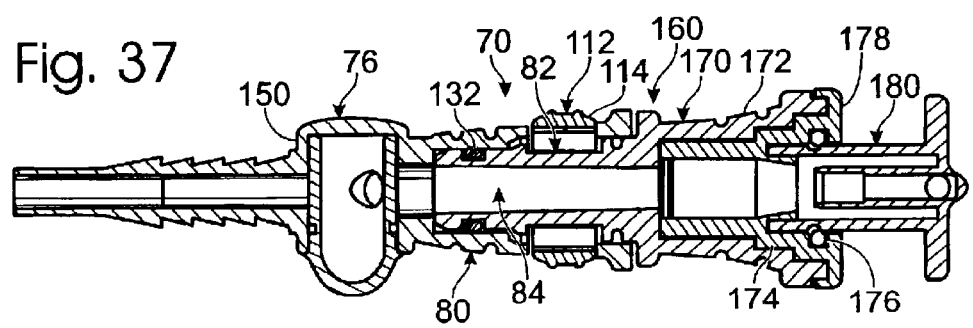
FIG. 37 is a cross-sectional view of the assembly and the fitting of FIG. 35 taken along the line 37—37 in FIG. 36.

In FIG. 35, another assembly is shown with an integrated gas mask fitting 160, which is generally indicated at 170. Fitting 170 is configured for use with AVON™ brand gas masks and includes a housing 172, an insert 174 and a seal member (such as one or more O-rings) 176, which are secured within the housing by a retainer 178. Also shown in FIG. 35 is a coupling member 180 with an output port 182 that is adapted to connect to the fluid-intake tube of a gas mask. Fittings 160 may also include a valve assembly that is adapted to automatically stop the flow of fluid therethrough when the fitting is not coupled to a gas mask's fluid-intake tube. In FIGS. 36 and 37, assembly 70 is shown including both a gas mask fitting and an on/off valve 76 to provide further examples of a quick-connect assembly with more then one integrated component.

Figure 38:
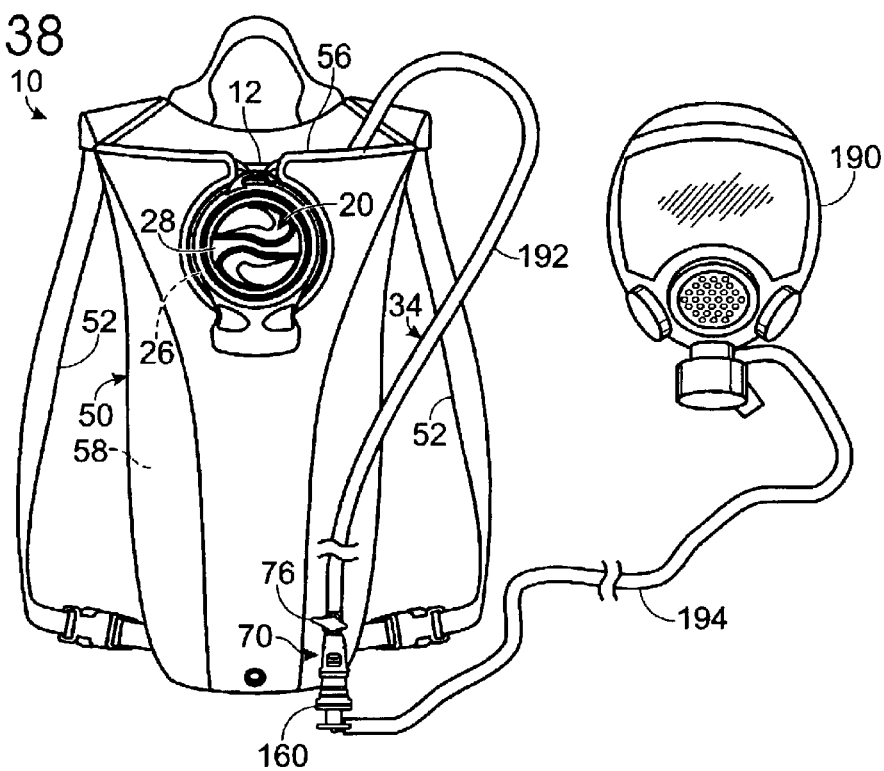
FIG. 38 is a side elevation view of a hydration system that includes a quick-connect assembly according to the present invention and which is fluidly interconnected with a gas mask.

FIG. 38 provides an example of a hydration system 10 that includes a quick-connect assembly 70 with an integrated gas mask fitting 160 and which is fluidly interconnected with a gas mask 190. It should be understood that gas mask 190 has been somewhat schematically illustrated in FIG. 38 and that mask 190 is intended to graphically represent any suitable gas mask, including gas masks that cover primarily a user's nose and mouth, gas masks that cover a user's face, and gas masks that cover a user's entire head. Regardless of the configuration, mask 190 is adapted to provide drink fluid from reservoir 12 to the user's mouth without exposing the drink fluid to the environment outside of the hydration system and gas mask. In the illustrated embodiment, tube assembly 34 may be described as including a length 192 of flexible tubing that fluidly interconnects the exit port of the hydration system's reservoir with quick-connect assembly 70 and a length 194 of tubing that fluidly interconnects assembly 70 and gas mask 190. Length 194 may be the intake tube of the gas mask or may be fluidly interconnected with the intake tube of the gas mask. Each of these lengths of tubing may be comprised of one or more fluidly interconnected tube portions.

As discussed, hydration systems that include quick-connect assemblies enable components of the hydration system to be quickly and fluidly interconnected together or released from an existing fluid interconnection. As the preceding drawings demonstrate, it is within the scope of the invention that at least one of the male or female members of quick-connect assemblies according to the present invention may be configured to establish fluid communication with a plurality of different components and/or accessories of the hydration system and that the members may even include these components and/or accessories integrated therewith.

As an illustrative example, consider a hydration system that includes a quick-connect assembly that fluidly interconnects the drink tube of the hydration system with a mouthpiece or other suitable outlet for the drink fluid that is drawn from the reservoir. More specifically, the assembly will include a first member (such as either one of the previously described and/or illustrated male or female members) that includes a mount upon which the drink tube is mounted. To that member, a variety of components can then be quickly fluidly interconnected simply by mounting the component(s) to the corresponding mount of a second, complimentary connector member and/or utilizing a second, complimentary connector member that contains an integrated component. Continuing this example, assuming that the first member is female member 80, any number of complimentary (sized and shaped to be coupled to the female member by lock member 112) male members 82 may be interchangeably and fluidly secured thereto. Illustrative examples of these male members include a male member with an attached or integral mouthpiece, another male member with an attached or integral mouthpiece (such as for use by a different user or if the first mouthpiece is dirty), a male member containing an on/off valve, a male member with a fitting adapted to receive an additional length of tube assembly, a male member with a gas mask adapter, etc.

A quick-connect assembly having at least one male or female member and a plurality of complimentary members may be referred to as a quick-connect kit, in that a user can selectively interconnect the components depending upon the user's preferences and desired application of the hydration system. An example of such a quick-connect kit is shown in FIG. 39 and generally indicated at 200. As shown, kit 200 includes a female member 80 and a plurality of male members 82, with at least one of the male members typically having a different mount or integrated component than the others. In the illustrated embodiment, the male members include a member 202 having a fitting 140 for a mouthpiece 42, a member 204 having a fitting 160 for a gas mask, a member 206 having a mount 98, which in the illustrated embodiment is barbed, and a member 208 having an on/off valve 76. It is within the scope of the invention that quick-connect kits 200 may include some or all of these illustrative combinations of male and female members. It is further within the scope of the invention that kit 200 may include more than one of a particular type of member and/or one or more members that differ from those illustrated in FIG. 39.

As discussed herein, hydration systems 10 with quick-connect assemblies 70 according to the present invention may be used for a variety of applications, including sporting applications, recreational applications, industrial applications, and military/law enforcement applications. In applications where the hydration system is configured for use with gas masks or otherwise expected to be exposed to harmful chemical agents, it may be desirable for at least a portion of the hydration system to be resistant to chemical agents, such as mustard (HD) blister agent and sarin (GB) nerve agent. Mustard blister agent is a non-volatile, very caustic substance that is effective at penetrating many materials. Mustard vapor can produce skin irritation (erythema) at dosages of approximately 100 mg-min/$m^3$. Sarin nerve agent is a volatile material that is effective at migrating through pores and other apertures or gas-permeable openings in materials. Sarin vapor can incapacitate an individual at dosages of approximately 8000 mg-min/$m^3$. Sarin and mustard agents are not exclusive of the chemical agents to which hydration systems according to the present invention may be constructed to be resistant. However, the combination of the penetrating ability of mustard agent and the migratory ability of sarin agent to collectively form an effective test for most chemical agents. In other words, materials that are sufficiently chemically resistant to both mustard and sarin agents are typically sufficiently chemically resistant to other chemical agents, such as anthrax, small pox and the like.

Preferably, the chemically resistant components of the hydration system are constructed to meet, and preferably exceed, the chemical penetration standards established by the U.S. Army Center for Health Promotion and Preventative Medicine (CHPPM). Expressed in terms of the amount of nerve agent ingested by a user drinking fifteen liters of drink fluid per day (with a seven day maximum), these maximum standards may be expressed as 0.047 mg/L of mustard agent and 0.0093 mg/L of sarin agent. When tested, it is preferable that the chemically resistant components of hydration system 10 prevent the above-identified maximum acceptable amounts of these agents from passing therethough when exposed to the agents in lethal concentrations (such as 10 g/$m^2$ of each agent) for at least 24 hours. Even more preferably, the components prevent even 50%, 60% or 75% of the CHPPM standards from being reached.

Preferably, the entire hydration system, as assembled for use, is resistant to these chemical agents so that drink fluid may be stored in reservoir 12 and selectively dispensed to a user through tube assembly 34 and any associated components without the drink fluid being contaminated by the chemical agents. By "as assembled for use," it is meant that portions of the hydration system that are enclosed by sufficiently chemically resistant materials may themselves be formed from materials, or otherwise be constructed, such that they are not themselves sufficiently chemically resistant. For example, an illustrative, schematic component of a hydration system is shown in FIG. 40 and indicated generally at 220. As shown, component 220 is depicted as a length of flexible drink tube, such as may be utilized in tube assembly 34. In FIG. 40, component 220 is entirely formed from one or more materials 222 that meet or exceed the CHPPM (or other selected) standards for one or more selected chemical agents in the composition and construction present in the hydration system. By this it is recognized that the chemical resistance of a material is at least partially defined by the material's composition and by the thickness of the material. Therefore, a material that is sufficiently chemically resistant to sarin and mustard agents, for example, when present in a first thickness may not be sufficiently chemically resistant if the thickness is reduced.

Illustrative, non-exclusive examples of chemically resistant materials for constructing components of hydration system 10 include thermoset epoxies such as vulcanized butyl rubber and chloro-isobutene-isoprene rubber (chlorobutyl), thermoplastic elastomers such as Sentoprene™ rubber, nylon, ABS, polyurethane, polypropylene, polyethylene. The choice of materials for a particular component include considerations of the expected forced to be applied to the component, structural requirements, and flexibility requirements, and accordingly may vary from component to component and system to system.

It is within the scope of the invention that chemically resistant components of a hydration system may include a chemically resistant cover, or sheath, that is applied over a structure that is not, or not sufficiently, chemically resistant. For example, in FIG. 41, a portion of tube assembly 34 is shown encased within a cover, or sheath, 224 that is formed from one or more chemically resistant materials 222. Collectively, the sheathed tube assembly provides another example of a chemically resistant component 220. More specifically, although tube assembly 34 may not be sufficiently chemically resistant, the assembled component 220 is sufficiently chemically resistant because sheath 224 prevents the chemical agents from reaching tube assembly 34.

The sheath may be permanently bonded or otherwise applied to the component or removably mounted on the component.

It is also within the scope of the invention that the preceding discussion applies to other flexible components of the hydration system (such as reservoir 12, some mouthpieces 42 and some exit ports 30) and other more rigid components of the hydration system (such as some exit ports 30, on/off valve 76, quick-connect assembly 70, gas mask fittings 160 and some mouthpieces 42). In FIG. 42, examples of these and other suitable constructions for chemically resistant components of a hydration system are schematically illustrated. As shown, each illustrative, fragmentary component includes an exterior surface 230 that is oriented to be contacted by external chemical agents to which the hydration system is exposed, and an internal surface 232 that is oriented to contact drink fluid within the hydration system. In FIG. 42, reference numeral 240 schematically depicts a component that is entirely formed from a chemically resistant material, and reference numeral 242 schematically depicts a component that includes an outer covering or sheath 224 that is formed from a chemically resistant material. It may be desirable to include an underlying coating or fluid barrier 246 with some chemically resistant materials to prevent the materials from affecting the taste of the drink fluid carried in the hydration system. For example, vulcanized butyl rubber tends to negatively affect the taste of water or other drink fluids and therefore, a waterproof barrier 246 may be used to preserve the original taste of the drink fluid when vulcanized butyl rubber is used as chemically resistant material 222. This construction is schematically illustrated at 248 in FIG. 42. Barrier 246 may take any suitable form, such as being a film, coating, sheet, independent layer, etc. As yet another example, and as schematically illustrated at 250, a chemically resistant component 220 may be formed from a plurality of layers that collectively provide a chemically resistant composite, even if one or more of the layers (or even each of the individual layers) is not chemically resistant.

In FIG. 43, a less schematic example of chemically resistant components 220 is provided. As shown, tube assembly 34 (including tube portions 192 and 194) and a quick connect assembly 70 with an on/off valve 76 and a gas-mask fitting 160 are all fluidly interconnected and each of these components is formed from at least one chemically resistant material 222.

The portion of a hydration system to be formed from chemically resistant materials depends to some degree upon the intended environment and method of using the hydration system. Of course, in many applications, such as sporting and recreational applications, none of the hydration systems components need to be constructed of these materials. In applications where there is reasonable risk of exposure to chemical agents, the most protective design is for the entire hydration system (reservoir, exit port, tube assembly, mouthpiece, quick-connect assembly, and any additional components) be constructed from chemically resistant materials so that the drink fluid is protected while stored and dispensed regardless of any other protective measures employed by a user.

INDUSTRIAL APPLICABILITY

The present invention is applicable in any hydration system in which drink fluid is provided to a user. The invention is particularly useful with personal hydration systems in which drink fluid is carried by a user in a fluid reservoir and delivered for drinking to a user via a mouthpiece that is fluidly connected to the reservoir by a drink tube. Embodiments of the present invention are also applicable to personal hydration systems that are selectively configured for use by users wearing gas masks.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

An illustrative, non-exclusive example of an invention according to the present disclosure is a personal hydration system that includes at least (1) a reservoir having a body portion with an internal compartment adapted to receive a volume of drink fluid and a selectively sealable fill port having an opening through which drink fluid may be added to or removed from the compartment; (2) an elongate downstream assembly extending in fluid communication from the reservoir to define a fluid conduit through which drink fluid may flow from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect the quick-connect assembly with an intake tube of a gas mask, and further wherein the downstream assembly further includes at least one quick-connect assembly adapted to fluidly interconnect at least two of the plurality of components, wherein the quick-connect assembly includes at least (3) a male coupling member having a shaft that includes a tip and which defines at least a portion of the fluid conduit, wherein the male coupling member includes a region distal the tip with a port through which drink fluid may selectively flow into or out of the assembled quick-connect assembly; (4) a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and (5) a resilient lock ring coupled to the female coupling member and adapted to selectively engage prevent removal of the shaft of the male coupling member when the shaft of the male coupling member is at least partially inserted into the passage, wherein the lock ring defines a passage and is selectively deformable between an unlocked orientation, in which the tip of the male coupling member may pass through the passage, and a locked orientation, in which the tip of the male coupling member may not pass through the passage, and further wherein the lock ring is biased to the locked configuration.

As another non-exclusive example, the present disclosure is also directed to a quick-connect kit for forming an assembled quick-connect assembly that defines a fluid conduit through which drink fluid may flow, with the kit including (1) at least one male coupling member having a shaft that includes a tip and which defines at least a portion of a fluid conduit, wherein the male coupling member includes a region distal the tip with a port through which drink fluid may selectively flow into or out of the assembled quick-connect assembly, and further wherein the region includes a mount; (2) at least one a female coupling member having a body with an opening sized to receive at least the tip of a male coupling member, wherein the opening is in fluid communication with a cavity that extends through the female coupling member to a region distal the opening that includes a port through which drink fluid may selectively flow into or out of the assembled quick-connect assembly, wherein the region includes a mount; and (3) a lock member adapted to releasably and fluidly interconnect a male coupling member and a female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the passage of the female coupling member; with the mount of a first one of the male and the female coupling members adapted to be fluidly interconnected with a tube assembly of a hydration system upstream from a second one of the male and the female coupling members, and with the kit including at least a pair of the second one of the male and the female coupling members, with the mount of one of the second one of the male and the female coupling members adapted to fluidly interconnect the assembly with at least one of a length of drink tubing and a mouthpiece and the mount of the other of the second one of the male and the female coupling members adapted to fluidly interconnect the assembly with an intake tube of a gas mask, and furthermore upon configuring the lock member to its unlocked configuration, the second ones of the male and the female coupling members may be selectively and interchangeably fluidly interconnected with the first one of the male and the female coupling members.

As yet another example, the present disclosure is directed to personal hydration systems and/or gas masks that include such a kit.

As still another example, the present disclosure is directed to chemically resistant hydration systems that include at least (1) a reservoir having a body portion with an internal compartment adapted to receive a volume of drink fluid and a selectively sealable fill port having an opening through which drink fluid may be added to or removed from the compartment; and (2) an elongate downstream assembly extending in fluid communication from the reservoir to define a fluid conduit through which drink fluid may flow from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect the quick-connect assembly with an intake tube of a gas mask, and further wherein the downstream assembly further includes at least one quick-connect assembly adapted to fluidly interconnect at least two of the plurality of components, and further the plurality of fluidly interconnected components are adapted to be chemically resistant, such that drink fluid may remain in the downstream assembly when the downstream assembly is exposed to a chemical agent present in a concentration of at least 10 $g/m^2$ without more than a maximum acceptable amount of the chemical agent penetrating the downstream assembly and contacting the drink fluid. Illustrative examples of these chemical agents include mustard blister agent and/or sarin nerve agent. Illustrative maximum acceptable amounts of mustard blister agent include 0.047 mg/L, 0.003525 mg/L and 0.00235 mg/L. Illustrative maximum acceptable amounts of sarin blister agent include 0.0093 mg/L, 0.006975 mg/L and 0.00465 mg/L.

It is believed that the following claims particularly point out certain combinations and subcombinations that are directed to one or more of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A personal hydration system, comprising:
a reservoir having a body portion with an internal compartment adapted to receive a volume of drink fluid, wherein the reservoir includes a selectively sealable fill port having an opening through which drink fluid may be added to or removed from the compartment; and
an elongate downstream assembly extending in fluid communication from the reservoir to define a fluid conduit through which drink fluid may flow from the compartment for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, wherein the plurality of fluidly interconnected components are adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid, and further wherein the quick-connect assembly comprises:

a male coupling member having a shaft that includes a tip and which defines at least a portion of the fluid conduit, wherein the male coupling member includes a region distal the tip with a port through which drink fluid may selectively flow into or out of the assembled quick-connect assembly;

a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the passage of the lock ring is selectively deformable to configure the lock ring between an unlocked configuration, in which the tip of the male coupling member may pass through the passage, and a locked configuration, in which the tip of the male coupling member may not pass through the passage, and further wherein the lock ring is biased to the locked configuration.

2. The hydration system of claim 1, wherein the shaft of the male coupling member includes a region of reduced cross-sectional area bounded by a pair of regions of greater cross-sectional area than the region of reduced cross-sectional area and further wherein the region of reduced cross-sectional area is sized such that the region of reduced cross-sectional area may extend within the passage with the regions of greater cross-sectional area on respective sides of the lock ring.

3. The hydration system of claim 2, wherein the tip of the male coupling member defines one of the regions of greater cross-sectional area.

4. The hydration system of claim 2, wherein when the lock ring is in the locked configuration, the regions of greater cross-sectional area cannot fit through the passage.

5. The hydration system of claim 2, wherein the lock ring is adapted to deflect from its locked configuration to its unlocked configuration upon urging of one of the regions of greater cross-sectional area through the passage.

6. The hydration system of claim 5, wherein upon insertion of the one of the regions of greater cross-sectional area through the passage, the lock ring is biased to automatically return toward the locked configuration to seat the lock ring upon the region of reduced cross-sectional area of the male coupling member.

7. The hydration system of claim 1, wherein the lock ring includes at least one release member adapted to configure the lock ring to the unlocked configuration responsive to user-applied forces thereto.

8. The hydration system of claim 1, wherein the female coupling member includes at least one aperture in the body, wherein the lock ring includes at least one release member that is biased to extend from the passage at least into one of the at least on apertures in the body of the female coupling member, and further wherein upon urging of the at least one release member toward the passage, the lock ring is urged toward the unlocked configuration.

9. The hydration system of claim 1, wherein the lock ring is adapted to be configured between the locked and the unlocked configurations without requiring sliding or rotational movement of the lock ring relative to the female coupling member.

10. The hydration system of claim 1, wherein the region of at least one of the female and the male coupling members further includes a mount that is adapted to fluidly interconnect the region with another component of the downstream assembly.

11. The hydration system of claim 10, wherein the mount is adapted to receive a length of drink tubing.

12. The hydration system of claim 10, wherein the mount is adapted to receive a mouthpiece.

13. The hydration system of claim 1, wherein the regions of both of the female and the male coupling members further include mounts that are adapted to fluidly interconnect the regions with other components of the downstream assembly.

14. The hydration system of claim 1, wherein the quick-connect assembly is integrated with at least one of the plurality of fluidly interconnected components.

15. The hydration system of claim 14, wherein at least one of the male coupling member and the female coupling member shares a common housing with at least one of the plurality of fluidly interconnected components.

16. The hydration system of claim 1, wherein the quick-connect assembly further includes at least one of the group consisting of an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir, and a gas-mask fitting adapted to fluidly interconnect the quick-connect assembly with an intake tube of a gas mask.

17. The hydration system of claim 1, further comprising a pack into which the reservoir is received.

18. The hydration system of claim 1, wherein the chemical agent includes mustard blister agent and the maximum acceptable amount is 0.047 mg/L.

19. The hydration system of claim 1, wherein the chemical agent includes mustard blister agent and the maximum acceptable amount is 0.0235 mg/L.

20. The hydration system of claim 1, wherein the chemical agent includes sarin nerve agent and the maximum acceptable amount is 0.0093 mg/L.

21. The hydration system of claim 1, wherein the chemical agent includes sarin nerve agent and the maximum acceptable amount is 0.00465 mg/L.

22. The hydration system of claim 1, wherein the reservoir is also adapted to be chemically resistant, such that drink fluid may remain in the downstream assembly when the downstream assembly is exposed to a chemical agent present in a concentration of 10 g/m$^2$ for 24 hours without more than a maximum acceptable amount of the chemical agent penetrating the downstream assembly and contacting the drink fluid.

23. The hydration system of claim 22, wherein the reservoir is formed from a flexible chemically resistant material.

24. The hydration system of claim 1, wherein at least one of the plurality of fluidly interconnected components includes a cover that is formed from a chemically resistant material.

25. The hydration system of claim 1, wherein at least one of the plurality of fluidly interconnected components is formed from a chemically resistant material.

* * * * *

UNITED STATES PATENT AND TRADEMARK OFFICE
CERTIFICATE OF CORRECTION

| | |
|---|---|
| PATENT NO. | : 6,908,015 B2 |
| APPLICATION NO. | : 10/267036 |
| DATED | : June 21, 2005 |
| INVENTOR(S) | : Choi et al. |

It is certified that error appears in the above-identified patent and that said Letters Patent is hereby corrected as shown below:

In column 20, line 66, insert the following claims 26-56:

26. (Previously Presented) A personal hydration system, comprising:

a flexible reservoir having a body portion with an internal compartment adapted to receive a volume of drink fluid, wherein the reservoir includes a selectively sealable fill port having an opening through which drink fluid may be added to or removed from the compartment; and an elongate downstream assembly extending in fluid communication from the reservoir to define a fluid conduit through which drink fluid may flow from the compartment for drinking by a user, wherein the downstream assembly comprises at least a plurality of fluidly interconnected components selected from the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downsteam assembly and the reservoir to permit drink fluid to be drawn from the compartment into the downstream assembly, and a gas mask fitting adapted to fluidly interconnected a quick-connect assembly with an intake tube of a gas mask, and further wherein the downstream assembly further

UNITED STATES PATENT AND TRADEMARK OFFICE
CERTIFICATE OF CORRECTION

| | | |
|---|---|---|
| PATENT NO. | : 6,908,015 B2 | Page 2 of 12 |
| APPLICATION NO. | : 10/267036 | |
| DATED | : June 21, 2005 | |
| INVENTOR(S) | : Choi et al. | |

It is certified that error appears in the above-identified patent and that said Letters Patent is hereby corrected as shown below:

In column 20, line 66, insert the following claims 26-56: cont.

includes at least one quick-connect assembly adapted to fluidly interconnect with at least two of the plurality of components, and further the plurality of fluidly interconnected components are adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

27. The hydration system of claim 26, wherein the chemical agent includes mustard blister agent and the maximum acceptable amount is 0.047 mg/L.

28. The hydration system fo claim 27, wherein the chemical agent further includes sarin nerve gas and the maximum acceptable amount is 0.0093 mg/L.

29. The hydration system of claim 26, wherein the chemical agent includes mustard blister agent and the maximum acceptable amount is 0.003525 mg/L.

30. The hydration system of claim 26, wherein the chemical agent includes mustard blister agent and the maximum acceptable amount is 0.00235 mg/L.

31. The hydration system of claim 26, wherien the chemical agent includes sarin nerve agent and the maximum acceptable amount is 0.0093 mg/L.

UNITED STATES PATENT AND TRADEMARK OFFICE
CERTIFICATE OF CORRECTION

| | |
|---|---|
| PATENT NO. : 6,908,015 B2 | |
| APPLICATION NO. : 10/267036 | |
| DATED : June 21, 2005 | |
| INVENTOR(S) : Choi et al. | |

It is certified that error appears in the above-identified patent and that said Letters Patent is hereby corrected as shown below:

In column 20, line 66, insert the following claims 26-56: cont.

32. The hydration system of claim 26, wherein the chemical agent includes sarin nerve agent and the maximum acceptable amount is 0.006975 mg/L.

33. The hydration system of claim 26, wherein the chemical agent includes sarin nerve agent and the maximum acceptable amount is 0.00465 mg/L.

34. The hydration system of claim 40, wherein the reservoir is also adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

35. The hydration system of claim 34, wherein the reservoir is formed from a flexibly chemically resistant material.

36. The hydration system of claim 26, wherein at least one of the plurality of fluidly interconnected components includes a cover that is formed from a chemically resistant material.

37. The hydration system of claim 26, wherein at least one of the plurality of fluidly interconnected components if formed from a chemically resistant material.

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

In column 20, line 66, insert the following claims 26-56: cont.

38. The hydration system of claim 26, further including a pack into which the reservoir is housed.

39. ~~The hydration system of claim 15,~~ A personal hydration system, comprising:

a reservoir having a body portion with an internal compartment adapted to receive a volume of drink fluid, wherein the reservoir includes a selectively sealable fill port having an opening through which drink fluid may be added to or removed from the compartment; and an elongate downstream assembly extending in fluid communication from the reservoir to define a fluid conduit through which drink fluid may flow from the compartment for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

In column 20, line 66, insert the following claims 26-56: cont.

<u>gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, wherein the quick-connect assembly comprises:</u>

<u>a male coupling member having a shaft that includes a tip and which defines at least a portion of the fluid conduit, wherein the male coupling member includes a region distal the tip with a port through which drink fluid may selectively flow into or out of the assembled quick-connected assembly;</u>

<u>a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and</u>

<u>a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the passage of the lock ring is selectively deformable to configure the lock ring between an unlocked configuration, in which the tip of the male coupling</u>

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

In column 20, line 66, insert the following claims 26-56: cont.

member may pass through the passage, and a locked configuration, in which the tip of the male coupling member may not pass through the passage, and further wherein the lock ring is biased to the locked configuration; and wherein the quick-connect assembly is integrated with at least one of the plurality of fluidly interconnected components, and further wherein at least one of the male coupling member and the female coupling member shares a common housing with an exit port adapted to fluidly interconnect the reservoir with a length of drink tubing.

40. The hydration system of claim 24, wherein the reservoir is formed from a plurality of layers, with at least one of the layers being a fluid impermeable layer and at least one of the layers not being formed from a chemically resistant material.

41. The hydration system of claim 26, wherein the plurality of interconnected components includes an on/off valve adapted to selectively obstruct the fluid conduit and prevent drink fluid from flowing therethrough.

42. The hydration system of claim 35, wherein the reservoir is formed from a plurality of layers, with at least one of the layers being a fluid impermeable layer and at least one of the layers not being formed from a chemically resistant material.

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

In column 20, line 66, insert the following claims 26-56: cont.

43. A personal hydration system, comprising:

a reservoir having a body portion with an internal compartment adapted to receive a volume of drink fluid, wherein the reservoir includes <u>an exit port and</u> a selectively sealable fill port having an opening through which drink fluid may be added to or removed from the compartment; <u>and</u> an elongate downstream assembly extending in fluid communication with the reservoir to define a fluid conduit through which drink fluid may flow from the compartment and through the downstream assembly for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, and a gas mask fitting adapted to fluidly interconnect a quick-connect assembly with an intake tube of a gas mask, <s>an</s><u>wherein the</u> exit port <u>is</u> adapted to fluidly interconnect the downstream assembly <s>and</s><u>with</u> the reservoir to permit drink fluid to be drawn from the compartment into the downstream assembly, wherein the exit port includes a male

UNITED STATES PATENT AND TRADEMARK OFFICE
CERTIFICATE OF CORRECTION

| | |
|---|---|
| PATENT NO. | : 6,908,015 B2 |
| APPLICATION NO. | : 10/267036 |
| DATED | : June 21, 2005 |
| INVENTOR(S) | : Choi et al. |

It is certified that error appears in the above-identified patent and that said Letters Patent is hereby corrected as shown below:

In column 20, line 66, insert the following claims 26-56: cont.

coupling member having a shaft that includes a tip and which defines at least a portion of a fluid conduit, wherein the male coupling member includes a region distal the tip with a port through which drink fluid may selectively flow into the exit port from the compartment of the reservoir;

a female coupling member having a body with an opening sized to receive at least the tip of the male coupling member, wherein the opening is in fluid communication with a cavity that extends through the female coupling member to a region distal the opening that includes a port through which drink fluid may selectively flow from the exit port into the downstream assembly; and a lock member adapted to releasably and fluidly interconnect a male coupling member and a female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the cavity of the female coupling member; and further wherein the lock member is biased to the locked configuration.

44. (Previously Presented) The hydration system of claim 43, wherein the lock member includes at least one release member adapted to configured the lock member to

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

In column 20, line 66, insert the following claims 26-56: cont.

release the portion of the male coupling member upon receipt of a user-applied force to the release member, and further wherein the female coupling member includes at least one aperture through which the at least one release member at least partially extends.

45. The hydration system of claim 57, wherein the lock member includes a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the lock ring is selectively deformable between an unlocked configuration, in which the tip of the male coupling member may pass through the passage, and a locked configuration, in which the tip of the male coupling member may not pass through the passage.

46. The hydration system of claim 43, wherein the plurality of components includes a bite-actuated mouthpiece, and further wherein the downstream assembly includes at least one quick-connect assembly adapted to fluidly interconnect at least two of the plurality of components.

47. The hydration system of claim 39, wherein the shaft of the male coupling member includes a region of reduced cross-sectional area bounded by a pair of regions of greater cross-sectional area than the region of reduced cross-sectional

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

In column 20, line 66, insert the following claims 26-56: cont.

area and further wherein the region of reduced cross-sectional area is sized such that the region of reduced cross-sectional area may extend within the passage with the regions of greater cross-sectional area on respective sides of the lock ring.

48. The hydration system of claim 47, wherein the tip of the male coupling member defines one of the regions of greater cross-sectional area.

49. The hydration system of claim 47, wherein when the lock ring is in the locked configuration, the regions of greater cross-sectional area cannot fit through the passage.

50. The hydration system of claim 47, wherein the lock ring is adapted to deflect from its locked configuration to its unlocked configuration upon urging of one of the regions of greater cross-sectional area through the passage.

51. The hydration system of claim 50, wherein upon insertion of the one of the regions of greater cross-sectional area through the passage, the lock ring is biased to automatically return toward the locked configuration to seat the lock ring upon the region of reduced cross-sectional area of the male coupling member.

52. The hydration system of claim 39, wherein the lock ring includes at least one release member adapted to configured the lock ring to the unlocked configuration responsive to user-applied forces thereto.

53. The hydration system of claim 39, wherein the female coupling

UNITED STATES PATENT AND TRADEMARK OFFICE
CERTIFICATE OF CORRECTION

| | | |
|---|---|---|
| PATENT NO. | : 6,908,015 B2 | |
| APPLICATION NO. | : 10/267036 | |
| DATED | : June 21, 2005 | |
| INVENTOR(S) | : Choi et al. | |

It is certified that error appears in the above-identified patent and that said Letters Patent is hereby corrected as shown below:

In column 20, line 66, insert the following claims 26-56: cont.

member includes at least one aperture in the body, wherein the lock ring includes at least one release member that is biased to extend from the passage at least into one of the at least one apertures in the body of the female coupling member, and further wherein upon urging of the at least one release member toward the passage, the lock ring is urged toward the unlocked configuration.

54. The hydration system of claim 39, wherein the lock ring is adapted to be configured between the locked and the unlocked configurations without requiring rotational movement of the lock ring relative to the female coupling member.

55. The hydration system of claim 39, further comprising a pack into which the reservoir is received.

UNITED STATES PATENT AND TRADEMARK OFFICE
CERTIFICATE OF CORRECTION

| | |
|---|---|
| PATENT NO. | : 6,908,015 B2 |
| APPLICATION NO. | : 10/267036 |
| DATED | : June 21, 2005 |
| INVENTOR(S) | : Choi et al. |

It is certified that error appears in the above-identified patent and that said Letters Patent is hereby corrected as shown below:

In column 20, line 66, insert the following claims 26-56: cont.

56.     The hydration system of claim 1, wherein the lock ring is adapted to be configured between the locked and the unlocked configurations without requiring rotational movement of the lock ring relative to the female coupling member.

Signed and Sealed this

Third Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

In column 20, line 66, insert the following claims 26-56:

--26. (Previously Presented) A personal hydration system, comprising:

a flexible reservoir having a body portion with an internal compartment adapted to receive a volume of drink fluid, wherein the reservoir includes a selectively sealable fill port having an opening through which drink fluid may be added to or removed from the compartment; and an elongate downstream assembly extending in fluid communication from the reservoir to define a fluid conduit through which drink fluid may flow from the compartment for drinking by a user, wherein the downstream assembly comprises at least a plurality of fluidly interconnected components selected from the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downsteam assembly and the reservoir to permit drink fluid to be drawn from the compartment into the downstream assembly, and a gas mask fitting adapted to fluidly interconnect a quick-connect assembly with an intake tube of a gas mask, and further wherein the downstream assembly further

UNITED STATES PATENT AND TRADEMARK OFFICE
CERTIFICATE OF CORRECTION

| | |
|---|---|
| PATENT NO. | : 6,908,015 B2 |
| APPLICATION NO. | : 10/267036 |
| DATED | : June 21, 2005 |
| INVENTOR(S) | : Choi et al. |

It is certified that error appears in the above-identified patent and that said Letters Patent is hereby corrected as shown below:

includes at least one quick-connect assembly adapted to fluidly interconnect with at least two of the plurality of components, and further the plurality of fluidly interconnected components are adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

27. The hydration system of claim 26, wherein the chemical agent includes mustard blister agent and the maximum acceptable amount is 0.047 mg/L.

28. The hydration system of claim 27, wherein the chemical agent further includes sarin nerve gas and the maximum acceptable amount is 0.0093 mg/L.

29. The hydration system of claim 26, wherein the chemical agent includes mustard blister agent and the maximum acceptable amount is 0.003525 mg/L.

30. The hydration system of claim 26, wherein the chemical agent includes mustard blister agent and the maximum acceptable amount is 0.00235 mg/L.

31. The hydration system of claim 26, wherien the chemical agent includes sarin nerve agent and the maximum acceptable amount is 0.0093 mg/L.

UNITED STATES PATENT AND TRADEMARK OFFICE
CERTIFICATE OF CORRECTION

| | |
|---|---|
| PATENT NO. | : 6,908,015 B2 |
| APPLICATION NO. | : 10/267036 |
| DATED | : June 21, 2005 |
| INVENTOR(S) | : Choi et al. |

It is certified that error appears in the above-identified patent and that said Letters Patent is hereby corrected as shown below:

32. The hydration system of claim 26, wherein the chemical agent includes sarin nerve agent and the maximum acceptable amount is 0.006975 mg/L.

33. The hydration system of claim 26, wherein the chemical agent includes sarin nerve agent and the maximum acceptable amount is 0.00465 mg/L.

34. The hydration system of claim 26, wherein the reservoir is also adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

35. The hydration system of claim 34, wherein the reservoir is formed from a flexible chemically resistant material.

36. The hydration system of claim 26, wherein at least one of the plurality of fluidly interconnected components includes a cover that is formed from a chemically resistant material.

37. The hydration system of claim 26, wherein at least one of the plurality of fluidly interconnected components if formed from a chemically resistant material.

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

38.    The hydration system of claim 26, further including a pack into which the reservoir is housed.

39.    The hydration system of claim 15, <u>A personal hydration system, comprising:</u> ———————————

<u>a reservoir having a body portion with an internal compartment adapted to receive a volume of drink fluid, wherein the reservoir includes a selectively sealable fill port having an opening through which drink fluid may be added to or removed from the compartment; and</u>

<u>an elongate downstream assembly extending in fluid communication from the reservoir to define a fluid conduit through which drink fluid may flow from the compartment for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a</u>

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

<u>gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, wherein the quick-connect assembly comprises:</u>

<u>a male coupling member having a shaft that includes a tip and which defines at least a portion of the fluid conduit, wherein the male coupling member includes a region distal the tip with a port through which drink fluid may selectively flow into or out of the assembled quick-connected assembly;</u>

<u>a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and</u>

<u>a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the passage of the lock ring is selectively deformable to configure the lock ring between an unlocked configuration, in which the tip of the male coupling</u>

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

<u>member may pass through the passage, and a locked configuration, in which the tip of the male coupling member may not pass through the passage, and further wherein the lock ring is biased to the locked configuration; and</u>

<u>wherein the quick-connect assembly is integrated with at least one of the plurality of fluidly interconnected components, and further</u> wherein at least one of the male coupling member and the female coupling member shares a common housing with an exit port adapted to fluidly interconnect the reservoir with a length of drink tubing.

40. The hydration system of claim 23, wherein the reservoir is formed from a plurality of layers, with at least one of the layers being a fluid impermeable layer and at least one of the layers not being formed from a chemically resistant material.

41. The hydration system of claim 26, wherein the plurality of interconnected components includes an on/off valve adapted to selectively obstruct the fluid conduit and prevent drink fluid from flowing therethrough.

42. The hydration system of claim 35, wherein the reservoir is formed from a plurality of layers, with at least one of the layers being a fluid impermeable layer and at least one of the layers not being formed from a chemically resistant material.

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

43. A personal hydration system, comprising:

a reservoir having a body portion with an internal compartment adapted to receive a volume of drink fluid, wherein the reservoir includes <u>an exit port and</u> a selectively sealable fill port having an opening through which drink fluid may be added to or removed from the compartment; <u>and</u> an elongate downstream assembly extending in fluid communication with the reservoir to define a fluid conduit through which drink fluid may flow from the compartment and through the downstream assembly for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, and a gas mask fitting adapted to fluidly interconnect a quick-connect assembly with an intake tube of a gas mask, an<u>wherein the</u> exit port <u>is</u> adapted to fluidly interconnect the downstream a~~ssembly~~ and<u>with</u> the reservoir to permit drink fluid to be drawn from the compartment into the ~~down~~stream assembly, wherein the exit port includes a male

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

coupling member having a shaft that includes a tip and which defines at least a portion of a fluid conduit, wherein the male coupling member includes a region distal the tip with a port through which drink fluid may selectively flow into the exit port from the compartment of the reservoir;

a female coupling member having a body with an opening sized to receive at least the tip of the male coupling member, wherein the opening is in fluid communication with a cavity that extends through the female coupling member to a region distal the opening that includes a port through which drink fluid may selectively flow from the exit port into the downstream assembly; and a lock member adapted to releasably and fluidly interconnect a male coupling member and a female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the cavity of the female coupling member; and further wherein the lock member is biased to the locked configuration.

44. (Previously Presented) The hydration system of claim 43, wherein the lock member includes at least one release member adapted to configured

UNITED STATES PATENT AND TRADEMARK OFFICE
CERTIFICATE OF CORRECTION

PATENT NO.       : 6,908,015 B2
APPLICATION NO.  : 10/267036
DATED            : June 21, 2005
INVENTOR(S)      : Choi et al.

It is certified that error appears in the above-identified patent and that said Letters Patent is hereby corrected as shown below:

the lock member to release the portion of the male coupling member upon receipt of a user-applied force to the release member, and further wherein the female coupling member includes at least one aperture through which the at least one release member at least partially extends.

45. The hydration system of claim 43, wherein the lock member includes a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the lock ring is selectively deformable between an unlocked configuration, in which the tip of the male coupling member may pass through the passage, and a locked configuration, in which the tip of the male coupling member may not pass through the passage.

46. The hydration system of claim 43, wherein the plurality of components includes a bite-actuated mouthpiece, and further wherein the downstream assembly includes at least one quick-connect assembly adapted to fluidly interconnect at least two of the plurality of components.

47. The hydration system of claim 39, wherein the shaft of the male coupling member includes a region of reduced cross-sectional area bounded by a pair of regions of greater cross-sectional area than the region of reduced cross-sectional

UNITED STATES PATENT AND TRADEMARK OFFICE
CERTIFICATE OF CORRECTION

PATENT NO. : 6,908,015 B2
APPLICATION NO. : 10/267036
DATED : June 21, 2005
INVENTOR(S) : Choi et al.

It is certified that error appears in the above-identified patent and that said Letters Patent is hereby corrected as shown below:

area and further wherein the region of reduced cross-sectional area is sized such that the region of reduced cross-sectional area may extend within the passage with the regions of greater cross-sectional area on respective sides of the lock ring.

48. The hydration system of claim 47, wherein the tip of the male coupling member defines one of the regions of greater cross-sectional area.

49. The hydration system of claim 47, wherein when the lock ring is in the locked configuration, the regions of greater cross-sectional area cannot fit through the passage.

50. The hydration system of claim 47, wherein the lock ring is adapted to deflect from its locked configuration to its unlocked configuration upon urging of one of the regions of greater cross-sectional area through the passage.

51. The hydration system of claim 50, wherein upon insertion of the one of the regions of greater cross-sectional area through the passage, the lock ring is biased to automatically return toward the locked configuration to seat the lock ring upon the region of reduced cross-sectional area of the male coupling member.

52. The hydration system of claim 39, wherein the lock ring includes at least one release member adapted to configured the lock ring to the unlocked configuration responsive to user-applied forces thereto.

UNITED STATES PATENT AND TRADEMARK OFFICE
CERTIFICATE OF CORRECTION

| | | |
|---|---|---|
| PATENT NO. | : 6,908,015 B2 | |
| APPLICATION NO. | : 10/267036 | |
| DATED | : June 21, 2005 | |
| INVENTOR(S) | : Choi et al. | |

It is certified that error appears in the above-identified patent and that said Letters Patent is hereby corrected as shown below:

53. The hydration system of claim 39, wherein the female coupling member includes at least one aperture in the body, wherein the lock ring includes at least one release member that is biased to extend from the passage at least into one of the at least one apertures in the body of the female coupling member, and further wherein upon urging of the at least one release member toward the passage, the lock ring is urged toward the unlocked configuration.

54. The hydration system of claim 39, wherein the lock ring is adapted to be configured between the locked and the unlocked configurations without requiring rotational movement of the lock ring relative to the female coupling member.

55. The hydration system of claim 39, further comprising a pack into which the reservoir is received.

UNITED STATES PATENT AND TRADEMARK OFFICE
CERTIFICATE OF CORRECTION

| | |
|---|---|
| PATENT NO. | : 6,908,015 B2 |
| APPLICATION NO. | : 10/267036 |
| DATED | : June 21, 2005 |
| INVENTOR(S) | : Choi et al. |

It is certified that error appears in the above-identified patent and that said Letters Patent is hereby corrected as shown below:

56. The hydration system of claim 1, wherein the lock ring is adapted to be configured between the locked and the unlocked configurations without requiring rotational movement of the lock ring relative to the female coupling member.--

This certificate supersedes the Certificate of Correction issued October 3, 2006.

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 6,908,015 B2 Page 1 of 14
APPLICATION NO. : 10/267036
DATED : June 21, 2005
INVENTOR(S) : Robert Choi et al.

It is certified that error appears in the above-identified patent and that said Letters Patent is hereby corrected as shown below:

Delete the title page and substitute therefore the attached title page showing the corrected number of claims in patent.

Delete Columns 1-20 and substitute therefore the attached Columns 1-24 which adds claims 26-56 to the printed patent.

This certificate supersedes the Certificates of Correction issued October 3, 2006 and April 21, 2009.

Signed and Sealed this

Twenty-first Day of September, 2010

David J. Kappos
*Director of the United States Patent and Trademark Office*

(12) United States Patent
Choi et al.

(10) Patent No.: US 6,908,015 B2
(45) Date of Patent: Jun. 21, 2005

(54) PERSONAL HYDRATION SYSTEM WITH COMPONENT CONNECTIVITY

(75) Inventors: Robert Choi, Robnert Park, CA (US); Herbert Douglas, Antioch, CA (US); Barley A. Forsman, Cotati, CA (US); Jeremy Galten, Petaluma, CA (US)

(73) Assignee: CamelBak Products, LLC, Petaluma, CA (US)

( * ) Notice: Subject to any disclaimer, the term of this patent is extended or adjusted under 35 U.S.C. 154(b) by 216 days.

(21) Appl. No.: 10/267,036

(22) Filed: Oct. 7, 2002

(65) Prior Publication Data

US 2003/0168470 A1 Sep. 11, 2003

Related U.S. Application Data

(60) Provisional application No. 60/328,260, filed on Oct. 9, 2001.

(51) Int. Cl.⁷ .................................................. B67D 5/064
(52) U.S. Cl. .................. 222/175; 222/107; 222/529; 128/203.21; 141/379
(58) Field of Search ........................ 222/92, 105, 107, 222/175, 386.5, 501, 527, 529, 531, 537, 548, 306.5; 128/203.21; 141/379

(56) References Cited

U.S. PATENT DOCUMENTS

| 2,260,712 A | 10/1941 | Harrison |
| 4,423,892 A | 1/1984 | Bartholomew |
| 4,436,125 A | 3/1984 | Blenkush |
| 4,500,118 A | 2/1985 | Blenkush |
| 4,541,457 A | 9/1985 | Blenkush |
| 4,541,657 A | 9/1985 | Smyth |
| 4,630,847 A | 12/1986 | Blenkush |
| 4,703,957 A | 11/1987 | Blenkush |
| 4,804,213 A | 2/1989 | Guest |
| 4,884,829 A | 12/1989 | Funk et al. |
| 4,903,995 A | 2/1990 | Blenkush et al. |

FOREIGN PATENT DOCUMENTS

DE    3727789    3/1988

OTHER PUBLICATIONS

CamelBak Protective Mask Adapter Kit, CamelBak Products, Inc., circa Jun. 2000.
NBC/CBR Reservoir and Gas Mask Adapter Kit, 2000 Maximum Gear Military & Law Enforcement Products Catalog; CamelBak Products, Inc., circa Jun. 2000.
"Chemical–Biological Warfare Safe Water Pouch," Texas Research Institute Austin, Inc., printed from www.tri-austin.com/pouch.php Website in Sep. 2003.

*Primary Examiner*—Gene Mancene
*Assistant Examiner*—Melvin A Cartagena
(74) *Attorney, Agent, or Firm*—Kolisch Hartwell, P.C.

(57) ABSTRACT

A personal hydration system with component connectivity. The hydration system includes a fluid reservoir that may be housed within a pack. Drink fluid is drawn from the reservoir through a drink tube in fluid communication with the reservoir at one end and with a mouthpiece at the other. In some embodiments, the hydration system includes a manually actuated on/off valve downstream from the reservoir and/or a bite-actuated mouthpiece. The hydration system further includes a quick-connect assembly that fluidly interconnects components of the hydration system and which is configured to quickly release, and permit reattachment of, the detached or replacement components. In some embodiments, the hydration system includes a quick-connect assembly that is adapted to selectively couple a bite-actuated mouthpiece and a gas mask adapter to the hydration system's drink tube. In some embodiments, at least a portion, if not the entire, hydration system is formed from a chemically resistant material.

56 Claims, 11 Drawing Sheets

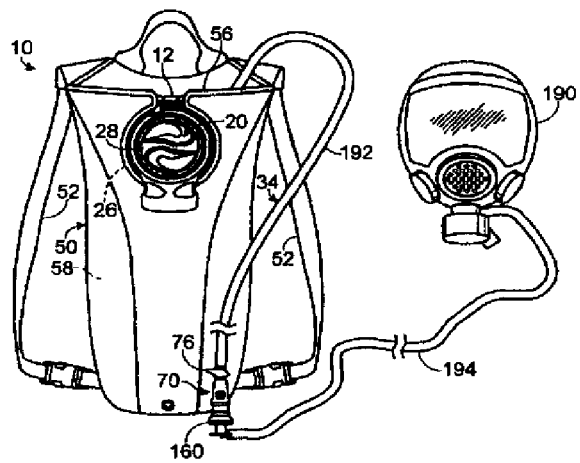

PERSONAL HYDRATION SYSTEM WITH COMPONENT CONNECTIVITY

RELATED APPLICATION

This application claims priority to U.S. Provisional Patent Application Ser. No. 60/328,260, which was filed on Oct. 9, 2001, is entitled "Personal Hydration System with Component Connectivity," and the complete disclosure of which is hereby incorporated by reference.

FIELD OF THE INVENTION

The present invention is directed generally to systems for providing drink fluid to a user, and more specifically, to personal hydration systems with component connectivity.

BACKGROUND OF THE INVENTION

Medical research has demonstrated the importance of maintaining adequate hydration while engaging in strenuous physical activities, such as bicycling or mountain climbing. In the not too distant past, participants in such activities carried their water in bottles or canteens from which they drank periodically. More recently, personal hydration systems have been developed which allow users to drink more or less continuously while engaged in sporting or recreational activities. These personal hydration systems typically have a bag-like fluid reservoir that is carried in a back- or waist-mounted pack. A long flexible tube is connected to the reservoir through an exit port at one end and terminates in a mouthpiece at the other end. The tube is long enough to allow the mouthpiece to be carried in the user's mouth to enable the user to draw water from the reservoir at will. Examples of hydration systems and mouthpieces therefor are disclosed in U.S. Pat. Nos. 5,727,714, 5,060,833, 5,085,349, and 6,070,767, the disclosures of which are hereby incorporated by reference.

Although personal hydration systems have proven to be a great advance over traditional water bottles, they do suffer from some drawbacks. One drawback is that the components of the hydration system downstream from the fluid reservoir tend to be either permanently secured together, or else secured together via a tight friction fit that tends to be difficult to establish or release. Both of these structures provide effective fluid-tight seals. However, neither permits components to be quickly and repeatedly interchanged by a user.

SUMMARY OF THE INVENTION

The present invention is directed to a personal hydration system with component connectivity. The hydration system includes a fluid reservoir that is adapted to receive and contain a volume of drink fluid. The reservoir may be housed within a pack. Drink fluid is drawn from the reservoir through a drink tube that is in fluid communication with the reservoir at one end and with a mouthpiece at the other end. In some embodiments, the drink tube is connected to the reservoir at an exit port. In some embodiments, the hydration system includes a manually actuated on/off valve downstream from the reservoir. In some embodiments, the hydration system includes a bite-actuated mouthpiece. In some embodiments, the drink tube includes more than one length of interconnected tubing. Hydration systems according to the present invention further include a quick-connect assembly that fluidly interconnects components of the hydration system and which is configured to quickly release, and permit reattachment of, the detached components or replacement components. In some embodiments, the replacement components enable different performance from the detached components. In some embodiments, the hydration system includes a quick-connect assembly that is adapted to selectively couple a bite-actuated mouthpiece and a gas mask adapter to the hydration system's drink tube. In some embodiments, at least a portion, if not the entire, hydration system is formed from a chemically resistant material.

Many other features of the present invention will become manifest to those versed in the art upon making reference to the detailed description which follows and the accompanying sheets of drawings in which preferred embodiments incorporating the principles of this invention are disclosed as illustrative examples only. Dimensions in the drawings are shown for purposes of illustration, but dimensions other than those shown may be used and are within the scope of the present invention.

BRIEF DESCRIPTION OF THE DRAWINGS

FIG. 1 is an isometric view of a personal hydration system that includes a schematic representation of a quick-connect assembly according to the present invention.

FIG. 2 is a top plan view of a personal hydration system with schematic representations of several different quick-connect assemblies according to the present invention.

FIG. 3 is a side elevation view of the personal hydration system of FIG. 2 showing additional schematic representations of quick-connect assemblies according to the present invention.

FIG. 4 is a side elevation view of a personal hydration system that includes a pack and illustrates schematically another quick-connect assembly according to the present invention.

FIG. 5 is a front elevation view of another personal hydration system that includes a back-mounted pack and schematically illustrates quick-connect assemblies according to the present invention.

FIG. 6 is a front elevation view of a personal hydration system that includes a waist-mounted pack and another schematic quick-connect assembly according to the present invention.

FIG. 7 is an exploded isometric view of a quick-connect assembly constructed according to the present invention.

FIG. 8 is a cross-sectional view showing another version of the assembly of FIG. 7 in its locked configuration.

FIG. 9 is a cross-sectional view of the male member of the assembly of FIG. 7.

FIG. 10 is a top plan view of the female member of Fig. .7.

FIG. 11 is a side elevation view of the female member of FIG. 7.

FIG. 12 is a cross-sectional view of the female member of FIG. 7 taken along the line 12-12 in FIG. 10.

FIG. 13 is a side elevation view of the lock ring of FIG. 7.

FIG. 14 is a top plan view of the lock ring of FIG. 13.

FIG. 15 is a cross-sectional view of the lock ring of FIG. 13 taken along the line 15-15 in FIG. 13.

FIG. 16 is an exploded isometric view of a quick-connect assembly integrated with an exit port.

FIG. 17 is an assembled isometric view of the assembly and the exit port of FIG. 16.

FIG. 18 is an end elevation view of the assembly and the exit port of FIG. 16.

FIG. 19 is a cross-sectional view of the assembly and the exit port of FIG. 18 taken along line 19-19 in FIG. 18 and showing a fragmentary end of an attached drink tube in dashed lines.

FIG. 20 is a top plan view of the exit port and the male member of the quick-connect assembly of FIG. 16.

FIG. 21 is a side elevation view of the exit port and the male member of the quick-connect assembly of FIG. 16.

FIG. 22 is a side elevation view of the assembly of FIG. 7 with a bite-actuated mouthpiece mounted thereupon.

FIG. 23 is cross-sectional view of the assembly and the mouthpiece of FIG. 22 taken along the line 23-23 in FIG. 22.

FIG. 24 is an exploded isometric view of a quick-connect assembly with an integrated on/off valve.

FIG. 25 is a top plan view of the assembly of FIG. 24 with the ends of the assembly adapted to receive lengths of drink tube.

FIG. 26 is a cross-sectional view of the assembly of FIG. 25 taken along the line 26-26 in FIG. 25.

FIG. 27 is a top plan view of the female member and the body of FIG. 24.

FIG. 28 is a side elevation view of the female member and the body of FIG. 24.

FIG. 29 is a cross-sectional view of the female member and the body of FIG. 24 taken along the line 29-29 in FIG. 27.

FIG. 30 is a top plan view of the core of the on/off valve of FIG. 24.

FIG. 31 is a side elevation view of the core of the on/off valve of FIG. 24.

FIG. 32 is a side elevation view of a modified version of the core of the on/off valve of FIG. 24.

FIG. 33 is an exploded isometric view of a quick-connect assembly with an integrated gas mask fitting.

Figure 34:
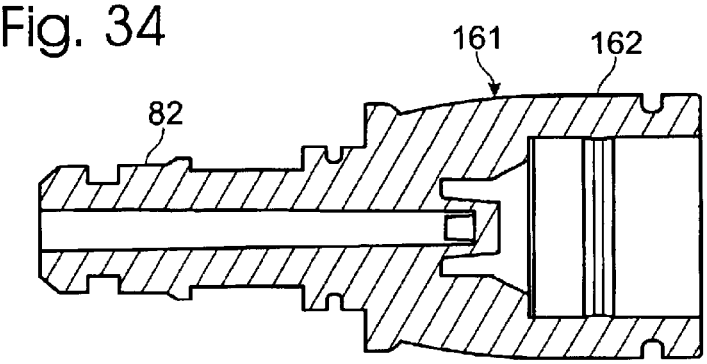
FIG. 34 is a cross-sectional view of the male member of the quick-connect assembly and the gas mask fitting of FIG. 33.

FIG. 34 is a cross-sectional view of the male member of the quick-connect assembly and the gas mask fitting of FIG. 33.

FIG. 35 is an exploded isometric view of a quick-connect assembly with another integrated gas mask fitting.

FIG. 36 is a side elevation view of the assembly and the fitting of FIG. 35 further including an on/off valve.

FIG. 37 is a cross-sectional view of the assembly and the fitting of FIG. 35 taken along the line 37-37 in FIG. 36.

FIG. 38 is a side elevation view of a hydration system that includes a quick-connect assembly according to the present invention and which is fluidly interconnected with a gas mask.

Figure 39:
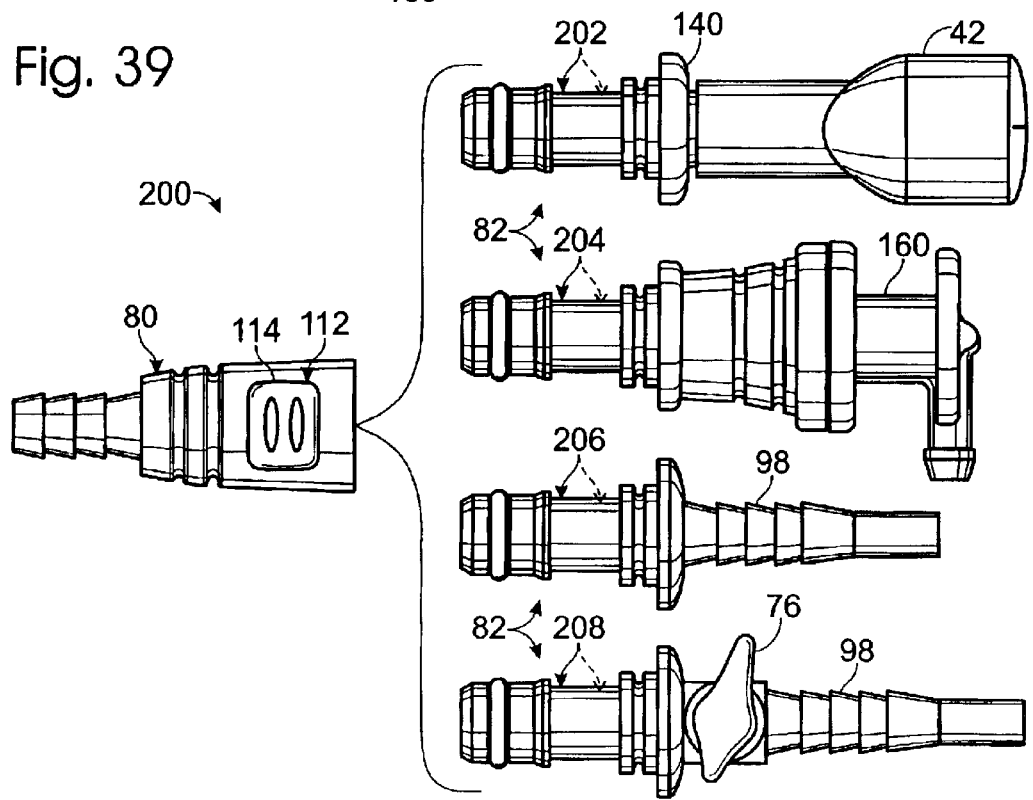
FIG. 39 is an isometric view showing an illustrative quick-connect kit according to the present invention.

FIG. 39 is an isometric view showing an illustrative quick-connect kit according to the present invention.

FIG. 40 is a fragmentary isometric view showing a chemically resistant component that may be used with quick-connect assemblies according to the present invention.

FIG. 41 is a fragmentary isometric view showing another chemically resistant component that may be used with quick-connect assemblies according to the present invention.

FIG. 42 is a fragmentary, schematic view of illustrative chemically resistant components that may be used with quick-connect assemblies according to the present invention.

FIG. 43 is a fragmentary side elevation view of a chemically resistant quick-connect assembly and drink tube according to the present invention.

DETAILED DESCRIPTION OF BEST MODE OF THE INVENTION

Illustrative examples of personal hydration systems are shown in FIGS. 1-3 and generally indicated at 10. System 10 includes a fluid reservoir, or bladder, 12 for storing potable drink fluid, such as water, sports drinks, juice, etc. Reservoir 12 includes a body portion 14 with an internal compartment 16, which is adapted to store a volume of drink fluid 18. Typically, compartment 16 will hold at least 24 ounces, and it may hold as much as 32 ounces, 50 ounces, 70 ounces, 100 ounces, 200 ounces or more of drink fluid 18. Reservoir 12 is preferably flexible, with at least a region, if not the entirety, of body portion 14 and/or reservoir 12, being formed from a flexible, waterproof material. An example of a suitable material is polyurethane, although others may be used.

Reservoir 12 may vary in shape and size within the scope of the invention, such as depending upon on the volume of fluid to be carried by the user and the intended use of the hydration system. For example, and as discussed in more detail below, hydration systems according to the present invention may (but are not required to) include a pack into which the reservoir is permanently or removably housed. In such an embodiment, the reservoir will be sized to fit within the pack, and the pack will typically include one or more straps that are configured and sized to extend around a portion of a user's body, such as the user's shoulder(s) or waist. Some hydration systems are adapted to be received or otherwise carried within a user's clothing or on a device, such as a bicycle, that is proximate a user while the user is engaged in a particular activity. In such an embodiment, the clothing or device will typically include a sleeve or other mount sized to receive the hydration system and/or the hydration system will typically include one or more suitable mounts for securing the reservoir to the device or within a user's clothing.

Reservoir 12 includes an input port 20 through which the reservoir is charged with a volume of potable drink fluid. Illustrative examples of suitable input ports 20 are shown in FIGS. 1-3. For example, in FIG. 1 port 20 takes the form of a sealable filler spout 22 with a cap 24 that is selectively secured to the spout through a friction fit. In this configuration, the cap is pressed directly onto the spout to establish a frictional seal therebetween. In FIGS. 2 and 3, port 20 takes the form of a threaded neck 26 upon which a threaded cap 28 is threadingly engaged to seal the opening in the neck. Other examples include a reservoir that is sealed by folding or otherwise interlocking or compressing opposed surfaces of the reservoir together to close an opening formed in the reservoir.

Reservoir 12 also includes an exit port, or output port, 30 through which drink fluid is drawn from compartment 16 for delivery to a user. As shown in FIGS. 1-3, an end 32 of an elongate, flexible drink tube, or tube assembly, 34 is mounted or otherwise fluidly connected to port 30. As used herein, the term "tube assembly" may refer to a single length of tubing that defines a fluid conduit for drink fluid drawn from reservoir 12, as well as to a plurality of interconnected lengths of tubing. Tube assembly 34 is of sufficient length to extend from reservoir 12 to the user's mouth when the system is worn by the user, such as on the user's back or waist. End 32 may be removably attached to port 30, or may be integrally formed or permanently mounted thereupon. For example, as shown in FIGS. 1 and 2, exit port 30 is mounted on body 14 and includes a fitting, or mount, 36 to which end 32 is secured. It is within the scope of the invention that exit port 30 may have a variety of configurations, including an embodiment in which exit port 30 includes an aperture in body 14 through which end 32 is inserted. An illustrative example of a suitable exit port is disclosed in U.S. Pat. No. 5,727,714, the complete disclosure of which is hereby incorporated by reference for all purposes, but any suitable structure that enables the drink tube to be fluidly coupled to the compartment of reservoir 12 may be used.

The other end 40 of tube assembly 34 is adapted to provide fluid 18 that is drawn from compartment 16 through exit port 30 and tube assembly 34 to a user's mouth. A mouthpiece 42 is typically coupled with end 40 of tube assembly 34, such that tube assembly 34 is in fluid communication with mouthpiece 42. Mouthpiece 42 may be removable from tube assembly 34 or alternatively may be integrated with tube assembly 34. For example, mouthpiece 42 may simply be the end 40 of tube assembly 34 distal output port 30, the output of the subsequently described quick-connect assembly, an output from a mouthpiece or other structure mounted on the subsequently described quick-connect assembly, or structure that is removably or permanently attached to end 40. As used herein, components of the hydration system that extend from the reservoir and through which drink fluid drawn through exit port 30 flows may be referred to as being downstream from the reservoir. Accordingly, the exit port and other elements of the hydration system downstream from the reservoir may be referred to as the downstream assembly of the hydration system.

An example of a mouthpiece 42 is a bite-actuated, or mouth-actuated, mouthpiece 44 that it is selectively deformed from a sealed (or closed) position, in which fluid is prevented from being dispensed from the mouthpiece, to a dispensing (or open) position, in which the user may draw fluid from the reservoir through the tube and mouthpiece when the user compresses the mouthpiece with the user's teeth or lips. Bite-actuated mouthpieces are often biased or otherwise configured to automatically return to the closed position when a user is not exerting force upon the mouthpiece to configure the mouthpiece to its closed position. Examples of suitable bite-actuated mouthpieces are disclosed in U.S. Pat. Nos. 6,070,767, 5,727,714, 5,085,349 and 5,060,833, the complete disclosures of which are hereby incorporated by reference.

As shown in FIGS. 4-6, system 10 may include a pack 50 within which reservoir 12 is permanently or removably housed. Pack 50 typically is adapted to be worn on a user's body. For example, the pack shown in FIGS. 4 and 5 includes a pair of shoulder straps 52 for mounting the pack on a user's back or chest. Although a pair of straps 52 is shown in FIGS. 4 and 5, it is within the scope of the invention that only a single strap may be used, such as to extend diagonally across a user's torso or over a selected one of the user's shoulders. As a further example, pack 50 is shown in FIG. 6 including waist straps 54 that are adapted to secure the pack around a user's waist. Straps 52 and 54 may be formed from one or more segments that are adapted to define (alone or with the pack) a closed perimeter, such as to encircle a portion of a user's body. It is further within the scope of the invention that pack 50 may include one or more waist straps and one or more shoulder straps, or as discussed herein, no straps at all.

In FIGS. 4-6, it can be seen that pack 50 includes an opening 56 through which reservoir 12 may be selectively inserted and removed from a storage compartment 58 within the pack. It should be understood that packs into which reservoirs are permanently mounted may be formed without such an opening. Pack 50 may be adapted to hold items in addition to reservoir 12. For example, in FIGS. 4 and 6, pack 50 is shown including one or more pockets 60. Similarly, compartment 58 may be sized so that it is sufficiently larger than reservoir 12 that other items may be stored within the compartment. Additionally or alternatively, pack 50 may include one or more internal compartments that are adapted to hold items other than reservoir 12.

Examples of hydration systems and mouthpieces therefor are disclosed in the above-identified and incorporated U.S. patents, as well as in pending U.S. patent application Ser. Nos. 09/902,935 and 09/902,792, the disclosures of which are also hereby incorporated by reference for all purposes. It is within the scope of the invention that hydration system 10 may be formed without a pack. For example, hydration systems that are designed to be received within a user's clothing may be formed without a pack. Similarly, a hydration system may be added as an accessory to a pack, such as a backpack, knapsack or fanny pack, that is not specifically configured to receive that hydration system.

Personal hydration systems according to the present invention further include at least one quick-connect assembly 70. Assembly 70 is adapted to fluidly and mechanically interconnect portions of the hydration system downstream (toward mouthpiece 42) from reservoir 12. Assembly 70 enables the interconnected components to be quickly and repeatedly coupled together and released from engagement without requiring the time or effort required with conventional hydration system components. As such, the quick-connect assembly may also be described as a quick connect/disconnect assembly, or quick coupling assembly. As described in more detail herein, the quick-connect assembly includes at least a pair of members that are configured to be fluidly connected with adjacent components of a hydration system. The members are further adapted to selectively and releasably interconnect with each other, such as by being releasably secured together by a lock member of the assembly.

In FIGS. 1-6, various illustrative placements for assembly 70 are schematically illustrated. For example, in FIG. 1, assembly 70 is shown interconnecting adjacent lengths 72 and 74 of tubing forming tube assembly 34. In FIG. 2, assembly 70 is shown interconnecting end 40 of tube assembly 34 with a manually operated on/off valve 76. In FIG. 2, valve 76 and assembly 70 are shown in solid lines proximate mouthpiece 42, in what may be referred to as an end-of-line configuration. However, it is within the scope of the invention that an in-line configuration may be used as well, as illustrated in dashed lines in FIG. 2. Similarly, a pair of assemblies 70 is shown in dashed lines in FIG. 2 to schematically represent that the assembly may be located on either, or both, sides of valve 76. In FIG. 3, assembly 70 is shown in solid lines interconnecting end 32 of tube assembly 34 with exit port 30, and in dashed lines in another in-line configuration. In FIG. 4, assembly 70 is shown interconnecting end 40 and mouthpiece 42.

Assembly 70 includes at least one mount to which a component of hydration system 10 is fluidly interconnected so that drink fluid drawn from reservoir 12 may flow through a fluid conduit defined at least partially by the assembly. When assembly 70 is configured for in-line operation, it will typically include a pair of generally opposed mounts, one for establishing a fluid interconnection with a portion of the hydration system downstream from the reservoir and upstream from the quick-connect assembly, and another for establishing a fluid interconnection with a portion of the hydration system downstream from the quick-connect assembly. As used herein, the term "fluid communication" refers to elements between which drink fluid may flow, and the terms "fluidly connected," "fluidly interconnected," and the like are used to refer to components that are coupled together and between which drink fluid may flow. Illustrative examples of components that may be connected upstream relative to the quick-connect assembly include exit port 30, a length of tube assembly 34, and an on/off valve. Illustrative examples of components that may be connected downstream relative to the quick-connect assembly include an on/off valve, length of tube assembly 34, and mouthpiece 42.

It is also within the scope of the invention that assembly 70 may include at least one component integrated therewith. By this it is meant that the component may be at least partially integrally formed with a portion of assembly 70, such as by sharing a common housing, and/or that the component is permanently mounted or otherwise secured to the assembly such that the component is not designed or configured to be repeatedly removed from and reattached to the assembly. Illustrative and non-exclusive examples of components that may be integrated with the assembly include mouthpiece 42, exit port 30 and on/off valve 76. This integration of components with assembly 70 is schematically illustrated in FIGS. 5 and 6, with assemblies 70 respectively including exit port 30 and on/off valve 76 in FIG. 5, and mouthpiece 42 in FIG. 6. As a further variation, assembly 70 may be integrated with a fitting that is configured to interchangeably receive a component of the hydration system or a device to which the hydration system will be coupled.

An example of a quick-connect assembly 70 that is constructed according to the present invention is shown in FIGS. 7 and 8. As shown, assembly 70 includes female and male members 80 and 82 that are configured to releasably engage each other to establish a mechanical interconnection therebetween. Members 80 and 82 also define a fluid conduit 84 that extends through the members to enable drink fluid that is drawn from reservoir 12 to be drawn through the members, either for dispensing directly to a user or to components of the hydration system that are attached to assembly 70 and extend downstream therefrom. Members 80 and 82 are configured to be quickly and repeatedly released from engagement with each other, such as when a user depresses a release member, which is discussed in more detail subsequently. Members 80 and 82 may also be described as female coupling members and male coupling members, respectively.

Female member 80 includes a body 86 that defines a central cavity 88. As perhaps best seen in FIG. 12, cavity 88 forms part of a fluid conduit 84, which extends through female member 80 from an opening 90 to a corresponding opening 92 in a distal region 94. Opening 90 is sized to receive at least the tip of the subsequently described male member. In the illustrated embodiment, region 94 is generally opposed to opening 90 and is in fluid communication therewith such that drink fluid that enters cavity 88 through a first one of openings 90 or 92 may flow through the cavity and exit the cavity through the other one of the openings. Body 86 also includes at least one lateral aperture 96. As shown in FIGS. 7-8 and 10-12, a pair of apertures 96 is shown, but it is within the scope of the invention that more or less apertures may be used, such as a single aperture or multiple apertures.

Region 94 includes either a mount or a component of the hydration system. In FIG. 7, female member 80 is shown with a region 94 in the form of a barbed mount 98 for tube assembly 34. It is within the scope of the invention that region 94 and/or mount 98 may have other configurations. For example, when region 94 takes the form of a mount 98 for a length of tubing forming a part of tube assembly 34, the mount should be configured so that the tubing may be coupled thereto to form a fluid-tight seal, and preferably retained upon the mount with sufficient force so that the tubing is not inadvertently removed from the mount. In the illustrated embodiment shown in FIGS. 7-8 and 10-12, the tubing is stretched over mount 98, but it is also within the scope of the invention that the tubing may be inserted into a bore in the mount and/or that the mount extends both internal and external the tubing. As a further example, and as discussed in more detail herein, region 94 may also include a mount for exit port 30, mouthpiece 42, on/off valve 76, or other components of the hydration system, and/or may include any of these components integrated therewith.

As shown in FIGS. 7-9, male member 82 also includes a region 94 that may have any of the configurations, elements and variations as the corresponding region 94 described with respect to the female member. For the purposes of illustrating additional suitable configurations, region 94 is illustrated as a mount 100 that does not include barbs. Mount 100 may receive mouthpiece 42 or a length of tubing, similar to mount 98. In dashed lines in FIG. 9, mount 100 is shown with a barbed fitting to provide a graphical illustration of this version of male member 82. With reference to FIG. 9, it can be seen that male member 82 further includes a shaft 102 with a tip 104 that is adapted to be inserted through the opening in a corresponding female member. In the illustrated embodiment, tip 104 is externally tapered, or beveled, but this configuration is not required. Male member 82 also includes a cavity 88' that defines a portion of fluid conduit 84, and which extends from an opening 92 in region 94 and at least partially through shaft 102 to another opening 106. In the illustrated embodiment, opening 106 is formed in tip 104, but it is within the scope of the invention that shaft 102 may additionally or alternatively include one or more openings that extend through the sidewalls 108 of shaft 102. As perhaps best seen in FIGS. 7 and 8, drink fluid that flows through the quick-connect assembly enters and exits the assembly through openings 92. Accordingly, the openings may also be referred to as ports. It should be understood that the respectively ports may form entry ports or exit ports depending upon the fluid flow orientation of the male and female members relative to the reservoir.

In FIGS. 7 and 8, regions 94 are depicted defining a linear fluid conduit 84 extending therebetween. It is within the scope of the invention, and the description of the regions being generally opposed to each other, that the regions may define a non-linear fluid conduit that extends therebetween, or a fluid conduit that includes both linear and non-linear portions. For example, regions 94 may extend at angles of less than 180° relative to the long axes of the portions of the fluid conduit defined thereby. For example, the regions may extend at angles in the range of 15-165°, 30-150°, 45-135°, 90°, etc. Because the male and female members are configured to be coupled together in an at least partially overlapping (or nested) configuration, the portion of the male member 82 that is inserted into opening 90 of female member 80 will typically be complimentarily configured with the corresponding portion of female member 80 to establish a fluid-tight connection therebetween.

In FIG. 7, assembly 70 further includes a lock member 112, which is adapted to mechanically and releasably secure the male and female members together. In the illustrated embodiment, lock member 112 takes the form of a lock ring 114, which includes a central passage 116 and at least one ear, or projecting member, 118 extending generally away from the passage. Passage 116 is sized so that tip 104 and at least a portion of shaft 102 of male member 82 may be inserted therethrough. In FIG. 7, a pair of projecting members 118 is shown, with each of the projecting members being sized to extend into a corresponding one of the apertures 96 in female member 80. Typically, the number of projecting members 118 will be at least as great as the number of apertures 96. Additional views of lock ring 114 are shown in FIGS. 13-15.

In operation, lock ring 114 is positioned within cavity 88 of female member 80, with a projecting member 118 extending into and optionally at least partially through each of the apertures 96. In the configuration shown in FIG. 7, lock ring 114 may be described as being in its neutral, unlocked, or disconnected configuration. As shown, passage 116 has a generally elliptical or oval-shaped configuration, with its openings 120 being generally aligned with opening 90.

To couple the male and female members together, the tip of the male member is inserted into and through the passage until the lock ring is seated upon a corresponding mount 122 on the shaft, such as shown in FIG. 8. As shown in FIGS. 7-9, mount 122 includes a region 124 of reduced cross-sectional area that is bounded with a region 126 of greater cross-sectional area on at least the side extending toward tip 104. As the tip is inserted into the passage, lock ring 114 deforms from its neutral configuration to a configuration in which passage 116 has a generally circular configuration defined largely by the shape of shaft 102. In this position, lock ring 114 and assembly 70 may be described as being in an intermediate configuration. More specifically, the female and male members may be frictionally retained together, but the members are not yet locked together to prevent forces upon the upstream or downstream components from causing the members to disconnect from each other, and/or to establish a fluid-tight seal between the members. Ring 114 is formed from a resilient, yet deflectable, material so that the ring is at all times biased to return toward its neutral configuration. An example of a suitable material is an acetal polymer, such as Delrin® 500, which is sold by DuPont. After region 126 passes through passage 116, the ring is seated upon region 124, thereby securing the female and male members together. In this position, lock ring 114 and assembly 70 may be described as being in their locked configurations. Although not required, it is within the scope of the invention that the male and female members may be rotated relative to each other while in this configuration without impairing the fluid-tight seal established by the members and lock ring 114.

To disconnect assembly 70, a user depresses at least one of projecting members 118 to urge the lock ring toward its intermediate configuration, and more specifically, to deflect lock ring 114 to a configuration in which shaft 102 may be withdrawn through the passage. Accordingly, projecting members 118 may also be referred to as release members. After the shaft is removed and the user-imparted forces are removed, the lock ring returns automatically to its neutral configuration.

As discussed, tip 104 of shaft 102 may be beveled. This configuration facilitates the alignment and insertion of the shaft into passage 116. This configuration may additionally or alternatively be described as enabling the assembly to be secured together without requiring a user to depress members 118 and thereby deform the lock ring so that the shaft may be inserted through passage 116. Instead, the force of tip 104 being urged against opening 120 of passage 116 deflects the passage to its intermediate configuration, as well as correcting any misalignment of the shaft relative to the passage. As such, quick-connect assembly 70 may also be referred to as a plug-in connector, and may be connected and disconnected without requiring a user to use both hands, although two-handed operation is also within the scope of the invention. When the male and female members of quick-connect assembly 70 are adapted to be coupled together merely by inserting the male member into the female member until the lock ring engages and retains the male member, the quick-connect assembly may be described as being configured to automatically couple the members together upon insertion of the male member.

Also shown in FIG. 7 is a seal member 130 in the form of an O-ring 132, which may be used to enhance the fluid seal established by assembly 70. It is within the scope of the invention that seal member 130 may take other forms, including being integral with members 80, 82 and/or lock member 112, and that more than one seal member may be used. In the illustrated configuration, shaft 102 includes a channel 134 into which O-ring 132 is seated. It is within the scope of the present invention that the O-ring may be seated within female member 80 instead of being mounted on male member 82, that both members may include a seal member, and that neither member may include a seal member other than the mating surfaces of the members themselves. These variations and alternatives apply to all of the O-rings and other seal members described and illustrated herein.

As discussed previously, assembly 70 may include at least one other component of hydration system 10 at least partially integrated therewith. An example of such a configuration is shown in FIGS. 16-21 in which the assembly includes an integrated exit port 30. More specifically, in the illustrated embodiment, male member 82 and exit port 30 have been integrated together. It is within the scope of the invention that a female member 80 may alternatively be integrated with exit port 30. Similarly, the following discussion and illustrative figures demonstrate various other embodiments of quick-connect assemblies according to the present invention that also include other components and/or specialized mounts integrated therewith. It is within the scope of the invention that the illustrative pairings of male and female members with the mounts and/or other integrated components are presented for the purpose of illustrating exemplary configurations and that the pairings may be reversed without departing from the scope of the invention.

In FIGS. 22 and 23, male member 82 is shown integrated with a fitting, or mount, 140 that is sized to receive a bite-actuated mouthpiece 44. Mouthpiece 44 is formed from a deformable material, such as silicone, and includes a neck 142 that is stretched around fitting 140. It within the scope of the invention that fitting 140 may be integrated with female member 80 instead of male member 82. Similarly, fitting 140 and mouthpiece 44 may have other configurations without departing from the scope of the invention.

In FIGS. 24-26, female member 80 is shown integrated with on/off valve 76. To illustrate that assembly 70 may include more than one integrated component, in FIG. 24, male member 82 is also shown integrated with a fitting 140 and in FIGS. 25 and 26, male member 82 is also shown integrated with a mount 98. Valve 76 is adapted to obstruct or permit the flow of drink fluid therethrough depending upon the relative configuration of the valve. When the valve is configured to its open (on) configuration, drink fluid may flow through the valve, and when the valve is configured to its closed (off) configuration, the valve blocks fluid conduit 84 so that drink fluid cannot flow through the valve. As shown, valve 76 includes a body 150, a seal member 152 and a rotatable core 154 with a handle, or user-manipulable, portion 156. To configure the on/off valve between its open and closed configurations, a user rotates core 154 relative to body 150, such as by using handle 156. Although not required, on/off valves are typically configured to remain in a user-selected configuration until repositioned by the user. Therefore, unlike a bite-actuated mouthpiece that is biased to automatically return to a closed position, on/off valves typically will remain in a selected open or closed configuration until repositioned by a user.

Additional views of female member 80 and body 150 of valve 76 are shown in FIGS. 27-29, and additional views of core 154 are shown in FIGS. 30 and 31. Similar to the previously described quick-connect assemblies, it is within the scope of the invention that the on/off valve may be integrated with the male member instead of the female member. As shown with reference to FIGS. 29 and 31, the body 150 of on/off valve 76 includes apertures 151 and 153 through which drink fluid in fluid conduit 84 may flow into and be removed from a chamber, or cavity, 155 into which at least a portion of core 154 extends when the on/off valve is assembled. As shown in FIG. 31, core 154 also includes at least a corresponding pair of apertures 157 and 158 that selectively align with the apertures in the body depending upon the relative rotational position of the core relative to the body. When the apertures at least partially align, drink fluid may flow therethrough, thereby permitting drink fluid to be drawn from the reservoir and dispensed to a user through mouthpiece 42. When the apertures do not overlap, fluid conduit 84 is obstructed and drink fluid cannot flow therethrough.

Additional examples of suitable on/off valves 76 are disclosed in co-pending U.S. patent application Ser. No. 09/902,792, the disclosure of which is hereby incorporated by reference for all purposes. As discussed, hydration systems with quick-connect assemblies according to the present invention may be formed with an on/off valve that is not integrated with a quick-connect assembly, and/or without an on/off valve. Similarly, valve 76 may include other suitable configurations for selectively restricting the flow of drink fluid from reservoir 12, such as with core portions that are actuated by mechanisms other than by rotating the core relative to the body of the valve. Even when such a configuration is used, variations to the structure shown in FIGS. 24-31 may be used without departing from the invention. For example, core 154 may include a greater or lesser number of apertures. As another example, core 154 may be actuated by a user using a differently configured, or shaped, user-manipulable portion 156. FIG. 32 demonstrates an example of another suitable core 154. As shown, the handle, or user-manipulable portion 156, of the core has been enlarged and includes ribs 159 to enhance gripping of the handle by a user.

Another example of a component that may be attached to tube assembly 34 is a gas mask fitting, which enables a user wearing a gas mask to draw drink fluid from hydration system 10 via a mouthpiece within the gas mask without exposure of the fluid to the external environment. Accordingly, it is within the scope of the invention that either the female or male components of quick-connect assembly 70 may include a mount or fitting that is adapted to couple the hydration system with a gas mask's fluid intake tube. It is further within the scope of the invention that either of members 80 or 82 may include an integrated gas mask fitting.

An example of a quick-connect assembly 70 with an integrated gas mask fitting is shown in FIG. 33. In the illustrated embodiment, the fitting is generally indicated at 161 and is shown integrated with male member 82. It is within the scope of the invention, however, that fitting 160 may alternatively be integrated with female member 80 and/or that the fitting may be coupled to one of the previously described and/or illustrated mounts 98. The illustrated embodiment of fitting 160 is adapted for use with an M-40 gas mask, but it is within the scope of the invention that the particular size and configuration of fitting 160 may vary to conform with the gas mask with which the fitting will be used. As shown in FIG. 33, fitting 161 includes a housing 162 within which a seal member 164 (such as one or more O-rings) and a lock ring 166 are retained.

In FIG. 35, another assembly is shown with an integrated gas mask fitting 160, which is generally indicated at 170. Fitting 170 is configured for use with AVON™ brand gas masks and includes a housing 172, an insert 174 and a seal member (such as one or more O-rings) 176, which are secured within the housing by a retainer 178. Also shown in FIG. 35 is a coupling member 180 with an output port 182 that is adapted to connect to the fluid-intake tube of a gas mask. Fittings 160 may also include a valve assembly that is adapted to automatically stop the flow of fluid therethrough when the fitting is not coupled to a gas mask's fluid-intake tube. In FIGS. 36 and 37, assembly 70 is shown including both a gas mask fitting and an on/off valve 76 to provide further examples of a quick-connect assembly with more then one integrated component.

FIG. 38 provides an example of a hydration system 10 that includes a quick-connect assembly 70 with an integrated gas mask fitting 160 and which is fluidly interconnected with a gas mask 190. It should be understood that gas mask 190 has been somewhat schematically illustrated in FIG. 38 and that mask 190 is intended to graphically represent any suitable gas mask, including gas masks that cover primarily a user's nose and mouth, gas masks that cover a user's face, and gas masks that cover a user's entire head. Regardless of the configuration, mask 190 is adapted to provide drink fluid from reservoir 12 to the user's mouth without exposing the drink fluid to the environment outside of the hydration system and gas mask. In the illustrated embodiment, tube assembly 34 may be described as including a length 192 of flexible tubing that fluidly interconnects the exit port of the hydration system's reservoir with quick-connect assembly 70 and a length 194 of tubing that fluidly interconnects assembly 70 and gas mask 190. Length 194 may be the intake tube of the gas mask or may be fluidly interconnected with the intake tube of the gas mask. Each of these lengths of tubing may be comprised of one or more fluidly interconnected tube portions.

As discussed, hydration systems that include quick-connect assemblies enable components of the hydration system to be quickly and fluidly interconnected together or released from an existing fluid interconnection. As the preceding drawings demonstrate, it is within the scope of the invention that at least one of the male or female members of quick-connect assemblies according to the present invention may be configured to establish fluid communication with a plurality of different components and/or accessories of the hydration system and that the members may even include these components and/or accessories integrated therewith.

As an illustrative example, consider a hydration system that includes a quick-connect assembly that fluidly interconnects the drink tube of the hydration system with a mouthpiece or other suitable outlet for the drink fluid that is drawn from the reservoir. More specifically, the assembly will include a first member (such as either one of the previously described and/or illustrated male or female members) that includes a mount upon which the drink tube is mounted. To that member, a variety of components can then be quickly fluidly interconnected simply by mounting the component(s) to the corresponding mount of a second, complimentary connector member and/or utilizing a second, complimentary connector member that contains an integrated component. Continuing this example, assuming that the first member is female member 80, any number of complimentary (sized and shaped to be coupled to the female member by lock member 112) male members 82 may be interchangeably and fluidly secured thereto. Illustrative examples of these male members include a male member with an attached or integral mouthpiece, another male member with an attached or integral mouthpiece (such as for use by a different user or if the first mouthpiece is dirty), a male member containing an on/off valve, a male member with a fitting adapted to receive an additional length of tube assembly, a male member with a gas mask adapter, etc.

A quick-connect assembly having at least one male or female member and a plurality of complimentary members may be referred to as a quick-connect kit, in that a user can selectively interconnect the components depending upon the user's preferences and desired application of the hydration system. An example of such a quick-connect kit is shown in FIG. 39 and generally indicated at 200. As shown, kit 200 includes a female member 80 and a plurality of male members 82, with at least one of the male members typically having a different mount or integrated component than the others. In the illustrated embodiment, the male members include a member 202 having a fitting 140 for a mouthpiece 42, a member 204 having a fitting 160 for a gas mask, a member 206 having a mount 98, which in the illustrated embodiment is barbed, and a member 208 having an on/off valve 76. It is within the scope of the invention that quick-connect kits 200 may include some or all of these illustrative combinations of male and female members. It is further within the scope of the invention that kit 200 may include more than one of a particular type of member and/or one or more members that differ from those illustrated in FIG. 39.

As discussed herein, hydration systems 10 with quick-connect assemblies 70 according to the present invention may be used for a variety of applications, including sporting applications, recreational applications, industrial applications, and military/law enforcement applications. In applications where the hydration system is configured for use with gas masks or otherwise expected to be exposed to harmful chemical agents, it may be desirable for at least a portion of the hydration system to be resistant to chemical agents, such as mustard (HD) blister agent and sarin (GB) nerve agent. Mustard blister agent is a non-volatile, very caustic substance that is effective at penetrating many materials. Mustard vapor can produce skin irritation (erythema) at dosages of approximately 100 mg-min/m$^3$. Sarin nerve agent is a volatile material that is effective at migrating through pores and other apertures or gas-permeable openings in materials. Sarin vapor can incapacitate an individual at dosages of approximately 8000 mg-min/m$^3$. Sarin and mustard agents are not exclusive of the chemical agents to which hydration systems according to the present invention may be constructed to be resistant. However, the combination of the penetrating ability of mustard agent and the migratory ability of sarin agent to collectively form an effective test for most chemical agents. In other words, materials that are sufficiently chemically resistant to both mustard and sarin agents are typically sufficiently chemically resistant to other chemical agents, such as anthrax, small pox and the like.

Preferably, the chemically resistant components of the hydration system are constructed to meet, and preferably exceed, the chemical penetration standards established by the U.S. Army Center for Health Promotion and Preventative Medicine (CHPPM). Expressed in terms of the amount of nerve agent ingested by a user drinking fifteen liters of drink fluid per day (with a seven day maximum), these maximum standards may be expressed as 0.047 mg/L of mustard agent and 0.0093 mg/L of sarin agent. When tested, it is preferable that the chemically resistant components of hydration system 10 prevent the above-identified maximum acceptable amounts of these agents from passing therethough when exposed to the agents in lethal concentrations (such as 10 g/m$^2$ of each agent) for at least 24 hours. Even more preferably, the components prevent even 50%, 60% or 75% of the CHPPM standards from being reached.

Preferably, the entire hydration system, as assembled for use, is resistant to these chemical agents so that drink fluid may be stored in reservoir 12 and selectively dispensed to a user through tube assembly 34 and any associated components without the drink fluid being contaminated by the chemical agents. By "as assembled for use," it is meant that portions of the hydration system that are enclosed by sufficiently chemically resistant materials may themselves be formed from materials, or otherwise be constructed, such that they are not themselves sufficiently chemically resistant. For example, an illustrative, schematic component of a hydration system is shown in FIG. 40 and indicated generally at 220. As shown, component 220 is depicted as a length of flexible drink tube, such as may be utilized in tube assembly 34. In FIG. 40, component 220 is entirely formed from one or more materials 222 that meet or exceed the CHPPM (or other selected) standards for one or more selected chemical agents in the composition and construction present in the hydration system. By this it is recognized that the chemical resistance of a material is at least partially defined by the material's composition and by the thickness of the material. Therefore, a material that is sufficiently chemically resistant to sarin and mustard agents, for example, when present in a first thickness may not be sufficiently chemically resistant if the thickness is reduced.

Illustrative, non-exclusive examples of chemically resistant materials for constructing components of hydration system 10 include thermoset epoxies such as vulcanized butyl rubber and chloro-isobutene-isoprene rubber (chloro-butyl), thermoplastic elastomers such as Sentoprene™ rubber, nylon, ABS, polyurethane, polypropylene, polyethylene. The choice of materials for a particular component include considerations of the expected forced to be applied to the component, structural requirements, and flexibility requirements, and accordingly may vary from component to component and system to system.

It is within the scope of the invention that chemically resistant components of a hydration system may include a chemically resistant cover, or sheath, that is applied over a structure that is not, or not sufficiently, chemically resistant. For example, in FIG. 41, a portion of tube assembly 34 is shown encased within a cover, or sheath, 224 that is formed from one or more chemically resistant materials 222. Collectively, the sheathed tube assembly provides another example of a chemically resistant component 220. More specifically, although tube assembly 34 may not be sufficiently chemically resistant, the assembled component 220 is sufficiently chemically resistant because sheath 224 prevents the chemical agents from reaching tube assembly 34. The sheath may be permanently bonded or otherwise applied to the component or removably mounted on the component.

It is also within the scope of the invention that the preceding discussion applies to other flexible components of the hydration system (such as reservoir 12, some mouthpieces 42 and some exit ports 30) and other more rigid components of the hydration system (such as some exit ports 30, on/off valve 76, quick-connect assembly 70, gas mask fittings 160 and some mouthpieces 42). In FIG. 42, examples of these and other suitable constructions for chemically resistant components of a hydration system are schematically illustrated. As shown, each illustrative, fragmentary component includes an exterior surface 230 that is oriented to be contacted by external chemical agents to which the hydration system is exposed, and an internal surface 232 that is oriented to contact drink fluid within the hydration system. In FIG. 42, reference numeral 240 schematically depicts a component that is entirely formed from a chemically resistant material, and reference numeral 242 schematically depicts a component that includes an outer covering or sheath 224 that is formed from a chemically resistant material. It may be desirable to include an underlying coating or fluid barrier 246 with some chemically resistant materials to prevent the materials from affecting the taste of the drink fluid carried in the hydration system. For example, vulcanized butyl rubber tends to negatively affect the taste of water or other drink fluids and therefore, a waterproof barrier 246 may be used to preserve the original taste of the drink fluid when vulcanized butyl rubber is used as chemically resistant material 222. This construction is schematically illustrated at 248 in FIG. 42. Barrier 246 may take any suitable form, such as being a film, coating, sheet, independent layer, etc. As yet another example, and as schematically illustrated at 250, a chemically resistant component 220 may be formed from a plurality of layers that collectively provide a chemically resistant composite, even if one or more of the layers (or even each of the individual layers) is not chemically resistant.

In FIG. 43, a less schematic example of chemically resistant components 220 is provided. As shown, tube assembly 34 (including tube portions 192 and 194) and a quick connect assembly 70 with an on/off valve 76 and a gas-mask fitting 160 are all fluidly interconnected and each of these components is formed from at least one chemically resistant material 222.

The portion of a hydration system to be formed from chemically resistant materials depends to some degree upon the intended environment and method of using the hydration system. Of course, in many applications, such as sporting and recreational applications, none of the hydration systems components need to be constructed of these materials. In applications where there is reasonable risk of exposure to chemical agents, the most protective design is for the entire hydration system (reservoir, exit port, tube assembly, mouthpiece, quick-connect assembly, and any additional components) be constructed from chemically resistant materials so that the drink fluid is protected while stored and dispensed regardless of any other protective measures employed by a user.

Industrial Applicability

The present invention is applicable in any hydration system in which drink fluid is provided to a user. The invention is particularly useful with personal hydration systems in which drink fluid is carried by a user in a fluid reservoir and delivered for drinking to a user via a mouthpiece that is fluidly connected to the reservoir by a drink tube. Embodiments of the present invention are also applicable to personal hydration systems that are selectively configured for use by users wearing gas masks.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

An illustrative, non-exclusive example of an invention according to the present disclosure is a personal hydration system that includes at least (1) a reservoir having a body portion with an internal compartment adapted to receive a volume of drink fluid and a selectively sealable fill port having an opening through which drink fluid may be added to or removed from the compartment; (2) an elongate downstream assembly extending in fluid communication from the reservoir to define a fluid conduit through which drink fluid may flow from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect the quick-connect assembly with an intake tube of a gas mask, and further wherein the downstream assembly further includes at least one quick-connect assembly adapted to fluidly interconnect at least two of the plurality of components, wherein the quick-connect assembly includes at least (3) a male coupling member having a shaft that includes a tip and which defines at least a portion of the fluid conduit, wherein the male coupling member includes a region distal the tip with a port through which drink fluid may selectively flow into or out of the assembled quick-connect assembly; (4) a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and (5) a resilient lock ring coupled to the female coupling member and adapted to selectively engage prevent removal of the shaft of the male coupling member when the shaft of the male coupling member is at least partially inserted into the passage, wherein the lock ring defines a passage and is selectively deformable between an unlocked orientation, in which the tip of the male coupling member may pass through the passage, and a locked orientation, in which the tip of the male coupling member may not pass through the passage, and further wherein the lock ring is biased to the locked configuration.

As another non-exclusive example, the present disclosure is also directed to a quick-connect kit for forming an assembled quick-connect assembly that defines a fluid conduit through which drink fluid may flow, with the kit including (1) at least one male coupling member having a shaft that includes a tip and which defines at least a portion of a fluid conduit, wherein the male coupling member includes a region distal the tip with a port through which drink fluid may selectively flow into or out of the assembled quick-connect assembly, and further wherein the region includes a mount; (2) at least one a female coupling member having a body with an opening sized to receive at least the tip of a male coupling member, wherein the opening is in fluid communication with a cavity that extends through the female coupling member to a region distal the opening that includes a port through which drink fluid may selectively flow into or out of the assembled quick-connect assembly, wherein the region includes a mount; and (3) a lock member adapted to releasably and fluidly interconnect a male coupling member and a female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the passage of the female coupling member; with the mount of a first one of the male and the female coupling members adapted to be fluidly interconnected with a tube assembly of a hydration system upstream from a second one of the male and the female coupling members, and with the kit including at least a pair of the second one of the male and the female coupling members, with the mount of one of the second one of the male and the female coupling members adapted to fluidly interconnect the assembly with at least one of a length of drink tubing and a mouthpiece and the mount of the other of the second one of the male and the female coupling members adapted to fluidly interconnect the assembly with an intake tube of a gas mask, and furthermore upon configuring the lock member to its unlocked configuration, the second ones of the male and the female coupling members may be selectively and interchangeably fluidly interconnected with the first one of the male and the female coupling members.

As yet another example, the present disclosure is directed to personal hydration systems and/or gas masks that include such a kit.

As still another example, the present disclosure is directed to chemically resistant hydration systems that include at least (1) a reservoir having a body portion with an internal compartment adapted to receive a volume of drink fluid and a selectively sealable fill port having an opening through which drink fluid may be added to or removed from the compartment; and (2) an elongate downstream assembly extending in fluid communication from the reservoir to define a fluid conduit through which drink fluid may flow from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect the quick-connect assembly with an intake tube of a gas mask, and further wherein the downstream assembly further includes at least one quick-connect assembly adapted to fluidly interconnect at least two of the plurality of components, and further the plurality of fluidly interconnected components are adapted to be chemically resistant, such that drink fluid may remain in the downstream assembly when the downstream assembly is exposed to a chemical agent present in a concentration of at least 10 g/m$^2$ without more than a maximum acceptable amount of the chemical agent penetrating the downstream assembly and contacting the drink fluid. Illustrative examples of these chemical agents include mustard blister agent and/or sarin nerve agent. Illustrative maximum acceptable amounts of mustard blister agent include 0.047 mg/L, 0.003525 mg/L and 0.00235 mg/L. Illustrative maximum acceptable amounts of sarin blister agent include 0.0093 mg/L, 0.006975 mg/L and 0.00465 mg/L.

It is believed that the following claims particularly point out certain combinations and subcombinations that are directed to one or more of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A personal hydration system, comprising:

a reservoir having a body portion with an internal compartment adapted to receive a volume of drink fluid, wherein the reservoir includes a selectively sealable fill port having an opening through which drink fluid may be added to or removed from the compartment; and an elongate downstream assembly extending in fluid communication from the reservoir to define a fluid conduit through which drink fluid may flow from the compartment for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, wherein the plurality of fluidly interconnected components are adapted to be chemically resistant, such that drink fluid may remain in the downstream assembly when the downstream assembly is exposed to a chemical agent present in a concentration of 10 g/m$^2$ for 24 hours without more than a maximum acceptable amount of the chemical agent penetrating the downstream assembly and contacting the drink fluid, and further wherein the quick-connect assembly comprises:

a male coupling member having a shaft that includes a tip and which defines at least a portion of the fluid conduit, wherein the male coupling member includes a region distal the tip with a port through which drink fluid may selectively flow into or out of the assembled quick-connect assembly;

a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the passage of the lock ring is selectively deformable to configure the lock ring between an unlocked configuration, in which the tip of the male coupling member may pass through the passage, and a locked configuration, in which the tip of the male coupling member may not pass through the passage, and further wherein the lock ring is biased to the locked configuration.

2. The hydration system of claim 1, wherein the shaft of the male coupling member includes a region of reduced cross-sectional area bounded by a pair of regions of greater cross-sectional area than the region of reduced cross-sectional area and further wherein the region of reduced cross-sectional area is sized such that the region of reduced cross-sectional area may extend within the passage with the regions of greater cross-sectional area on respective sides of the lock ring.

3. The hydration system of claim 2, wherein the tip of the male coupling member defines one of the regions of greater cross-sectional area.

4. The hydration system of claim 2, wherein when the lock ring is in the locked configuration, the regions of greater cross-sectional area cannot fit through the passage.

5. The hydration system of claim 2, wherein the lock ring is adapted to deflect from its locked configuration to its unlocked configuration upon urging of one of the regions of greater cross-sectional area through the passage.

6. The hydration system of claim 5, wherein upon insertion of the one of the regions of greater cross-sectional area through the passage, the lock ring is biased to automatically return toward the locked configuration to seat the lock ring upon the region of reduced cross-sectional area of the male coupling member.

7. The hydration system of claim 1, wherein the lock ring includes at least one release member adapted to configure the lock ring to the unlocked configuration responsive to user-applied forces thereto.

8. The hydration system of claim 1, wherein the female coupling member includes at least one aperture in the body, wherein the lock ring includes at least one release member that is biased to extend from the passage at least into one of the at least one apertures in the body of the female coupling member, and further wherein upon urging of the at least one release member toward the passage, the lock ring is urged toward the unlocked configuration.

9. The hydration system of claim 1, wherein the lock ring is adapted to be configured between the locked and the unlocked configurations without requiring sliding or rotational movement of the lock ring relative to the female coupling member.

10. The hydration system of claim 1, wherein the region of at least one of the female and the male coupling members further includes a mount that is adapted to fluidly interconnect the region with another component of the downstream assembly.

11. The hydration system of claim 10, wherein the mount is adapted to receive a length of drink tubing.

12. The hydration system of claim 10, wherein the mount is adapted to receive a mouthpiece.

13. The hydration system of claim 1, wherein the regions of both of the female and the male coupling members further include mounts that are adapted to fluidly interconnect the regions with other components of the downstream assembly.

14. The hydration system of claim 1, wherein the quick-connect assembly is integrated with at least one of the plurality of fluidly interconnected components.

15. The hydration system of claim 14, wherein at least one of the male coupling member and the female coupling member shares a common housing with at least one of the plurality of fluidly interconnected components.

16. The hydration system of claim 1, wherein the quick-connect assembly further includes at least one of the group consisting of an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir, and a gas-mask fitting adapted to fluidly interconnect the quick-connect assembly with an intake tube of a gas mask.

17. The hydration system of claim 1, further comprising a pack into which the reservoir is received.

18. The hydration system of claim 1, wherein the chemical agent includes mustard blister agent and the maximum acceptable amount is 0.047 mg/L.

19. The hydration system of claim 1, wherein the chemical agent includes mustard blister agent and the maximum acceptable amount is 0.0235 mg/L.

20. The hydration system of claim 1, wherein the chemical agent includes sarin nerve agent and the maximum acceptable amount is 0.0093 mg/L.

21. The hydration system of claim 1, wherein the chemical agent includes sarin nerve agent and the maximum acceptable amount is 0.00465 mg/L.

22. The hydration system of claim 1, wherein the reservoir is also adapted to be chemically resistant, such that drink fluid may remain in the downstream assembly when the downstream assembly is exposed to a chemical agent present in a concentration of 10 g/m$^2$ for 24 hours without more than a maximum acceptable amount of the chemical agent penetrating the downstream assembly and contacting the drink fluid.

23. The hydration system of claim 22, wherein the reservoir is formed from a flexible chemically resistant material.

24. The hydration system of claim 1, wherein at least one of the plurality of fluidly interconnected components includes a cover that is formed from a chemically resistant material.

25. The hydration system of claim 1, wherein at least one of the plurality of fluidly interconnected components is formed from a chemically resistant material.

26. A personal hydration system, comprising:

a flexible reservoir having a body portion with an internal compartment adapted to receive a volume of drink fluid, wherein the reservoir includes a selectively sealable fill port having an opening through which drink fluid may be added to or removed from the compartment; and an elongate downstream assembly extending in fluid communication from the reservoir to define a fluid conduit through which drink fluid may flow from the compartment for drinking by a user, wherein the downstream assembly comprises at least a plurality of fluidly interconnected components selected from the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, and further the plurality of fluidly interconnected components are adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

27. The hydration system of claim 26, wherein the chemical agent includes mustard blister agent and the maximum acceptable amount is 0.047 mg/L.

28. The hydration system of claim 27, wherein the chemical agent further includes sarin nerve gas and the maximum acceptable amount is 0.0093 mg/L.

29. The hydration system of claim 26, wherein the chemical agent includes mustard blister agent and the maximum acceptable amount is 0.003525 mg/L.

30. The hydration system of claim 26, wherein the chemical agent includes mustard blister agent and the maximum acceptable amount is 0.00235 mg/L.

31. The hydration system of claim 26, wherein the chemical agent includes sarin nerve agent and the maximum acceptable amount is 0.0093 mg/L.

32. The hydration system of claim 26, wherein the chemical agent includes sarin nerve agent and the maximum acceptable amount is 0.006975 mg/L.

33. The hydration system of claim 26, wherein the chemical agent includes sarin nerve agent and the maximum acceptable amount is 0.00465 mg/L.

34. The hydration system of claim 26, wherein the reservoir is also adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

35. The hydration system of claim 34, wherein the reservoir is formed from a flexible chemically resistant material.

36. The hydration system of claim 26, wherein at least one of the plurality of fluidly interconnected components includes a cover that is formed from a chemically resistant material.

37. The hydration system of claim 26, wherein at least one of the plurality of fluidly interconnected components is formed from a chemically resistant material.

38. The hydration system of claim 26, further including a pack into which the reservoir is housed.

39. A personal hydration system, comprising:

a reservoir having a body portion with an internal compartment adapted to receive a volume of drink fluid, wherein the reservoir includes a selectively sealable fill port having an opening through which drink fluid may be added to or removed from the compartment: and an elongate downstream assembly extending in fluid communication from the reservoir to define a fluid conduit through which drink fluid may flow from the compartment for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, wherein the quick-connect assembly comprises:

a male coupling member having a shaft that includes a tip and which defines at least a portion of the fluid conduit, wherein the male coupling member includes a region distal the tip with a port through which drink fluid may selectively flow into or out of the assembled quick-connect assembly:

a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the passage of the lock ring is selectively deformable to configure the lock ring between an unlocked configuration, in which the tip of the male coupling member may pass through the passage, and a locked configuration, in which the tip of the male coupling member may not pass through the passage, and further wherein the lock ring is biased to the locked configuration; and wherein the quick-connect assembly is integrated with at least one of the plurality of fluidly interconnected components, and further wherein at least one of the male coupling member and the female coupling member shares a common housing with an exit port adapted to fluidly interconnect the reservoir with a length of drink tubing.

40. The hydration system of claim 23, wherein the reservoir is formed from a plurality of layers, with at least one of the layers being a fluid impermeable layer and at least one of the layers not being formed from a chemically resistant material.

41. The hydration system of claim 26, wherein the plurality of interconnected components includes an on/off valve adapted to selectively obstruct the fluid conduit and prevent drink fluid from flowing therethrough.

42. The hydration system of claim 35, wherein the reservoir is formed from a plurality of layers, with at least one of the layers being a fluid impermeable layer and at least one of the layers not being formed from a chemically resistant material.

43. A personal hydration system, comprising:
a reservoir having a body portion with an internal compartment adapted to receive a volume of drink fluid, wherein the reservoir includes an exit port and a selectively sealable fill port having an opening through which drink fluid may be added to or removed from the compartment; and
an elongate downstream assembly extending in fluid communication with the reservoir to define a fluid conduit through which drink fluid may flow from the compartment and through the downstream assembly for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, and a gas mask fitting adapted to fluidly interconnect a quick-connect assembly with an intake tube of a gas mask,
wherein the exit port is adapted to fluidly interconnect the downstream assembly with the reservoir to permit drink fluid to be drawn from the compartment into the downstream assembly, wherein the exit port includes a male coupling member having a shaft that includes a tip and which defines at least a portion of a fluid conduit, wherein the male coupling member includes a region distal the tip with a port through which drink fluid may selectively flow into the exit port from the compartment of the reservoir;
a female coupling member having a body with an opening sized to receive at least the tip of the male coupling member, wherein the opening is in fluid communication with a cavity that extends through the female coupling member to a region distal the opening that includes a port through which drink fluid may selectively flow from the exit port into the downstream assembly; and
a lock member adapted to releasably and fluidly interconnect the male coupling member and the female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the cavity of the female coupling member; and further wherein the lock member is biased to the locked configuration.

44. The hydration system of claim 43, wherein the lock member includes at least one release member adapted to configured the lock member to release the portion of the male coupling member upon receipt of a user-applied force to the release member, and further wherein the female coupling member includes at least one aperture through which the at least one release member at least partially extends.

45. The hydration system of claim 43, wherein the lock member includes a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the lock ring is selectively deformable between an unlocked configuration, in which the tip of the male coupling member may pass through the passage, and a locked configuration, in which the tip of the male coupling member may not pass through the passage.

46. The hydration system of claim 43, wherein the plurality of components includes a bite-actuated mouthpiece, and further wherein the downstream assembly includes at least one quick-connect assembly adapted to fluidly interconnect at least two of the plurality of components.

47. The hydration system of claim 39, wherein the shaft of the male coupling member includes a region of reduced cross-sectional area bounded by a pair of regions of greater cross-sectional area than the region of reduced cross-sectional area and further wherein the region of reduced cross-sectional area is sized such that the region of reduced cross-sectional area may extend within the passage with the regions of greater cross-sectional area on respective sides of the lock ring.

48. The hydration system of claim 47, wherein the tip of the male coupling member defines one of the regions of greater cross-sectional area.

49. The hydration system of claim 47, wherein when the lock ring is in the locked configuration, the regions of greater cross-sectional area cannot fit through the passage.

50. The hydration system of claim 47, wherein the lock ring is adapted to deflect from its locked configuration to its unlocked configuration upon urging of one of the regions of greater cross-sectional area through the passage.

51. The hydration system of claim 50, wherein upon insertion of the one of the regions of greater cross-sectional area through the passage, the lock ring is biased to automatically return toward the locked configuration to seat the lock ring upon the region of reduced cross-sectional area of the male coupling member.

52. The hydration system of claim 39, wherein the lock ring includes at least one release member adapted to configure the lock ring to the unlocked configuration responsive to user-applied forces thereto.

53. The hydration system of claim 39, wherein the female coupling member includes at least one aperture in the body, wherein the lock ring includes at least one release member that is biased to extend from the passage at least into one of the at least one apertures in the body of the female coupling member, and further wherein upon urging of the at least one release member toward the passage, the lock ring is urged toward the unlocked configuration.

54. The hydration system of claim 39, wherein the lock ring is adapted to be configured between the locked and the unlocked configurations without requiring rotational movement of the lock ring relative to the female coupling member.

55. The hydration system of claim 39, further comprising a pack into which the reservoir is received.

56. The hydration system of claim 1, wherein the lock ring is adapted to be configured between the locked and the unlocked configurations without requiring rotational movement of the lock ring relative to the female coupling member.

* * * * *

UNITED STATES PATENT AND TRADEMARK OFFICE
CERTIFICATE OF CORRECTION

| | | |
|---|---|---|
| PATENT NO. | : 6,908,015 B2 | Page 1 of 14 |
| APPLICATION NO. | : 10/267036 | |
| DATED | : June 21, 2005 | |
| INVENTOR(S) | : Robert Choi et al. | |

It is certified that error appears in the above-identified patent and that said Letters Patent is hereby corrected as shown below:

Delete the title page and substitute therefore the attached title page showing the corrected number of claims in patent.

Delete Columns 1-20 and substitute therefore the attached Columns 1-24 which adds claims 26-56 to the printed patent.

This certificate supersedes the Certificate of Correction issued October 3, 2006, April 21, 2009, and September 21, 2010.

Signed and Sealed this
Fourth Day of September, 2012

David J. Kappos
*Director of the United States Patent and Trademark Office*

(12) United States Patent
Choi et al.

(10) Patent No.: US 6,908,015 B2
(45) Date of Patent: Jun. 21, 2005

(54) PERSONAL HYDRATION SYSTEM WITH COMPONENT CONNECTIVITY

(75) Inventors: Robert Choi, Rohnert Park, CA (US); Herbert Douglas, Antioch, CA (US); Barley A. Forsman, Cotati, CA (US); Jeremy Galten, Petaluma, CA (US)

(73) Assignee: CamelBak Products, LLC, Petaluma, CA (US)

( * ) Notice: Subject to any disclaimer, the term of this patent is extended or adjusted under 35 U.S.C. 154(b) by 216 days.

(21) Appl. No.: 10/267,036

(22) Filed: Oct. 7, 2002

(65) Prior Publication Data

US 2003/0168470 A1 Sep. 11, 2003

Related U.S. Application Data

(60) Provisional application No. 60/328,260, filed on Oct. 9, 2001.

(51) Int. Cl.[7] .................................................. B67D 5/064
(52) U.S. Cl. ..................... 222/175; 222/107; 222/529; 128/203.21; 141/379
(58) Field of Search ........................... 222/92, 105, 107, 222/175, 386.5, 501, 527, 529, 531, 537, 548, 306.5; 128/203.21; 141/379

(56) References Cited

U.S. PATENT DOCUMENTS

| 2,260,712 A | 10/1941 | Harrison |
|---|---|---|
| 4,423,892 A | 1/1984 | Bartholomew |
| 4,436,125 A | 3/1984 | Blenkush |
| 4,500,118 A | 2/1985 | Blenkush |
| 4,541,457 A | 9/1985 | Blenkush |
| 4,541,657 A | 9/1985 | Smyth |
| 4,630,847 A | 12/1986 | Blenkush |
| 4,703,957 A | 11/1987 | Blenkush |
| 4,804,213 A | 2/1989 | Guest |
| 4,884,829 A | 12/1989 | Funk et al. |
| 4,903,995 A | 2/1990 | Blenkush et al. |

FOREIGN PATENT DOCUMENTS

| DE | 3727789 | 3/1988 |

OTHER PUBLICATIONS

CamelBak Protective Mask Adapter Kit, CamelBak Products, Inc., circa Jun. 2000.
NBC/CBR Reservoir and Gas Mask Adapter Kit, 2000 Maximum Gear Military & Law Enforcement Products Catalog; CamelBak Products, Inc., cicrca Jun. 2000.
"Chemical-Biological Warfare Safe Water Pouch," Texas Research Institute Austin, Inc., printed from www.tri-austin.com/pouch.php Website in Sep. 2003.

*Primary Examiner*—Gene Mancene
*Assistant Examiner*—Melvin A Cartagena
(74) *Attorney, Agent, or Firm*—Kolisch Hartwell, P.C.

(57) ABSTRACT

A personal hydration system with component connectivity. The hydration system includes a fluid reservoir that may be housed within a pack. Drink fluid is drawn from the reservoir through a drink tube in fluid communication with the reservoir at one end and with a mouthpiece at the other. In some embodiments, the hydration system includes a manually actuated on/off valve downstream from the reservoir and/or a bite-actuated mouthpiece. The hydration system further includes a quick-connect assembly that fluidly interconnects components of the hydration system and which is configured to quickly release, and permit reattachment of, the detached or replacement components. In some embodiments, the hydration system includes a quick-connect assembly that is adapted to selectively couple a bite-actuated mouthpiece and a gas mask adapter to the hydration system's drink tube. In some embodiments, at least a portion, if not the entire, hydration system is formed from a chemically resistant material.

56 Claims, 11 Drawing Sheets

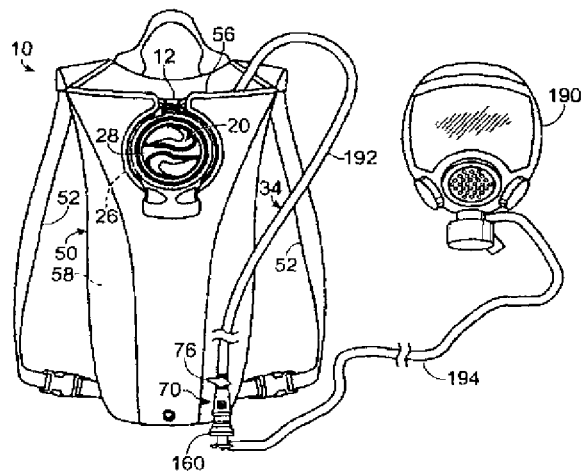

PERSONAL HYDRATION SYSTEM WITH COMPONENT CONNECTIVITY

RELATED APPLICATION

This application claims priority to U.S. Provisional Patent Application Ser. No. 60/328,260, which was filed on Oct. 9, 2001, is entitled "Personal Hydration System with Component Connectivity," and the complete disclosure of which is hereby incorporated by reference.

FIELD OF THE INVENTION

The present invention is directed generally to systems for providing drink fluid to a user, and more specifically, to personal hydration systems with component connectivity.

BACKGROUND OF THE INVENTION

Medical research has demonstrated the importance of maintaining adequate hydration while engaging in strenuous physical activities, such as bicycling or mountain climbing. In the not too distant past, participants in such activities carried their water in bottles or canteens from which they drank periodically. More recently, personal hydration systems have been developed which allow users to drink more or less continuously while engaged in sporting or recreational activities. These personal hydration systems typically have a bag-like fluid reservoir that is carried in a back- or waist-mounted pack. A long flexible tube is connected to the reservoir through an exit port at one end and terminates in a mouthpiece at the other end. The tube is long enough to allow the mouthpiece to be carried in the user's mouth to enable the user to draw water from the reservoir at will. Examples of hydration systems and mouthpieces therefor are disclosed in U.S. Pat. Nos. 5,727,714, 5,060,833, 5,085,349, and 6,070,767, the disclosures of which are hereby incorporated by reference.

Although personal hydration systems have proven to be a great advance over traditional water bottles, they do suffer from some drawbacks. One drawback is that the components of the hydration system downstream from the fluid reservoir tend to be either permanently secured together, or else secured together via a tight friction fit that tends to be difficult to establish or release. Both of these structures provide effective fluid-tight seals. However, neither permits components to be quickly and repeatedly interchanged by a user.

SUMMARY OF THE INVENTION

The present invention is directed to a personal hydration system with component connectivity. The hydration system includes a fluid reservoir that is adapted to receive and contain a volume of drink fluid. The reservoir may be housed within a pack. Drink fluid is drawn from the reservoir through a drink tube that is in fluid communication with the reservoir at one end and with a mouthpiece at the other end. In some embodiments, the drink tube is connected to the reservoir at an exit port. In some embodiments, the hydration system includes a manually actuated on/off valve downstream from the reservoir. In some embodiments, the hydration system includes a bite-actuated mouthpiece. In some embodiments, the drink tube includes more than one length of interconnected tubing. Hydration systems according to the present invention further include a quick-connect assembly that fluidly interconnects components of the hydration system and which is configured to quickly release, and permit reattachment of, the detached components or replacement components. In some embodiments, the replacement components enable different performance from the detached components. In some embodiments, the hydration system includes a quick-connect assembly that is adapted to selectively couple a bite-actuated mouthpiece and a gas mask adapter to the hydration system's drink tube. In some embodiments, at least a portion, if not the entire, hydration system is formed from a chemically resistant material.

Many other features of the present invention will become manifest to those versed in the art upon making reference to the detailed description which follows and the accompanying sheets of drawings in which preferred embodiments incorporating the principles of this invention are disclosed as illustrative examples only. Dimensions in the drawings are shown for purposes of illustration, but dimensions other than those shown may be used and are within the scope of the present invention.

BRIEF DESCRIPTION OF THE DRAWINGS

FIG. 1 is an isometric view of a personal hydration system that includes a schematic representation of a quick-connect assembly according to the present invention.

FIG. 2 is a top plan view of a personal hydration system with schematic representations of several different quick-connect assemblies according to the present invention.

FIG. 3 is a side elevation view of the personal hydration system of FIG. 2 showing additional schematic representations of quick-connect assemblies according to the present invention.

FIG. 4 is a side elevation view of a personal hydration system that includes a pack and illustrates schematically another quick-connect assembly according to the present invention.

FIG. 5 is a front elevation view of another personal hydration system that includes a back-mounted pack and schematically illustrates quick-connect assemblies according to the present invention.

FIG. 6 is a front elevation view of a personal hydration system that includes a waist-mounted pack and another schematic quick-connect assembly according to the present invention.

FIG. 7 is an exploded isometric view of a quick-connect assembly constructed according to the present invention.

FIG. 8 is a cross-sectional view showing another version of the assembly of FIG. 7 in its locked configuration.

FIG. 9 is a cross-sectional view of the male member of the assembly of FIG. 7.

FIG. 10 is a top plan view of the female member of Fig. .7.

FIG. 11 is a side elevation view of the female member of FIG. 7.

FIG. 12 is a cross-sectional view of the female member of FIG. 7 taken along the line 12-12 in FIG. 10.

FIG. 13 is a side elevation view of the lock ring of FIG. 7.

FIG. 14 is a top plan view of the lock ring of FIG. 13.

FIG. 15 is a cross-sectional view of the lock ring of FIG. 13 taken along the line 15-15 in FIG. 13.

FIG. 16 is an exploded isometric view of a quick-connect assembly integrated with an exit port.

FIG. 17 is an assembled isometric view of the assembly and the exit port of FIG. 16.

FIG. 18 is an end elevation view of the assembly and the exit port of FIG. 16.

FIG. 19 is a cross-sectional view of the assembly and the exit port of FIG. 18 taken along line 19-19 in FIG. 18 and showing a fragmentary end of an attached drink tube in dashed lines.

FIG. 20 is a top plan view of the exit port and the male member of the quick-connect assembly of FIG. 16.

FIG. 21 is a side elevation view of the exit port and the male member of the quick-connect assembly of FIG. 16.

FIG. 22 is a side elevation view of the assembly of FIG. 7 with a bite-actuated mouthpiece mounted thereupon.

FIG. 23 is cross-sectional view of the assembly and the mouthpiece of FIG. 22 taken along the line 23-23 in FIG. 22.

FIG. 24 is an exploded isometric view of a quick-connect assembly with an integrated on/off valve.

FIG. 25 is a top plan view of the assembly of FIG. 24 with the ends of the assembly adapted to receive lengths of drink tube.

FIG. 26 is a cross-sectional view of the assembly of FIG. 25 taken along the line 26-26 in FIG. 25.

FIG. 27 is a top plan view of the female member and the body of FIG. 24.

FIG. 28 is a side elevation view of the female member and the body of FIG. 24.

FIG. 29 is a cross-sectional view of the female member and the body of FIG. 24 taken along the line 29-29 in FIG. 27.

FIG. 30 is a top plan view of the core of the on/off valve of FIG. 24.

FIG. 31 is a side elevation view of the core of the on/off valve of FIG. 24.

FIG. 32 is a side elevation view of a modified version of the core of the on/off valve of FIG. 24.

FIG. 33 is an exploded isometric view of a quick-connect assembly with an integrated gas mask fitting.

FIG. 34 is a cross-sectional view of the male member of the quick-connect assembly and the gas mask fitting of FIG. 33.

FIG. 35 is an exploded isometric view of a quick-connect assembly with another integrated gas mask fitting.

FIG. 36 is a side elevation view of the assembly and the fitting of FIG. 35 further including an on/off valve.

FIG. 37 is a cross-sectional view of the assembly and the fitting of FIG. 35 taken along the line 37-37 in FIG. 36.

FIG. 38 is a side elevation view of a hydration system that includes a quick-connect assembly according to the present invention and which is fluidly interconnected with a gas mask.

FIG. 39 is an isometric view showing an illustrative quick-connect kit according to the present invention.

FIG. 40 is a fragmentary isometric view showing a chemically resistant component that may be used with quick-connect assemblies according to the present invention.

FIG. 41 is a fragmentary isometric view showing another chemically resistant component that may be used with quick-connect assemblies according to the present invention.

FIG. 42 is a fragmentary, schematic view of illustrative chemically resistant components that may be used with quick-connect assemblies according to the present invention.

FIG. 43 is a fragmentary side elevation view of a chemically resistant quick-connect assembly and drink tube according to the present invention.

DETAILED DESCRIPTION OF BEST MODE OF THE INVENTION

Illustrative examples of personal hydration systems are shown in FIGS. 1-3 and generally indicated at 10. System 10 includes a fluid reservoir, or bladder, 12 for storing potable drink fluid, such as water, sports drinks, juice, etc. Reservoir 12 includes a body portion 14 with an internal compartment 16, which is adapted to store a volume of drink fluid 18. Typically, compartment 16 will hold at least 24 ounces, and it may hold as much as 32 ounces, 50 ounces, 70 ounces, 100 ounces, 200 ounces or more of drink fluid 18. Reservoir 12 is preferably flexible, with at least a region, if not the entirety, of body portion 14 and/or reservoir 12, being formed from a flexible, waterproof material. An example of a suitable material is polyurethane, although others may be used.

Reservoir 12 may vary in shape and size within the scope of the invention, such as depending upon on the volume of fluid to be carried by the user and the intended use of the hydration system. For example, and as discussed in more detail below, hydration systems according to the present invention may (but are not required to) include a pack into which the reservoir is permanently or removably housed. In such an embodiment, the reservoir will be sized to fit within the pack, and the pack will typically include one or more straps that are configured and sized to extend around a portion of a user's body, such as the user's shoulder(s) or waist. Some hydration systems are adapted to be received or otherwise carried within a user's clothing or on a device, such as a bicycle, that is proximate a user while the user is engaged in a particular activity. In such an embodiment, the clothing or device will typically include a sleeve or other mount sized to receive the hydration system and/or the hydration system will typically include one or more suitable mounts for securing the reservoir to the device or within a user's clothing.

Reservoir 12 includes an input port 20 through which the reservoir is charged with a volume of potable drink fluid. Illustrative examples of suitable input ports 20 are shown in FIGS. 1-3. For example, in FIG. 1 port 20 takes the form of a sealable filler spout 22 with a cap 24 that is selectively secured to the spout through a friction fit. In this configuration, the cap is pressed directly onto the spout to establish a frictional seal therebetween. In FIGS. 2 and 3, port 20 takes the form of a threaded neck 26 upon which a threaded cap 28 is threadingly engaged to seal the opening in the neck. Other examples include a reservoir that is sealed by folding or otherwise interlocking or compressing opposed surfaces of the reservoir together to close an opening formed in the reservoir.

Reservoir 12 also includes an exit port, or output port, 30 through which drink fluid is drawn from compartment 16 for delivery to a user. As shown in FIGS. 1-3, an end 32 of an elongate, flexible drink tube, or tube assembly, 34 is mounted or otherwise fluidly connected to port 30. As used herein, the term "tube assembly" may refer to a single length of tubing that defines a fluid conduit for drink fluid drawn from reservoir 12, as well as to a plurality of interconnected lengths of tubing. Tube assembly 34 is of sufficient length to extend from reservoir 12 to the user's mouth when the system is worn by the user, such as on the user's back or waist. End 32 may be removably attached to port 30, or may be integrally formed or permanently mounted thereupon. For example, as shown in FIGS. 1 and 2, exit port 30 is mounted on body 14 and includes a fitting, or mount, 36 to which end 32 is secured. It is within the scope of the invention that exit port 30 may have a variety of configurations, including an embodiment in which exit port 30 includes an aperture in body 14 through which end 32 is inserted. An illustrative example of a suitable exit port is disclosed in U.S. Pat. No. 5,727,714, the complete disclosure of which is hereby incorporated by reference for all purposes, but any suitable structure that enables the drink tube to be fluidly coupled to the compartment of reservoir 12 may be used.

The other end 40 of tube assembly 34 is adapted to provide fluid 18 that is drawn from compartment 16 through exit port 30 and tube assembly 34 to a user's mouth. A mouthpiece 42 is typically coupled with end 40 of tube assembly 34, such that tube assembly 34 is in fluid communication with mouthpiece 42. Mouthpiece 42 may be removable from tube assembly 34 or alternatively may be integrated with tube assembly 34. For example, mouthpiece 42 may simply be the end 40 of tube assembly 34 distal output port 30, the output of the subsequently described quick-connect assembly, an output from a mouthpiece or other structure mounted on the subsequently described quick-connect assembly, or structure that is removably or permanently attached to end 40. As used herein, components of the hydration system that extend from the reservoir and through which drink fluid drawn through exit port 30 flows may be referred to as being downstream from the reservoir. Accordingly, the exit port and other elements of the hydration system downstream from the reservoir may be referred to as the downstream assembly of the hydration system.

An example of a mouthpiece 42 is a bite-actuated, or mouth-actuated, mouthpiece 44 that it is selectively deformed from a sealed (or closed) position, in which fluid is prevented from being dispensed from the mouthpiece, to a dispensing (or open) position, in which the user may draw fluid from the reservoir through the tube and mouthpiece when the user compresses the mouthpiece with the user's teeth or lips. Bite-actuated mouthpieces are often biased or otherwise configured to automatically return to the closed position when a user is not exerting force upon the mouthpiece to configure the mouthpiece to its closed position. Examples of suitable bite-actuated mouthpieces are disclosed in U.S. Pat. Nos. 6,070,767, 5,727,714, 5,085,349 and 5,060,833, the complete disclosures of which are hereby incorporated by reference.

As shown in FIGS. 4-6, system 10 may include a pack 50 within which reservoir 12 is permanently or removably housed. Pack 50 typically is adapted to be worn on a user's body. For example, the pack shown in FIGS. 4 and 5 includes a pair of shoulder straps 52 for mounting the pack on a user's back or chest. Although a pair of straps 52 is shown in FIGS. 4 and 5, it is within the scope of the invention that only a single strap may be used, such as to extend diagonally across a user's torso or over a selected one of the user's shoulders. As a further example, pack 50 is shown in FIG. 6 including waist straps 54 that are adapted to secure the pack around a user's waist. Straps 52 and 54 may be formed from one or more segments that are adapted to define (alone or with the pack) a closed perimeter, such as to encircle a portion of a user's body. It is further within the scope of the invention that pack 50 may include one or more waist straps and one or more shoulder straps, or as discussed herein, no straps at all.

In FIGS. 4-6, it can be seen that pack 50 includes an opening 56 through which reservoir 12 may be selectively inserted and removed from a storage compartment 58 within the pack. It should be understood that packs into which reservoirs are permanently mounted may be formed without such an opening. Pack 50 may be adapted to hold items in addition to reservoir 12. For example, in FIGS. 4 and 6, pack 50 is shown including one or more pockets 60. Similarly, compartment 58 may be sized so that it is sufficiently larger than reservoir 12 that other items may be stored within the compartment. Additionally or alternatively, pack 50 may include one or more internal compartments that are adapted to hold items other than reservoir 12.

Examples of hydration systems and mouthpieces therefor are disclosed in the above-identified and incorporated U.S. patents, as well as in pending U.S. patent application Ser. Nos. 09/902,935 and 09/902,792, the disclosures of which are also hereby incorporated by reference for all purposes. It is within the scope of the invention that hydration system 10 may be formed without a pack. For example, hydration systems that are designed to be received within a user's clothing may be formed without a pack. Similarly, a hydration system may be added as an accessory to a pack, such as a backpack, knapsack or fanny pack, that is not specifically configured to receive that hydration system.

Personal hydration systems according to the present invention further include at least one quick-connect assembly 70. Assembly 70 is adapted to fluidly and mechanically interconnect portions of the hydration system downstream (toward mouthpiece 42) from reservoir 12. Assembly 70 enables the interconnected components to be quickly and repeatedly coupled together and released from engagement without requiring the time or effort required with conventional hydration system components. As such, the quick-connect assembly may also be described as a quick connect/disconnect assembly, or quick coupling assembly. As described in more detail herein, the quick-connect assembly includes at least a pair of members that are configured to be fluidly connected with adjacent components of a hydration system. The members are further adapted to selectively and releasably interconnect with each other, such as by being releasably secured together by a lock member of the assembly.

In FIGS. 1-6, various illustrative placements for assembly 70 are schematically illustrated. For example, in FIG. 1, assembly 70 is shown interconnecting adjacent lengths 72 and 74 of tubing forming tube assembly 34. In FIG. 2, assembly 70 is shown interconnecting end 40 of tube assembly 34 with a manually operated on/off valve 76. In FIG. 2, valve 76 and assembly 70 are shown in solid lines proximate mouthpiece 42, in what may be referred to as an end-of-line configuration. However, it is within the scope of the invention that an in-line configuration may be used as well, as illustrated in dashed lines in FIG. 2. Similarly, a pair of assemblies 70 is shown in dashed lines in FIG. 2 to schematically represent that the assembly may be located on either, or both, sides of valve 76. In FIG. 3, assembly 70 is shown in solid lines interconnecting end 32 of tube assembly 34 with exit port 30, and in dashed lines in another in-line configuration. In FIG. 4, assembly 70 is shown interconnecting end 40 and mouthpiece 42.

Assembly 70 includes at least one mount to which a component of hydration system 10 is fluidly interconnected so that drink fluid drawn from reservoir 12 may flow through a fluid conduit defined at least partially by the assembly. When assembly 70 is configured for in-line operation, it will typically include a pair of generally opposed mounts, one for establishing a fluid interconnection with a portion of the hydration system downstream from the reservoir and upstream from the quick-connect assembly, and another for establishing a fluid interconnection with a portion of the hydration system downstream from the quick-connect assembly. As used herein, the term "fluid communication" refers to elements between which drink fluid may flow, and the terms "fluidly connected," "fluidly interconnected," and the like are used to refer to components that are coupled together and between which drink fluid may flow. Illustrative examples of components that may be connected upstream relative to the quick-connect assembly include exit port 30, a length of tube assembly 34, and an on/off valve. Illustrative examples of components that may be connected downstream relative to the quick-connect assembly include an on/off valve, length of tube assembly 34, and mouthpiece 42.

It is also within the scope of the invention that assembly 70 may include at least one component integrated therewith. By this it is meant that the component may be at least partially integrally formed with a portion of assembly 70, such as by sharing a common housing, and/or that the component is permanently mounted or otherwise secured to the assembly such that the component is not designed or configured to be repeatedly removed from and reattached to the assembly. Illustrative and non-exclusive examples of components that may be integrated with the assembly include mouthpiece 42, exit port 30 and on/off valve 76. This integration of components with assembly 70 is schematically illustrated in FIGS. 5 and 6, with assemblies 70 respectively including exit port 30 and on/off valve 76 in FIG. 5, and mouthpiece 42 in FIG. 6. As a further variation, assembly 70 may be integrated with a fitting that is configured to interchangeably receive a component of the hydration system or a device to which the hydration system will be coupled.

An example of a quick-connect assembly 70 that is constructed according to the present invention is shown in FIGS. 7 and 8. As shown, assembly 70 includes female and male members 80 and 82 that are configured to releasably engage each other to establish a mechanical interconnection therebetween. Members 80 and 82 also define a fluid conduit 84 that extends through the members to enable drink fluid that is drawn from reservoir 12 to be drawn through the members, either for dispensing directly to a user or to components of the hydration system that are attached to assembly 70 and extend downstream therefrom. Members 80 and 82 are configured to be quickly and repeatedly released from engagement with each other, such as when a user depresses a release member, which is discussed in more detail subsequently. Members 80 and 82 may also be described as female coupling members and male coupling members, respectively.

Female member 80 includes a body 86 that defines a central cavity 88. As perhaps best seen in FIG. 12, cavity 88 forms part of a fluid conduit 84, which extends through female member 80 from an opening 90 to a corresponding opening 92 in a distal region 94. Opening 90 is sized to receive at least the tip of the subsequently described male member. In the illustrated embodiment, region 94 is generally opposed to opening 90 and is in fluid communication therewith such that drink fluid that enters cavity 88 through a first one of openings 90 or 92 may flow through the cavity and exit the cavity through the other one of the openings. Body 86 also includes at least one lateral aperture 96. As shown in FIGS. 7-8 and 10-12, a pair of apertures 96 is shown, but it is within the scope of the invention that more or less apertures may be used, such as a single aperture or multiple apertures.

Region 94 includes either a mount or a component of the hydration system. In FIG. 7, female member 80 is shown with a region 94 in the form of a barbed mount 98 for tube assembly 34. It is within the scope of the invention that region 94 and/or mount 98 may have other configurations. For example, when region 94 takes the form of a mount 98 for a length of tubing forming a part of tube assembly 34, the mount should be configured so that the tubing may be coupled thereto to form a fluid-tight seal, and preferably retained upon the mount with sufficient force so that the tubing is not inadvertently removed from the mount. In the illustrated embodiment shown in FIGS. 7-8 and 10-12, the tubing is stretched over mount 98, but it is also within the scope of the invention that the tubing may be inserted into a bore in the mount and/or that the mount extends both internal and external the tubing. As a further example, and as discussed in more detail herein, region 94 may also include a mount for exit port 30, mouthpiece 42, on/off valve 76, or other components of the hydration system, and/or may include any of these components integrated therewith.

As shown in FIGS. 7-9, male member 82 also includes a region 94 that may have any of the configurations, elements and variations as the corresponding region 94 described with respect to the female member. For the purposes of illustrating additional suitable configurations, region 94 is illustrated as a mount 100 that does not include barbs. Mount 100 may receive mouthpiece 42 or a length of tubing, similar to mount 98. In dashed lines in FIG. 9, mount 100 is shown with a barbed fitting to provide a graphical illustration of this version of male member 82. With reference to FIG. 9, it can be seen that male member 82 further includes a shaft 102 with a tip 104 that is adapted to be inserted through the opening in a corresponding female member. In the illustrated embodiment, tip 104 is externally tapered, or beveled, but this configuration is not required. Male member 82 also includes a cavity 88' that defines a portion of fluid conduit 84, and which extends from an opening 92 in region 94 and at least partially through shaft 102 to another opening 106. In the illustrated embodiment, opening 106 is formed in tip 104, but it is within the scope of the invention that shaft 102 may additionally or alternatively include one or more openings that extend through the sidewalls 108 of shaft 102. As perhaps best seen in FIGS. 7 and 8, drink fluid that flows through the quick-connect assembly enters and exits the assembly through openings 92. Accordingly, the openings may also be referred to as ports. It should be understood that the respectively ports may form entry ports or exit ports depending upon the fluid flow orientation of the male and female members relative to the reservoir.

In FIGS. 7 and 8, regions 94 are depicted defining a linear fluid conduit 84 extending therebetween. It is within the scope of the invention, and the description of the regions being generally opposed to each other, that the regions may define a non-linear fluid conduit that extends therebetween, or a fluid conduit that includes both linear and non-linear portions. For example, regions 94 may extend at angles of less than 180° relative to the long axes of the portions of the fluid conduit defined thereby. For example, the regions may extend at angles in the range of 15-165°, 30-150°, 45-135°, 90°, etc. Because the male and female members are configured to be coupled together in an at least partially overlapping (or nested) configuration, the portion of the male member 82 that is inserted into opening 90 of female member 80 will typically be complimentarily configured with the corresponding portion of female member 80 to establish a fluid-tight connection therebetween.

In FIG. 7, assembly 70 further includes a lock member 112, which is adapted to mechanically and releasably secure the male and female members together. In the illustrated embodiment, lock member 112 takes the form of a lock ring 114, which includes a central passage 116 and at least one ear, or projecting member, 118 extending generally away from the passage. Passage 116 is sized so that tip 104 and at least a portion of shaft 102 of male member 82 may be inserted therethrough. In FIG. 7, a pair of projecting members 118 is shown, with each of the projecting members being sized to extend into a corresponding one of the apertures 96 in female member 80. Typically, the number of projecting members 118 will be at least as great as the number of apertures 96. Additional views of lock ring 114 are shown in FIGS. 13-15.

In operation, lock ring 114 is positioned within cavity 88 of female member 80, with a projecting member 118 extending into and optionally at least partially through each of the apertures 96. In the configuration shown in FIG. 7, lock ring 114 may be described as being in its neutral, unlocked, or disconnected configuration. As shown, passage 116 has a generally elliptical or oval-shaped configuration, with its openings 120 being generally aligned with opening 90.

To couple the male and female members together, the tip of the male member is inserted into and through the passage until the lock ring is seated upon a corresponding mount 122 on the shaft, such as shown in FIG. 8. As shown in FIGS. 7-9, mount 122 includes a region 124 of reduced cross-sectional area that is bounded with a region 126 of greater cross-sectional area on at least the side extending toward tip 104. As the tip is inserted into the passage, lock ring 114 deforms from its neutral configuration to a configuration in which passage 116 has a generally circular configuration defined largely by the shape of shaft 102. In this position, lock ring 114 and assembly 70 may be described as being in an intermediate configuration. More specifically, the female and male members may be frictionally retained together, but the members are not yet locked together to prevent forces upon the upstream or downstream components from causing the members to disconnect from each other, and/or to establish a fluid-tight seal between the members. Ring 114 is formed from a resilient, yet deflectable, material so that the ring is at all times biased to return toward its neutral configuration. An example of a suitable material is an acetal polymer, such as Delrin® 500, which is sold by DuPont. After region 126 passes through passage 116, the ring is seated upon region 124, thereby securing the female and male members together. In this position, lock ring 114 and assembly 70 may be described as being in their locked configurations. Although not required, it is within the scope of the invention that the male and female members may be rotated relative to each other while in this configuration without impairing the fluid-tight seal established by the members and lock ring 114.

To disconnect assembly 70, a user depresses at least one of projecting members 118 to urge the lock ring toward its intermediate configuration, and more specifically, to deflect lock ring 114 to a configuration in which shaft 102 may be withdrawn through the passage. Accordingly, projecting members 118 may also be referred to as release members. After the shaft is removed and the user-imparted forces are removed, the lock ring returns automatically to its neutral configuration.

As discussed, tip 104 of shaft 102 may be beveled. This configuration facilitates the alignment and insertion of the shaft into passage 116. This configuration may additionally or alternatively be described as enabling the assembly to be secured together without requiring a user to depress members 118 and thereby deform the lock ring so that the shaft may be inserted through passage 116. Instead, the force of tip 104 being urged against opening 120 of passage 116 deflects the passage to its intermediate configuration, as well as correcting any misalignment of the shaft relative to the passage. As such, quick-connect assembly 70 may also be referred to as a plug-in connector, and may be connected and disconnected without requiring a user to use both hands, although two-handed operation is also within the scope of the invention. When the male and female members of quick-connect assembly 70 are adapted to be coupled together merely by inserting the male member into the female member until the lock ring engages and retains the male member, the quick-connect assembly may be described as being configured to automatically couple the members together upon insertion of the male member.

Also shown in FIG. 7 is a seal member 130 in the form of an O-ring 132, which may be used to enhance the fluid seal established by assembly 70. It is within the scope of the invention that seal member 130 may take other forms, including being integral with members 80, 82 and/or lock member 112, and that more than one seal member may be used. In the illustrated configuration, shaft 102 includes a channel 134 into which O-ring 132 is seated. It is within the scope of the present invention that the O-ring may be seated within female member 80 instead of being mounted on male member 82, that both members may include a seal member, and that neither member may include a seal member other than the mating surfaces of the members themselves. These variations and alternatives apply to all of the O-rings and other seal members described and illustrated herein.

As discussed previously, assembly 70 may include at least one other component of hydration system 10 at least partially integrated therewith. An example of such a configuration is shown in FIGS. 16-21 in which the assembly includes an integrated exit port 30. More specifically, in the illustrated embodiment, male member 82 and exit port 30 have been integrated together. It is within the scope of the invention that a female member 80 may alternatively be integrated with exit port 30. Similarly, the following discussion and illustrative figures demonstrate various other embodiments of quick-connect assemblies according to the present invention that also include other components and/or specialized mounts integrated therewith. It is within the scope of the invention that the illustrative pairings of male and female members with the mounts and/or other integrated components are presented for the purpose of illustrating exemplary configurations and that the pairings may be reversed without departing from the scope of the invention.

In FIGS. 22 and 23, male member 82 is shown integrated with a fitting, or mount, 140 that is sized to receive a bite-actuated mouthpiece 44. Mouthpiece 44 is formed from a deformable material, such as silicone, and includes a neck 142 that is stretched around fitting 140. It within the scope of the invention that fitting 140 may be integrated with female member 80 instead of male member 82. Similarly, fitting 140 and mouthpiece 44 may have other configurations without departing from the scope of the invention.

In FIGS. 24-26, female member 80 is shown integrated with on/off valve 76. To illustrate that assembly 70 may include more than one integrated component, in FIG. 24, male member 82 is also shown integrated with a fitting 140 and in FIGS. 25 and 26, male member 82 is also shown integrated with a mount 98. Valve 76 is adapted to obstruct or permit the flow of drink fluid therethrough depending upon the relative configuration of the valve. When the valve is configured to its open (on) configuration, drink fluid may flow through the valve, and when the valve is configured to its closed (off) configuration, the valve blocks fluid conduit 84 so that drink fluid cannot flow through the valve. As shown, valve 76 includes a body 150, a seal member 152 and a rotatable core 154 with a handle, or user-manipulable, portion 156. To configure the on/off valve between its open and closed configurations, a user rotates core 154 relative to body 150, such as by using handle 156. Although not required, on/off valves are typically configured to remain in a user-selected configuration until repositioned by the user. Therefore, unlike a bite-actuated mouthpiece that is biased to automatically return to a closed position, on/off valves typically will remain in a selected open or closed configuration until repositioned by a user.

Additional views of female member 80 and body 150 of valve 76 are shown in FIGS. 27-29, and additional views of core 154 are shown in FIGS. 30 and 31. Similar to the previously described quick-connect assemblies, it is within the scope of the invention that the on/off valve may be integrated with the male member instead of the female member. As shown with reference to FIGS. 29 and 31, the body 150 of on/off valve 76 includes apertures 151 and 153 through which drink fluid in fluid conduit 84 may flow into and be removed from a chamber, or cavity, 155 into which at least a portion of core 154 extends when the on/off valve is assembled. As shown in FIG. 31, core 154 also includes at least a corresponding pair of apertures 157 and 158 that selectively align with the apertures in the body depending upon the relative rotational position of the core relative to the body. When the apertures at least partially align, drink fluid may flow therethrough, thereby permitting drink fluid to be drawn from the reservoir and dispensed to a user through mouthpiece 42. When the apertures do not overlap, fluid conduit 84 is obstructed and drink fluid cannot flow therethrough.

Additional examples of suitable on/off valves 76 are disclosed in co-pending U.S. patent application Ser. No. 09/902,792, the disclosure of which is hereby incorporated by reference for all purposes. As discussed, hydration systems with quick-connect assemblies according to the present invention may be formed with an on/off valve that is not integrated with a quick-connect assembly, and/or without an on/off valve. Similarly, valve 76 may include other suitable configurations for selectively restricting the flow of drink fluid from reservoir 12, such as with core portions that are actuated by mechanisms other than by rotating the core relative to the body of the valve. Even when such a configuration is used, variations to the structure shown in FIGS. 24-31 may be used without departing from the invention. For example, core 154 may include a greater or lesser number of apertures. As another example, core 154 may be actuated by a user using a differently configured, or shaped, user-manipulable portion 156. FIG. 32 demonstrates an example of another suitable core 154. As shown, the handle, or user-manipulable portion 156, of the core has been enlarged and includes ribs 159 to enhance gripping of the handle by a user.

Another example of a component that may be attached to tube assembly 34 is a gas mask fitting, which enables a user wearing a gas mask to draw drink fluid from hydration system 10 via a mouthpiece within the gas mask without exposure of the fluid to the external environment. Accordingly, it is within the scope of the invention that either the female or male components of quick-connect assembly 70 may include a mount or fitting that is adapted to couple the hydration system with a gas mask's fluid intake tube. It is further within the scope of the invention that either of members 80 or 82 may include an integrated gas mask fitting.

An example of a quick-connect assembly 70 with an integrated gas mask fitting is shown in FIG. 33. In the illustrated embodiment, the fitting is generally indicated at 161 and is shown integrated with male member 82. It is within the scope of the invention, however, that fitting 160 may alternatively be integrated with female member 80 and/or that the fitting may be coupled to one of the previously described and/or illustrated mounts 98. The illustrated embodiment of fitting 160 is adapted for use with an M-40 gas mask, but it is within the scope of the invention that the particular size and configuration of fitting 160 may vary to conform with the gas mask with which the fitting will be used. As shown in FIG. 33, fitting 161 includes a housing 162 within which a seal member 164 (such as one or more O-rings) and a lock ring 166 are retained.

In FIG. 35, another assembly is shown with an integrated gas mask fitting 160, which is generally indicated at 170. Fitting 170 is configured for use with AVON™ brand gas masks and includes a housing 172, an insert 174 and a seal member (such as one or more O-rings) 176, which are secured within the housing by a retainer 178. Also shown in FIG. 35 is a coupling member 180 with an output port 182 that is adapted to connect to the fluid-intake tube of a gas mask. Fittings 160 may also include a valve assembly that is adapted to automatically stop the flow of fluid therethrough when the fitting is not coupled to a gas mask's fluid-intake tube. In FIGS. 36 and 37, assembly 70 is shown including both a gas mask fitting and an on/off valve 76 to provide further examples of a quick-connect assembly with more then one integrated component.

FIG. 38 provides an example of a hydration system 10 that includes a quick-connect assembly 70 with an integrated gas mask fitting 160 and which is fluidly interconnected with a gas mask 190. It should be understood that gas mask 190 has been somewhat schematically illustrated in FIG. 38 and that mask 190 is intended to graphically represent any suitable gas mask, including gas masks that cover primarily a user's nose and mouth, gas masks that cover a user's face, and gas masks that cover a user's entire head. Regardless of the configuration, mask 190 is adapted to provide drink fluid from reservoir 12 to the user's mouth without exposing the drink fluid to the environment outside of the hydration system and gas mask. In the illustrated embodiment, tube assembly 34 may be described as including a length 192 of flexible tubing that fluidly interconnects the exit port of the hydration system's reservoir with quick-connect assembly 70 and a length 194 of tubing that fluidly interconnects assembly 70 and gas mask 190. Length 194 may be the intake tube of the gas mask or may be fluidly interconnected with the intake tube of the gas mask. Each of these lengths of tubing may be comprised of one or more fluidly interconnected tube portions.

As discussed, hydration systems that include quick-connect assemblies enable components of the hydration system to be quickly and fluidly interconnected together or released from an existing fluid interconnection. As the preceding drawings demonstrate, it is within the scope of the invention that at least one of the male or female members of quick-connect assemblies according to the present invention may be configured to establish fluid communication with a plurality of different components and/or accessories of the hydration system and that the members may even include these components and/or accessories integrated therewith.

As an illustrative example, consider a hydration system that includes a quick-connect assembly that fluidly interconnects the drink tube of the hydration system with a mouthpiece or other suitable outlet for the drink fluid that is drawn from the reservoir. More specifically, the assembly will include a first member (such as either one of the previously described and/or illustrated male or female members) that includes a mount upon which the drink tube is mounted. To that member, a variety of components can then be quickly fluidly interconnected simply by mounting the component(s) to the corresponding mount of a second, complimentary connector member and/or utilizing a second, complimentary connector member that contains an integrated component. Continuing this example, assuming that the first member is female member 80, any number of complimentary (sized and shaped to be coupled to the female member by lock member 112) male members 82 may be interchangeably and fluidly secured thereto. Illustrative examples of these male members include a male member with an attached or integral mouthpiece, another male member with an attached or integral mouthpiece (such as for use by a different user or if the first mouthpiece is dirty), a male member containing an on/off valve, a male member with a fitting adapted to receive an additional length of tube assembly, a male member with a gas mask adapter, etc.

A quick-connect assembly having at least one male or female member and a plurality of complimentary members may be referred to as a quick-connect kit, in that a user can selectively interconnect the components depending upon the user's preferences and desired application of the hydration system. An example of such a quick-connect kit is shown in FIG. 39 and generally indicated at 200. As shown, kit 200 includes a female member 80 and a plurality of male members 82, with at least one of the male members typically having a different mount or integrated component than the others. In the illustrated embodiment, the male members include a member 202 having a fitting 140 for a mouthpiece 42, a member 204 having a fitting 160 for a gas mask, a member 206 having a mount 98, which in the illustrated embodiment is barbed, and a member 208 having an on/off valve 76. It is within the scope of the invention that quick-connect kits 200 may include some or all of these illustrative combinations of male and female members. It is further within the scope of the invention that kit 200 may include more than one of a particular type of member and/or one or more members that differ from those illustrated in FIG. 39.

As discussed herein, hydration systems 10 with quick-connect assemblies 70 according to the present invention may be used for a variety of applications, including sporting applications, recreational applications, industrial applications, and military/law enforcement applications. In applications where the hydration system is configured for use with gas masks or otherwise expected to be exposed to harmful chemical agents, it may be desirable for at least a portion of the hydration system to be resistant to chemical agents, such as mustard (HD) blister agent and sarin (GB) nerve agent. Mustard blister agent is a non-volatile, very caustic substance that is effective at penetrating many materials. Mustard vapor can produce skin irritation (erythema) at dosages of approximately 100 mg-min/$m^3$. Sarin nerve agent is a volatile material that is effective at migrating through pores and other apertures or gas-permeable openings in materials. Sarin vapor can incapacitate an individual at dosages of approximately 8000 mg-min/$m^3$. Sarin and mustard agents are not exclusive of the chemical agents to which hydration systems according to the present invention may be constructed to be resistant. However, the combination of the penetrating ability of mustard agent and the migratory ability of sarin agent to collectively form an effective test for most chemical agents. In other words, materials that are sufficiently chemically resistant to both mustard and sarin agents are typically sufficiently chemically resistant to other chemical agents, such as anthrax, small pox and the like.

Preferably, the chemically resistant components of the hydration system are constructed to meet, and preferably exceed, the chemical penetration standards established by the U.S. Army Center for Health Promotion and Preventative Medicine (CHPPM). Expressed in terms of the amount of nerve agent ingested by a user drinking fifteen liters of drink fluid per day (with a seven day maximum), these maximum standards may be expressed as 0.047 mg/L of mustard agent and 0.0093 mg/L of sarin agent. When tested, it is preferable that the chemically resistant components of hydration system 10 prevent the above-identified maximum acceptable amounts of these agents from passing therethough when exposed to the agents in lethal concentrations (such as 10 g/$m^2$ of each agent) for at least 24 hours. Even more preferably, the components prevent even 50%, 60% or 75% of the CHPPM standards from being reached.

Preferably, the entire hydration system, as assembled for use, is resistant to these chemical agents so that drink fluid may be stored in reservoir 12 and selectively dispensed to a user through tube assembly 34 and any associated components without the drink fluid being contaminated by the chemical agents. By "as assembled for use," it is meant that portions of the hydration system that are enclosed by sufficiently chemically resistant materials may themselves be formed from materials, or otherwise be constructed, such that they are not themselves sufficiently chemically resistant. For example, an illustrative, schematic component of a hydration system is shown in FIG. 40 and indicated generally at 220. As shown, component 220 is depicted as a length of flexible drink tube, such as may be utilized in tube assembly 34. In FIG. 40, component 220 is entirely formed from one or more materials 222 that meet or exceed the CHPPM (or other selected) standards for one or more selected chemical agents in the composition and construction present in the hydration system. By this it is recognized that the chemical resistance of a material is at least partially defined by the material's composition and by the thickness of the material. Therefore, a material that is sufficiently chemically resistant to sarin and mustard agents, for example, when present in a first thickness may not be sufficiently chemically resistant if the thickness is reduced.

Illustrative, non-exclusive examples of chemically resistant materials for constructing components of hydration system 10 include thermoset epoxies such as vulcanized butyl rubber and chloro-isobutene-isoprene rubber (chloro-butyl), thermoplastic elastomers such as Sentoprene™ rubber, nylon, ABS, polyurethane, polypropylene, polyethylene. The choice of materials for a particular component include considerations of the expected forced to be applied to the component, structural requirements, and flexibility requirements, and accordingly may vary from component to component and system to system.

It is within the scope of the invention that chemically resistant components of a hydration system may include a chemically resistant cover, or sheath, that is applied over a structure that is not, or not sufficiently, chemically resistant. For example, in FIG. 41, a portion of tube assembly 34 is shown encased within a cover, or sheath, 224 that is formed from one or more chemically resistant materials 222. Collectively, the sheathed tube assembly provides another example of a chemically resistant component 220. More specifically, although tube assembly 34 may not be sufficiently chemically resistant, the assembled component 220 is sufficiently chemically resistant because sheath 224 prevents the chemical agents from reaching tube assembly 34. The sheath may be permanently bonded or otherwise applied to the component or removably mounted on the component.

It is also within the scope of the invention that the preceding discussion applies to other flexible components of the hydration system (such as reservoir 12, some mouthpieces 42 and some exit ports 30) and other more rigid components of the hydration system (such as some exit ports 30, on/off valve 76, quick-connect assembly 70, gas mask fittings 160 and some mouthpieces 42). In FIG. 42, examples of these and other suitable constructions for chemically resistant components of a hydration system are schematically illustrated. As shown, each illustrative, fragmentary component includes an exterior surface 230 that is oriented to be contacted by external chemical agents to which the hydration system is exposed, and an internal surface 232 that is oriented to contact drink fluid within the hydration system. In FIG. 42, reference numeral 240 schematically depicts a component that is entirely formed from a chemically resistant material, and reference numeral 242 schematically depicts a component that includes an outer covering or sheath 224 that is formed from a chemically resistant material. It may be desirable to include an underlying coating or fluid barrier 246 with some chemically resistant materials to prevent the materials from affecting the taste of the drink fluid carried in the hydration system. For example, vulcanized butyl rubber tends to negatively affect the taste of water or other drink fluids and therefore, a waterproof barrier 246 may be used to preserve the original taste of the drink fluid when vulcanized butyl rubber is used as chemically resistant material 222. This construction is schematically illustrated at 248 in FIG. 42. Barrier 246 may take any suitable form, such as being a film, coating, sheet, independent layer, etc. As yet another example, and as schematically illustrated at 250, a chemically resistant component 220 may be formed from a plurality of layers that collectively provide a chemically resistant composite, even if one or more of the layers (or even each of the individual layers) is not chemically resistant.

In FIG. 43, a less schematic example of chemically resistant components 220 is provided. As shown, tube assembly 34 (including tube portions 192 and 194) and a quick connect assembly 70 with an on/off valve 76 and a gas-mask fitting 160 are all fluidly interconnected and each of these components is formed from at least one chemically resistant material 222.

The portion of a hydration system to be formed from chemically resistant materials depends to some degree upon the intended environment and method of using the hydration system. Of course, in many applications, such as sporting and recreational applications, none of the hydration systems components need to be constructed of these materials. In applications where there is reasonable risk of exposure to chemical agents, the most protective design is for the entire hydration system (reservoir, exit port, tube assembly, mouthpiece, quick-connect assembly, and any additional components) be constructed from chemically resistant materials so that the drink fluid is protected while stored and dispensed regardless of any other protective measures employed by a user.

Industrial Applicability

The present invention is applicable in any hydration system in which drink fluid is provided to a user. The invention is particularly useful with personal hydration systems in which drink fluid is carried by a user in a fluid reservoir and delivered for drinking to a user via a mouthpiece that is fluidly connected to the reservoir by a drink tube. Embodiments of the present invention are also applicable to personal hydration systems that are selectively configured for use by users wearing gas masks.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

An illustrative, non-exclusive example of an invention according to the present disclosure is a personal hydration system that includes at least (1) a reservoir having a body portion with an internal compartment adapted to receive a volume of drink fluid and a selectively sealable fill port having an opening through which drink fluid may be added to or removed from the compartment; (2) an elongate downstream assembly extending in fluid communication from the reservoir to define a fluid conduit through which drink fluid may flow from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect the quick-connect assembly with an intake tube of a gas mask, and further wherein the downstream assembly further includes at least one quick-connect assembly adapted to fluidly interconnect at least two of the plurality of components, wherein the quick-connect assembly includes at least (3) a male coupling member having a shaft that includes a tip and which defines at least a portion of the fluid conduit, wherein the male coupling member includes a region distal the tip with a port through which drink fluid may selectively flow into or out of the assembled quick-connect assembly; (4) a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and (5) a resilient lock ring coupled to the female coupling member and adapted to selectively engage prevent removal of the shaft of the male coupling member when the shaft of the male coupling member is at least partially inserted into the passage, wherein the lock ring defines a passage and is selectively deformable between an unlocked orientation, in which the tip of the male coupling member may pass through the passage, and a locked orientation, in which the tip of the male coupling member may not pass through the passage, and further wherein the lock ring is biased to the locked configuration.

As another non-exclusive example, the present disclosure is also directed to a quick-connect kit for forming an assembled quick-connect assembly that defines a fluid conduit through which drink fluid may flow, with the kit including (1) at least one male coupling member having a shaft that includes a tip and which defines at least a portion of a fluid conduit, wherein the male coupling member includes a region distal the tip with a port through which drink fluid may selectively flow into or out of the assembled quick-connect assembly, and further wherein the region includes a mount; (2) at least one a female coupling member having a body with an opening sized to receive at least the tip of a male coupling member, wherein the opening is in fluid communication with a cavity that extends through the female coupling member to a region distal the opening that includes a port through which drink fluid may selectively flow into or out of the assembled quick-connect assembly, wherein the region includes a mount; and (3) a lock member adapted to releasably and fluidly interconnect a male coupling member and a female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the passage of the female coupling member; with the mount of a first one of the male and the female coupling members adapted to be fluidly interconnected with a tube assembly of a hydration system upstream from a second one of the male and the female coupling members, and with the kit including at least a pair of the second one of the male and the female coupling members, with the mount of one of the second one of the male and the female coupling members adapted to fluidly interconnect the assembly with at least one of a length of drink tubing and a mouthpiece and the mount of the other of the second one of the male and the female coupling members adapted to fluidly interconnect the assembly with an intake tube of a gas mask, and furthermore upon configuring the lock member to its unlocked configuration, the second ones of the male and the female coupling members may be selectively and interchangeably fluidly interconnected with the first one of the male and the female coupling members.

As yet another example, the present disclosure is directed to personal hydration systems and/or gas masks that include such a kit.

As still another example, the present disclosure is directed to chemically resistant hydration systems that include at least (1) a reservoir having a body portion with an internal compartment adapted to receive a volume of drink fluid and a selectively sealable fill port having an opening through which drink fluid may be added to or removed from the compartment; and (2) an elongate downstream assembly extending in fluid communication from the reservoir to define a fluid conduit through which drink fluid may flow from the compartment for drinking by a user, wherein the downstream assembly comprises a plurality of fluidly interconnected components selected from the group consisting of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect the quick-connect assembly with an intake tube of a gas mask, and further wherein the downstream assembly further includes at least one quick-connect assembly adapted to fluidly interconnect at least two of the plurality of components, and further the plurality of fluidly interconnected components are adapted to be chemically resistant, such that drink fluid may remain in the downstream assembly when the downstream assembly is exposed to a chemical agent present in a concentration of at least 10 g/m$^2$ without more than a maximum acceptable amount of the chemical agent penetrating the downstream assembly and contacting the drink fluid. Illustrative examples of these chemical agents include mustard blister agent and/or sarin nerve agent. Illustrative maximum acceptable amounts of mustard blister agent include 0.047 mg/L, 0.003525 mg/L, and 0.00235 mg/L. Illustrative maximum acceptable amounts of sarin blister agent include 0.0093 mg/L, 0.006975 mg/L, and 0.00465 mg/L.

It is believed that the following claims particularly point out certain combinations and subcombinations that are directed to one or more of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A personal hydration system, comprising:

a reservoir having a body portion with an internal compartment adapted to receive a volume of drink fluid, wherein the reservoir includes a selectively sealable fill port having an opening through which drink fluid may be added to or removed from the compartment; and an elongate downstream assembly extending in fluid communication from the reservoir to define a fluid conduit through which drink fluid may flow from the compartment for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, wherein the plurality of fluidly interconnected components are adapted to be chemically resistant, such that drink fluid may remain in the downstream assembly when the downstream assembly is exposed to a chemical agent present in a concentration of 10 g/m$^2$ for 24 hours without more than a maximum acceptable amount of the chemical agent penetrating the downstream assembly and contacting the drink fluid, and further wherein the quick-connect assembly comprises:

a male coupling member having a shaft that includes a tip and which defines at least a portion of the fluid conduit, wherein the male coupling member includes a region distal the tip with a port through which drink fluid may selectively flow into or out of the assembled quick-connect assembly;

a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the passage of the lock ring is selectively deformable to configure the lock ring between an unlocked configuration, in which the tip of the male coupling member may pass through the passage, and a locked configuration, in which the tip of the male coupling member may not pass through the passage, and further wherein the lock ring is biased to the locked configuration.

2. The hydration system of claim 1, wherein the shaft of the male coupling member includes a region of reduced cross-sectional area bounded by a pair of regions of greater cross-sectional area than the region of reduced cross-sectional area and further wherein the region of reduced cross-sectional area is sized such that the region of reduced cross-sectional area may extend within the passage with the regions of greater cross-sectional area on respective sides of the lock ring.

3. The hydration system of claim 2, wherein the tip of the male coupling member defines one of the regions of greater cross-sectional area.

4. The hydration system of claim 2, wherein when the lock ring is in the locked configuration, the regions of greater cross-sectional area cannot fit through the passage.

5. The hydration system of claim 2, wherein the lock ring is adapted to deflect from its locked configuration to its unlocked configuration upon urging of one of the regions of greater cross-sectional area through the passage.

6. The hydration system of claim 5, wherein upon insertion of the one of the regions of greater cross-sectional area through the passage, the lock ring is biased to automatically return toward the locked configuration to seat the lock ring upon the region of reduced cross-sectional area of the male coupling member.

7. The hydration system of claim 1, wherein the lock ring includes at least one release member adapted to configure the lock ring to the unlocked configuration responsive to user-applied forces thereto.

8. The hydration system of claim 1, wherein the female coupling member includes at least one aperture in the body, wherein the lock ring includes at least one release member that is biased to extend from the passage at least into one of the at least one apertures in the body of the female coupling member, and further wherein upon urging of the at least one release member toward the passage, the lock ring is urged toward the unlocked configuration.

9. The hydration system of claim 1, wherein the lock ring is adapted to be configured between the locked and the unlocked configurations without requiring sliding or rotational movement of the lock ring relative to the female coupling member.

10. The hydration system of claim 1, wherein the region of at least one of the female and the male coupling members further includes a mount that is adapted to fluidly interconnect the region with another component of the downstream assembly.

11. The hydration system of claim 10, wherein the mount is adapted to receive a length of drink tubing.

12. The hydration system of claim 10, wherein the mount is adapted to receive a mouthpiece.

13. The hydration system of claim 1, wherein the regions of both of the female and the male coupling members further include mounts that are adapted to fluidly interconnect the regions with other components of the downstream assembly.

14. The hydration system of claim 1, wherein the quick-connect assembly is integrated with at least one of the plurality of fluidly interconnected components.

15. The hydration system of claim 14, wherein at least one of the male coupling member and the female coupling member shares a common housing with at least one of the plurality of fluidly interconnected components.

16. The hydration system of claim 1, wherein the quick-connect assembly further includes at least one of the group consisting of an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir, and a gas-mask fitting adapted to fluidly interconnect the quick-connect assembly with an intake tube of a gas mask.

17. The hydration system of claim 1, further comprising a pack into which the reservoir is received.

18. The hydration system of claim 1, wherein the chemical agent includes mustard blister agent and the maximum acceptable amount is 0.047 mg/L.

19. The hydration system of claim 1, wherein the chemical agent includes mustard blister agent and the maximum acceptable amount is 0.0235 mg/L.

20. The hydration system of claim 1, wherein the chemical agent includes sarin nerve agent and the maximum acceptable amount is 0.0093 mg/L.

21. The hydration system of claim 1, wherein the chemical agent includes sarin nerve agent and the maximum acceptable amount is 0.00465 mg/L.

22. The hydration system of claim 1, wherein the reservoir is also adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

23. The hydration system of claim 22, wherein the reservoir is formed from a flexible chemically resistant material.

24. The hydration system of claim 1, wherein at least one of the plurality of fluidly interconnected components includes a cover that is formed from a chemically resistant material.

25. The hydration system of claim 1, wherein at least one of the plurality of fluidly interconnected components is formed from a chemically resistant material.

26. A personal hydration system, comprising:
a flexible reservoir having a body portion with an internal compartment adapted to receive a volume of drink fluid, wherein the reservoir includes a selectively sealable fill port having an opening through which drink fluid may be added to or removed from the compartment; and an elongate downstream assembly extending in fluid communication from the reservoir to define a fluid conduit through which drink fluid may flow from the compartment for drinking by a user, wherein the downstream assembly comprises at least a plurality of fluidly interconnected components selected from the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, and further the plurality of fluidly interconnected components are adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

27. The hydration system of claim 26, wherein the chemical agent includes mustard blister agent and the maximum acceptable amount is 0.047 mg/L.

28. The hydration system of claim 27, wherein the chemical agent further includes sarin nerve gas and the maximum acceptable amount is 0.0093 mg/L.

29. The hydration system of claim 26, wherein the chemical agent includes mustard blister agent and the maximum acceptable amount is 0.003525 mg/L.

30. The hydration system of claim 26, wherein the chemical agent includes mustard blister agent and the maximum acceptable amount is 0.00235 mg/L.

31. The hydration system of claim 26, wherein the chemical agent includes sarin nerve agent and the maximum acceptable amount is 0.0093 mg/L.

32. The hydration system of claim 26, wherein the chemical agent includes sarin nerve agent and the maximum acceptable amount is 0.006975 mg/L.

33. The hydration system of claim 26, wherein the chemical agent includes sarin nerve agent and the maximum acceptable amount is 0.00465 mg/L.

34. The hydration system of claim 26, wherein the reservoir is also adapted to be chemically resistant, such that drink fluid may remain in the downstream assembly when the downstream assembly is exposed to a chemical agent present in a concentration of 10 $g/m^2$ for 24 hours without more than a maximum acceptable amount of the chemical agent penetrating the downstream assembly and contacting the drink fluid.

35. The hydration system of claim 34, wherein the reservoir is formed from a flexible chemically resistant material.

36. The hydration system of claim 26, wherein at least one of the plurality of fluidly interconnected components includes a cover that is formed from a chemically resistant material.

37. The hydration system of claim 26, wherein at least one of the plurality of fluidly interconnected components is formed from a chemically resistant material.

38. The hydration system of claim 26, further including a pack into which the reservoir is housed.

39. A personal hydration system, comprising:
a reservoir having a body portion with an internal compartment adapted to receive a volume of drink fluid, wherein the reservoir includes a selectively sealable fill port having an opening through which drink fluid may be added to or removed from the compartment; and
an elongate downstream assembly extending in fluid communication from the reservoir to define a fluid conduit through which drink fluid may flow from the compartment for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, an exit port adapted to fluidly interconnect the downstream assembly and the reservoir to permit drink fluid to be drawn from the compartment into the downstream assembly, and a gas mask fitting adapted to fluidly interconnect a quick-connect assembly with an intake tube of a gas mask, and further wherein the downstream assembly further includes at least one quick-connect assembly adapted to fluidly interconnect at least two of the plurality of components, wherein the quick-connect assembly comprises:
a male coupling member having a shaft that includes a tip and which defines at least a portion of the fluid conduit, wherein the male coupling member includes a region distal the tip with a port through which drink fluid may selectively flow into or out of the assembled quick-connected assembly;
a female coupling member having a body with an opening sized to receive at least the tip of the male coupling member, wherein the opening is in fluid communication with a cavity that extends through the female coupling member to a region distal the opening that includes a port through which drink fluid may selectively flow into or out of the assembled quick-connect assembly; and
a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the passage of the lock ring is selectively deformable to configure the lock ring between an unlocked configuration, in which the tip of the male coupling member may pass through the passage, and a locked configuration, in which the tip of the male coupling member may not pass through the passage, and further wherein the lock ring is biased to the locked configuration; and
wherein the quick-connect assembly is integrated with at least one of the plurality of fluidly interconnected components, and further wherein at least one of the male coupling member and the female coupling member shares a common housing with an exit port adapted to fluidly interconnect the reservoir with a length of drink tubing.

40. The hydration system of claim 23, wherein the reservoir is formed from a plurality of layers, with at least one of the layers being a fluid impermeable layer and at least one of the layers not being formed from a chemically resistant material.

41. The hydration system of claim 26, wherein the plurality of interconnected components includes an on/off valve adapted to selectively obstruct the fluid conduit and prevent drink fluid from flowing therethrough.

42. The hydration system of claim 35, wherein the reservoir is formed from a plurality of layers, with at least one of the layers being a fluid impermeable layer and at least one of the layers not being formed from a chemically resistant material.

43. A personal hydration system, comprising:
a reservoir having a body portion with an internal compartment adapted to receive a volume of drink fluid, wherein the reservoir includes an exit port and a selectively sealable fill port having an opening through which drink fluid may be added to or removed from the compartment; and
an elongate downstream assembly extending in fluid communication with the reservoir to define a fluid conduit through which drink fluid may flow from the compartment and through the downstream assembly for drinking by a user, wherein the downstream assembly comprises a plurality of fluidly interconnected components selected from at least the group consisting of one or more of a length of hollow drink tubing through which drink fluid may flow, an on/off valve adapted to selectively obstruct the fluid conduit and prevent drink fluid from flowing therethrough, a mouthpiece adapted to dispense drink fluid to a user's mouth, a bite-actuated mouthpiece adapted to dispense drink fluid to a user's mouth upon receipt of user-applied compressive forces to the mouthpiece, and a gas mask fitting adapted to fluidly interconnect a quick-connect assembly with an intake tube of a gas mask,
wherein the exit port is adapted to fluidly interconnect the downstream assembly with the reservoir to permit drink fluid to be drawn from the compartment into the downstream assembly, wherein the exit port includes a male coupling member having a shaft that includes a tip and which defines at least a portion of a fluid conduit, wherein the male coupling member includes a region distal the tip with a port through which drink fluid may selectively flow into the exit port from the compartment of the reservoir;
a female coupling member having a body with an opening sized to receive at least the tip of the male coupling member, wherein the opening is in fluid communication with a cavity that extends through the female coupling member to a region distal the opening that includes a port through which drink fluid may selectively flow from the exit port into the downstream assembly; and
a lock member adapted to releasably and fluidly interconnect a male coupling member and a female coupling member, wherein the lock member is selectively configured between a locked configuration, in which the lock member is configured to retain the male and the female coupling members in fluid interconnection with each other, and an unlocked configuration, in which the lock member is configured to permit the male coupling member to be selectively removed from and inserted into the cavity of the female coupling member; and further wherein the lock member is biased to the locked configuration.

44. The hydration system of claim 43, wherein the lock member includes at least one release member adapted to configure the lock member to release the portion of the male coupling member upon receipt of a user-applied force to the release member, and further wherein the female coupling member includes at least one aperture through which the at least one release member at least partially extends.

45. The hydration system of claim 43, wherein the lock member includes a resilient lock ring coupled to the female coupling member and including a passage extending therethrough, wherein the lock ring is adapted to selectively engage and prevent removal of the shaft of the male coupling member when the shaft of the male coupling member is at least partially inserted into the passage, wherein the lock ring is selectively deformable between an unlocked configuration, in which the tip of the male coupling member may pass through the passage, and a locked configuration, in which the tip of the male coupling member may not pass through the passage.

46. The hydration system of claim 43, wherein the plurality of components includes a bite-actuated mouthpiece, and further wherein the downstream assembly includes at least one quick-connect assembly adapted to fluidly interconnect at least two of the plurality of components.

47. The hydration system of claim 39, wherein the shaft of the male coupling member includes a region of reduced cross-sectional area bounded by a pair of regions of greater cross-sectional area than the region of reduced cross-sectional area and further wherein the region of reduced cross-sectional area is sized such that the region of reduced cross-sectional area may extend within the passage with the regions of greater cross-sectional area on respective sides of the lock ring.

48. The hydration system of claim 47, wherein the tip of the male coupling member defines one of the regions of greater cross-sectional area.

49. The hydration system of claim 47, wherein when the lock ring is in the locked configuration, the regions of greater cross-sectional area cannot fit through the passage.

50. The hydration system of claim 47, wherein the lock ring is adapted to deflect from its locked configuration to its unlocked configuration upon urging of one of the regions of greater cross-sectional area through the passage.

51. The hydration system of claim 50, wherein upon insertion of the one of the regions of greater cross-sectional area through the passage, the lock ring is biased to automatically return toward the locked configuration to seat the lock ring upon the region of reduced cross-sectional area of the male coupling member.

52. The hydration system of claim 39, wherein the lock ring includes at least one release member adapted to configured the lock ring to the unlocked configuration responsive to user-applied forces thereto.

53. The hydration system of claim 39, wherein the female coupling member includes at least one aperture in the body, wherein the lock ring includes at least one release member that is biased to extend from the passage at least into one of the at least one apertures in the body of the female coupling member, and further wherein upon urging of the at least one release member toward the passage, the lock ring is urged toward the unlocked configuration.

54. The hydration system of claim 39, wherein the lock ring is adapted to be configured between the locked and the unlocked configurations without requiring rotational movement of the lock ring relative to the female coupling member.

55. The hydration system of claim 39, further comprising a pack into which the reservoir is received.

56. The hydration system of claim 1, wherein the lock ring is adapted to be configured between the locked and the unlocked configurations without requiring rotational movement of the lock ring relative to the female coupling member.

* * * * *